US012627610B2

(12) United States Patent
Sahin et al.

(10) Patent No.: US 12,627,610 B2
(45) Date of Patent: May 12, 2026

(54) METHODS AND APPARATUS RELATING TO RESIDENTIAL GATEWAY SUPPORT FOR LOW LATENCY, LOW LOSS AND SCALABLE THROUGHPUT (L4S) SERVICE IN A SYSTEM INCLUDING AN WAGF

(71) Applicant: Charter Communications Operating, LLC, St. Louis, MO (US)

(72) Inventors: Yildirim Sahin, Englewood, CO (US); Paul L. Russell, Jr., Lawrence, NJ (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/586,383

(22) Filed: Feb. 23, 2024

(65) Prior Publication Data

US 2025/0227070 A1 Jul. 10, 2025

Related U.S. Application Data

(60) Provisional application No. 63/619,154, filed on Jan. 9, 2024.

(51) Int. Cl.
H04L 47/26 (2022.01)
H04L 67/141 (2022.01)
(Continued)

(52) U.S. Cl.
CPC ............ H04L 47/26 (2013.01); H04L 67/141 (2013.01); H04L 67/147 (2013.01); H04W 28/0236 (2013.01)

(58) Field of Classification Search
CPC .. H04L 47/26; H04L 67/141; H04W 28/0236; H04W 28/10; H04W 28/02
(Continued)

(56) References Cited

U.S. PATENT DOCUMENTS 12,132,636 B2 * 10/2024 Clancy .................... H04L 43/55
2019/0052580 A1 * 2/2019 Peng ..................... H04L 47/825
(Continued)

FOREIGN PATENT DOCUMENTS

CN 118140461 A 6/2024
EP 3442182 A1 * 2/2019 ............. H04L 47/31
(Continued)

OTHER PUBLICATIONS

Unknown, 3GPP TS 23.501 V18.3.0 (Sep. 2023), Sep. 2023, 3GPP, www.3gpp.org/ftp/Specs/archive/23_series/23.501/23501-i30.zip (Year: 2023).*
(Continued)

*Primary Examiner* — Ruolei Zong
(74) *Attorney, Agent, or Firm* — Straub & Straub; Michael P. Straub; Stephen T. Strtaub

(57) ABSTRACT

A residential gateway (RG), e.g., a 5G-RG, indicates its support for ECN marking for L4S in uplink and/or downlink via a PDU Session Request message, e.g., a PDU Session Establishment Request message, communicated from the RG via a wireline access gateway function (W-AGF) to a core network, e.g., a 5GC. The indication, in some embodiments, is provided in either: a Session Management (SM) capability field, e.g., a 5GSM capability field, or as a new indication, which is included as part of a N1 SM container. A RG may, and sometimes does, determine congestion in its buffers/queues and perform ECN marking and report if traffic congestion is being experienced within its own buffers/queues for uplink and/or downlink traffic. In some such embodiments, both an RG and a W-AGF can, and sometimes do, perform ECN marking for L4S simultaneously in both directions (i.e. uplink and downlink).

11 Claims, 24 Drawing Sheets

(51) Int. Cl.
    *H04L 67/147*        (2022.01)
    *H04W 28/02*         (2009.01)

(58) Field of Classification Search
    USPC .......................................................... 709/238
    See application file for complete search history.

(56) References Cited

U.S. PATENT DOCUMENTS

| | | | | |
|---|---|---|---|---|
| 2022/0124548 | A1* | 4/2022 | Srivastava | H04W 28/0268 |
| 2023/0275842 | A1* | 8/2023 | Östberg | H04L 47/127 |
| | | | | 370/235 |
| 2024/0275887 | A1* | 8/2024 | Guo | H04W 28/0268 |
| 2025/0039736 | A1* | 1/2025 | Panigrahi | H04W 28/0289 |
| 2025/0106680 | A1 | 3/2025 | Patil et al. | |
| 2025/0113250 | A1 | 4/2025 | Kahn et al. | |
| 2025/0227069 | A1 | 7/2025 | Sahin et al. | |
| 2025/0227071 | A1 | 7/2025 | Sahin et al. | |

FOREIGN PATENT DOCUMENTS

| | | |
|---|---|---|
| KR | 20240063536 A | 5/2024 |
| WO | 2025058351 A | 3/2025 |
| WO | 2025131857 A1 | 6/2025 |

OTHER PUBLICATIONS

Briscoe et al., Request for Comments (RFC) 9330, Low Latency, Low Loss, and Scalable Throughput (L4S) Internet Service: Architecture, Internet Engineering Task Force (IETF), Jan. 2023, 36 pages.

De Schepper et al., Request for Comments (RFC) 9331, The Explicit Congestion Notification (ECN) Protocol for Low Latency, Low Loss, and Scalable Throughput (L4S), Internet Engineering Task Force (IETF), Jan. 2023, 52 pages.

De Schepper et al., Request for Comments (RFC) 9332, Dual-Queue Coupled Active Queue Management (AQM) for Low Latency, Low Loss, and Scalable Throughput (L4S), Internet Engineering Task Force (IETF), Jan. 2023, 52 pages.

3rd Generation Partnership Project; Technical Specification Group Services and System Aspects; System architecture for the 5G System (5GS); Stage 2 (Release 18), 3GPP TS 23.501 V18.4.0, Dec. 2023, 706 pages.

3rd Generation Partnership Project; Technical Specification Group Services and System Aspects; Procedures for the 5G System (5GS); Stage 2 (Release 18), 3GPP TS 23.502 V18.3.0, Sep. 2023, 899 pages.

3rd Generation Partnership Project; Technical Specification Group Services and System Aspects; Wireless and wireline convergence access support for the 5G System (5GS) (Release 18), 3GPP TS 23.316 V18.3.0, Sep. 2023, 93 Pages.

3rd Generation Partnership Project; Technical Specification Group Services and System Aspects; Wireless and wireline convergence access support for the 5G System (5GS) (Release 18), 3GPP TS 23.316 V18.4.0, Dec. 2023, 94 pages.

3rd Generation Partnership Project; Technical Specification Group Radio Access Network; NR; NR and NG-RAN Overall Description; Stage 2 (Release 17), 3GPP TS 38.300 V17.6.0, Sep. 2023, 211 pages.

PCR 23.700-70: New Solution for L4S support in wireline access, SA WG2 Meeting #160, S2-2312144, Chicago, USA, Nov. 13-17, 2023, 5 pages.

Google Patent translation of Korean language reference KR 20240063536 A, printed Sep. 22, 2025, 18 pages.

* cited by examiner

| FIGURE 3A |
| --- |
| FIGURE 3B |
| FIGURE 3C |

FIGURE 3

| FIGURE 4A |
| FIGURE 4B |
| FIGURE 4C |
| FIGURE 4D |

FIGURE 4

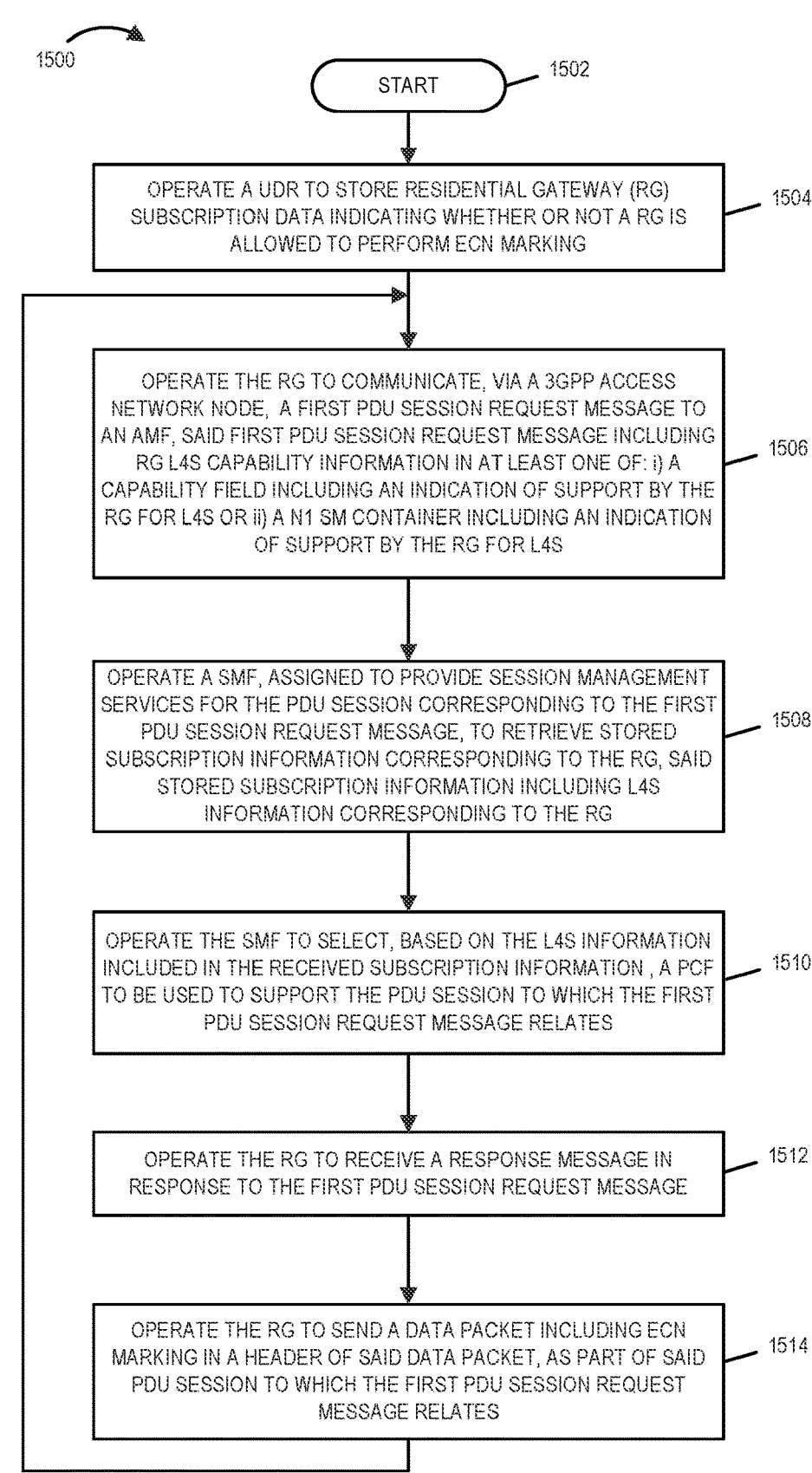

1500

START — 1502

OPERATE A UDR TO STORE RESIDENTIAL GATEWAY (RG) SUBSCRIPTION DATA INDICATING WHETHER OR NOT A RG IS ALLOWED TO PERFORM ECN MARKING — 1504

OPERATE THE RG TO COMMUNICATE, VIA A 3GPP ACCESS NETWORK NODE, A FIRST PDU SESSION REQUEST MESSAGE TO AN AMF, SAID FIRST PDU SESSION REQUEST MESSAGE INCLUDING RG L4S CAPABILITY INFORMATION IN AT LEAST ONE OF: i) A CAPABILITY FIELD INCLUDING AN INDICATION OF SUPPORT BY THE RG FOR L4S OR ii) A N1 SM CONTAINER INCLUDING AN INDICATION OF SUPPORT BY THE RG FOR L4S — 1506

OPERATE A SMF, ASSIGNED TO PROVIDE SESSION MANAGEMENT SERVICES FOR THE PDU SESSION CORRESPONDING TO THE FIRST PDU SESSION REQUEST MESSAGE, TO RETRIEVE STORED SUBSCRIPTION INFORMATION CORRESPONDING TO THE RG, SAID STORED SUBSCRIPTION INFORMATION INCLUDING L4S INFORMATION CORRESPONDING TO THE RG — 1508

OPERATE THE SMF TO SELECT, BASED ON THE L4S INFORMATION INCLUDED IN THE RECEIVED SUBSCRIPTION INFORMATION, A PCF TO BE USED TO SUPPORT THE PDU SESSION TO WHICH THE FIRST PDU SESSION REQUEST MESSAGE RELATES — 1510

OPERATE THE RG TO RECEIVE A RESPONSE MESSAGE IN RESPONSE TO THE FIRST PDU SESSION REQUEST MESSAGE — 1512

OPERATE THE RG TO SEND A DATA PACKET INCLUDING ECN MARKING IN A HEADER OF SAID DATA PACKET, AS PART OF SAID PDU SESSION TO WHICH THE FIRST PDU SESSION REQUEST MESSAGE RELATES — 1514

FIGURE 12

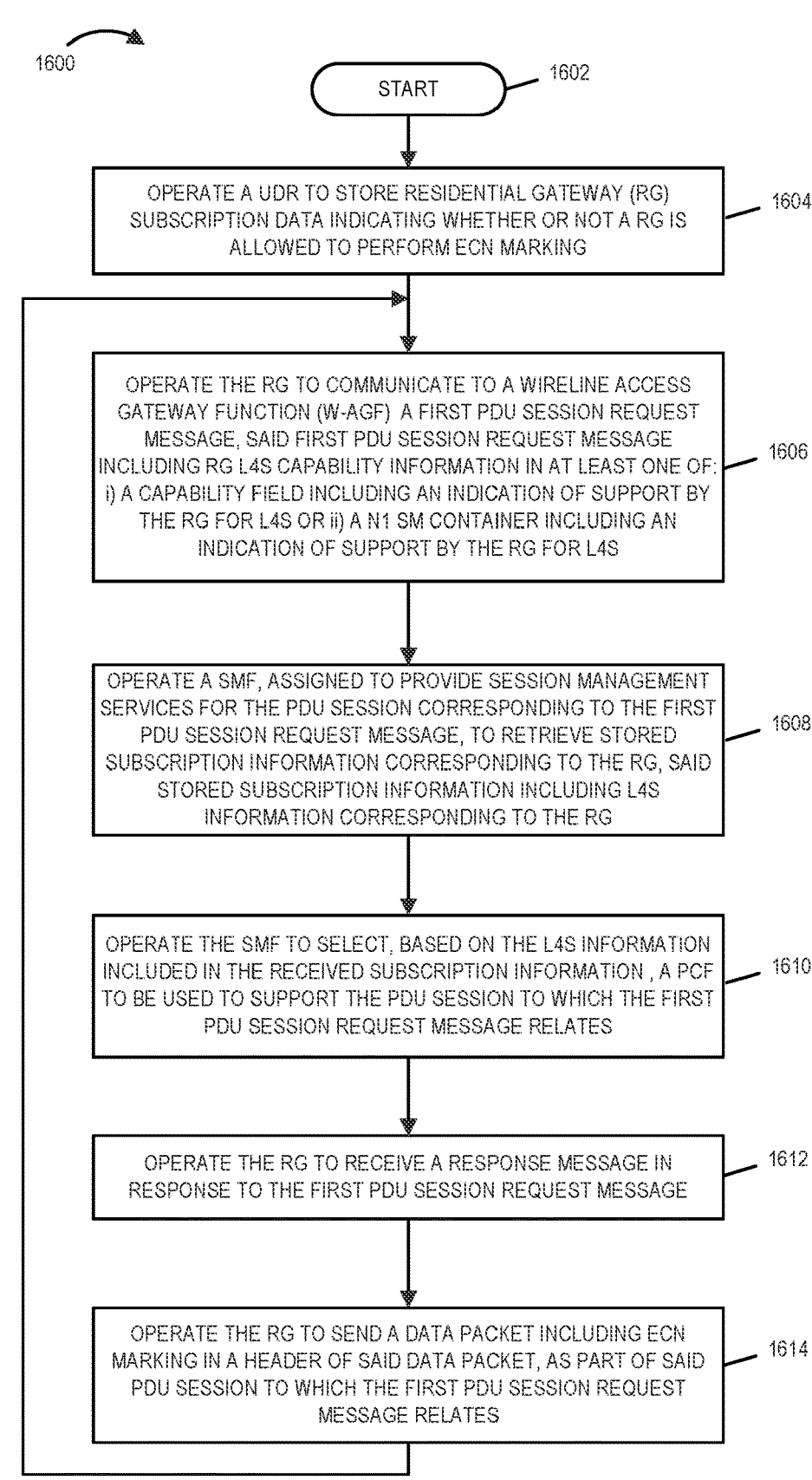

1600

START — 1602

OPERATE A UDR TO STORE RESIDENTIAL GATEWAY (RG) SUBSCRIPTION DATA INDICATING WHETHER OR NOT A RG IS ALLOWED TO PERFORM ECN MARKING — 1604

OPERATE THE RG TO COMMUNICATE TO A WIRELINE ACCESS GATEWAY FUNCTION (W-AGF) A FIRST PDU SESSION REQUEST MESSAGE, SAID FIRST PDU SESSION REQUEST MESSAGE INCLUDING RG L4S CAPABILITY INFORMATION IN AT LEAST ONE OF: i) A CAPABILITY FIELD INCLUDING AN INDICATION OF SUPPORT BY THE RG FOR L4S OR ii) A N1 SM CONTAINER INCLUDING AN INDICATION OF SUPPORT BY THE RG FOR L4S — 1606

OPERATE A SMF, ASSIGNED TO PROVIDE SESSION MANAGEMENT SERVICES FOR THE PDU SESSION CORRESPONDING TO THE FIRST PDU SESSION REQUEST MESSAGE, TO RETRIEVE STORED SUBSCRIPTION INFORMATION CORRESPONDING TO THE RG, SAID STORED SUBSCRIPTION INFORMATION INCLUDING L4S INFORMATION CORRESPONDING TO THE RG — 1608

OPERATE THE SMF TO SELECT, BASED ON THE L4S INFORMATION INCLUDED IN THE RECEIVED SUBSCRIPTION INFORMATION , A PCF TO BE USED TO SUPPORT THE PDU SESSION TO WHICH THE FIRST PDU SESSION REQUEST MESSAGE RELATES — 1610

OPERATE THE RG TO RECEIVE A RESPONSE MESSAGE IN RESPONSE TO THE FIRST PDU SESSION REQUEST MESSAGE — 1612

OPERATE THE RG TO SEND A DATA PACKET INCLUDING ECN MARKING IN A HEADER OF SAID DATA PACKET, AS PART OF SAID PDU SESSION TO WHICH THE FIRST PDU SESSION REQUEST MESSAGE RELATES — 1614

FIGURE 13

METHODS AND APPARATUS RELATING TO RESIDENTIAL GATEWAY SUPPORT FOR LOW LATENCY, LOW LOSS AND SCALABLE THROUGHPUT (L4S) SERVICE IN A SYSTEM INCLUDING AN WAGF

RELATED APPLICATIONS

The present application claims benefit of U.S. Provisional Patent Application Ser. No. 63/619,154 which was filed on Jan. 9, 2024 and which is hereby expressly incorporated by reference in its entirety.

FIELD

The present application relates to communications systems and more particularly to methods and apparatus related to residential gateway support for L4S Service.

BACKGROUND

The 5G System (5GS) architecture is designed to support a wide variety of services, including media services. 3rd Generation Partnership Project (3GPP) Rel-18 completed a study item related to support of advanced media services, e.g., High Data Rate Low Latency (HDRLL) services, Augmented Reality/Virtual Reality/Extended Reality (AR/VR/XR) services and tactile/multi-modality communication services.

Ref: 3GPP TS 23.501 V18.3.0 clause 5.37.3 titled Support of ECN marking for L4S to expose the congestion information discusses L4S marking. 3GPP TS 23.501 V18.3.0 (September 2023), which is hereby expressly incorporated by reference in its entirely, refers to various IETF RFC (Request For Comments). IETF RFC 9330 titled Low Latency, Low Loss, and Scalable Throughput (LAS) Internet Service: Architecture (January 2023), IETF RFC 9331 titled "The Explicit Congestion Notification (ECN) Protocol for Low Latency, Low Loss, and Scalable Throughput (L4S)" (January 2023) and IETF RFC 9332 titled "Dual-Queue Coupled Active Queue Management (AQM) for Low Latency, Low Loss, and Scalable Throughput (L4S)" (January 2023). Each of the preceding RFCs is hereby expressly incorporated by reference in their entirety. L4S exposes congestion information by marking ECN bits in the IP header of the user IP packets between the UE and the application server to trigger application layer rate adaptation.

In 5G System, ECN marking for L4S may be supported. ECN marking for L4S is enabled on a per Quality of Service (QOS) Flow basis in the uplink (UL) and/or downlink (DL) direction and may be used for Guaranteed Bit Rate (GBR) and non-GBR QoS Flows. ECN marking for the LAS in the Internet Protocol (IP) header is supported in either the Next Generation Radio Access Network (NG-RAN) (see clause 3GPP TS 23.501 5.37.3.2 and TS 38.300 v17.6.0 (September 2023) which is hereby incorporated by reference in its entirety, or in the PDU Session Anchor (PSA) User Plane Function (UPF) (see 3GPP TS 23.501 clause 5.37.3.3).

Whether NG-RAN or PSA UPF based ECN marking for L4S is used is decided by Session Management Function (SMF) based on operator's network configuration and policies. In the case of ECN marking for L4S by UPF, the NG-RAN is instructed to perform congestion information monitoring.

As for any QoS flow, QoS rules in the user equipment (UE) and Packet Drop Rates (PDRs) in the PSA UPF control which packets are bound to the LAS enabled QoS flow. The Packet Filter Set in the QoS rule or PDR can use packet filter(s) in clause 5.7.6.2 (e.g. ECT(1) and/or IP 5 tuple) to steer traffic to an L4S enabled Qos Flow.

A QOS flow may be enabled with ECN marking for L4S requirement e.g. statically when a PDU session is established based on configuration in SMF or Policy Control Function (PCF), or dynamically based on detection of the LAS traffic e.g. via ECT(1) and/or IP 5 tuple in the IP header whereby SMF or PCF triggers a setup of a QoS Flow enabled for LAS, or by requests by an Application Function (AF).

To support LAS, it would be desirable if a residential gateway could support LAS capabilities, e.g., ECN marking related functionality.

SUMMARY

Methods and apparatus related to residential gateway (RG), e.g., 5G-RG, support for L4S are described. A RG indicates its support for ECN marking for L4S in uplink and/or downlink via a PDU Session Request message, e.g., a PDU Session Establishment Request message, communicated from the RG via a wireline access gateway function (W-AGF) to a core network, e.g., a 5GC. In some embodiments, the indication can be provided in either: a Session Management (SM) capability field, e.g., a 5GSM capability field, or as a new indication which is included as part of a N1 SM container. A RG may, and sometimes does, determine congestion in its buffers and/or queues and perform ECN marking and report if traffic congestion is being experienced within its own buffers and/or queues for uplink and/or downlink traffic. In some such embodiments, both an RG and a W-AGF can, and sometimes do, perform ECN marking for L4S simultaneously in both directions (i.e. uplink and downlink).

An exemplary communications method, in accordance with some embodiments, comprises: operating a residential gateway (RG) to communicate to a wireline access gateway function (W-AGF) a first protocol data unit (PDU) session request message, said PDU session request message including RG LAS (Low Latency Low Loss and Scalable Throughput) capability information in at least one of: i) a capability field including an indication of support by the RG for L4S or ii) a N1 SM (session management) container including an indication of support by the RG for LAS; and operating the RG to receive a response message in response to the first PDU session request message.

While various features are discussed in the above summary, all features discussed above need not be supported in all embodiments and numerous variations are possible. Additional features, details and embodiments are discussed in the detailed description which follows.

BRIEF DESCRIPTION OF THE FIGURES

FIG. 3 comprises the combination of FIG. 3A, FIG. 3B and FIG. 3C.

FIG. 4 comprises the combination of FIG. 4A, FIG. 4B, FIG. 4C and FIG. 4D.

FIG. 12 is a flowchart of an exemplary communication method, which may be performed by a communications system in accordance with an exemplary embodiment, said exemplary method including operating a resident gateway (RG), e.g., a 5G-RG supporting LAS ECN marking, to communicate a request with an indication of L4S support, via a 3GPP access network, to a core network.

FIG. 13 is a flowchart of an exemplary communication method, which may be performed by a communications system in accordance with an exemplary embodiment, said exemplary method including operating a resident gateway (RG), e.g., a 5G-RG, supporting L4S ECN marking, to communicate a request with an indication of L4S support, via a wireline access gateway function (W-AGF), to a core network.

DETAILED DESCRIPTION

Figure 1:
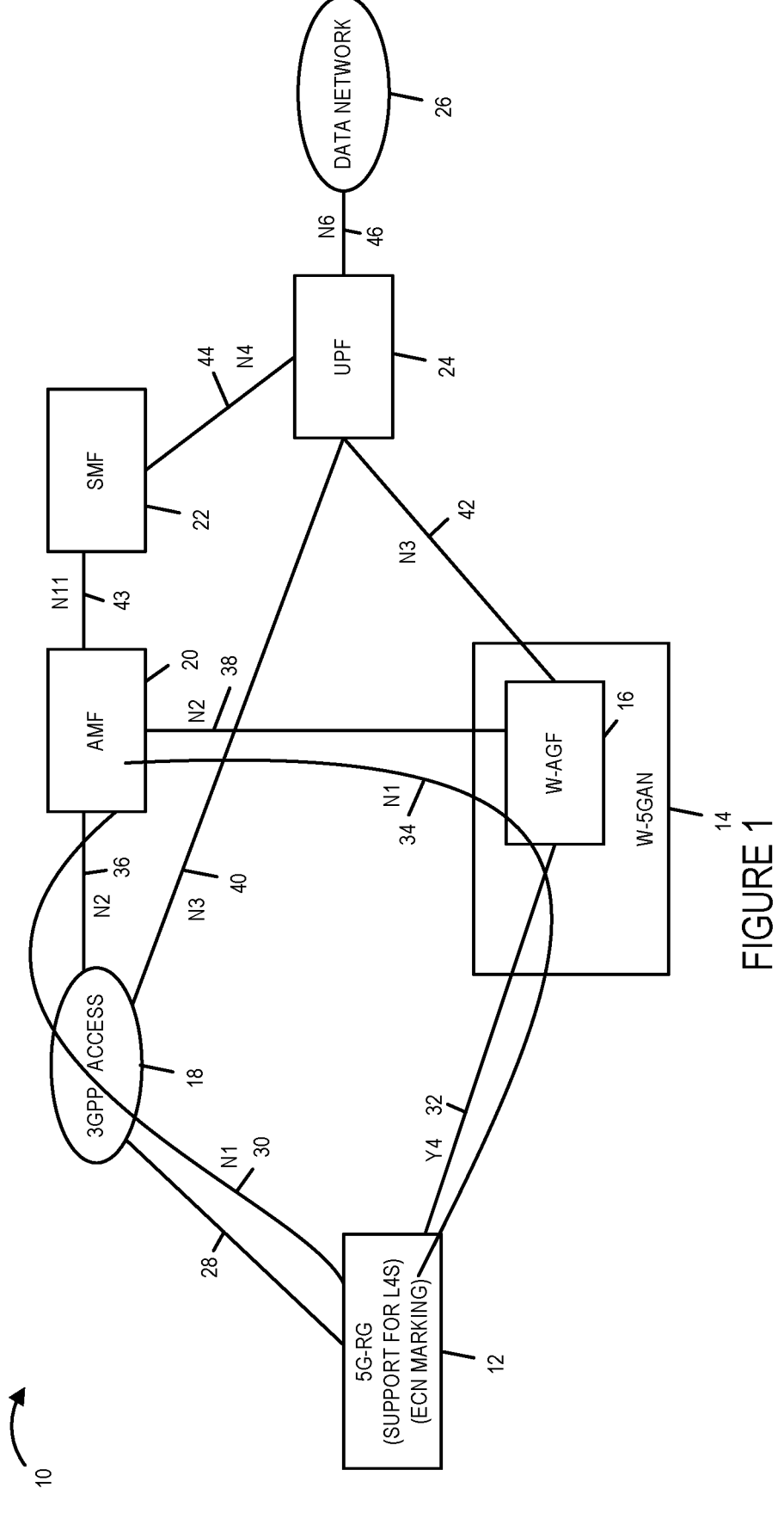
FIG. 1 is a high level drawing of a non-roaming architecture reference model for 5GC (5G Core Network) for 5G-RG (5G-Residential Gateway) with Wireline 5G Access network and NG RAN (Next Generation Radio Access Network), in accordance with an exemplary embodiment of the invention.

FIG. 1 is a high level drawing of a non-roaming architecture reference model 10 for 5GC (5G Core Network) for 5G-RG (5G-Residential Gateway) with Wireline 5G Access network and NG RAN (Next Generation Radio Access Network), in accordance with an exemplary embodiment of the invention. Architecture reference model 10 includes a 5G-RG 12 including support for L4S ECN markings, W-5GAN (wireline-5G access network) 14 including W-AGF (wireline-access gateway function) 16, 3GPP access network 18, access and mobility management function (AMF) 20, session management function (SMF) 22, user plane function (UPF) 24, and data network (DN) 26 coupled together as shown. Connection 28 couples 5G-RG 12 to 3GPP access network 18. Y4 connection 32 couples the 5G-RG 12 to the W-AGF 16 of the W-5GAN 14. N1 interface connection 30 couples the 5G-RG 12 to the AMF 20, via the 3GPP access network 18. N1 interface connection 34 couples the 5G-RG 12 to the AMF 20, via the W-AGF 16. N2 interface connection 36 couples the 3GPP access network 18 to the AMF 20. N2 interface connection 38 couples the W-AGF 16 to the AMF 20. N3 interface connection 40 couples the 3GPP access network 18 to the UPF 24. N3 interface connection 42 couples the W-AGF 16 to the UPF 24. N11 interface connection 43 couples the AMF 20 to the SMF 22. N4 interface connection 44 couples the SMF 22 to the UPF 24. N6 interface connection 46 couples the UPF 46 to the DN 26.

References to RFCs or various standards in the detailed description are to the versions mentioned in the background and which are hereby expressly incorporated by reference unless indicated otherwise.

The 5G-RG 12 can be connected to 5GC via W-5GAN 14, or via NG RAN, e.g., 3GPP access network 18, or via both access networks.

The reference architecture 10 shown in FIG. 1 shows the architecture and the network functions directly connected to Wireline 5G Access Network 14, and other parts of the architecture are the same or similar to those as defined in clause 4.2 of 3GPP TS 23.501 V18.3.0.

The reference architecture in FIG. 1 supports service based interfaces for AMF 20, SMF 22 and other NFs not represented or shown in the figure.

The two N2 instances (36, 38) in FIG. 1 apply to a single AMF 20 for a 5G-RG 12 which is simultaneously connected to the same 5G Core Network over 3GPP access 18 and Wireline 5G Access Network 14.

The two N3 instances (40, 42) in FIG. 1 may apply to different UPFs when different PDU Sessions are established over 3GPP access 18 and Wireline 5G Access Network 14.

The current landscape of L4S support in 3GPP, currently specifies (R)AN (i.e., gNB) reporting congestion information to 5G Core as well as performing ECN marking.

3GPP R18 also supports the 5G Core's PSA UPF performing ECN marking based on information received from the (R)AN (i.e., gNB). In some service provider deployment scenarios, the gNB (i.e., Citizens Broadband Radio Service (CBRS) capable gNB) & Data Over Cable Interface Specification (DOCSIS) network are integrated within a strand mount and connected to a 5G Core.

In 3GPP R18, 5G-RG support for L4S (i.e., ECN marking within 5G-RG) is not specified or addressed.

Figure 2:
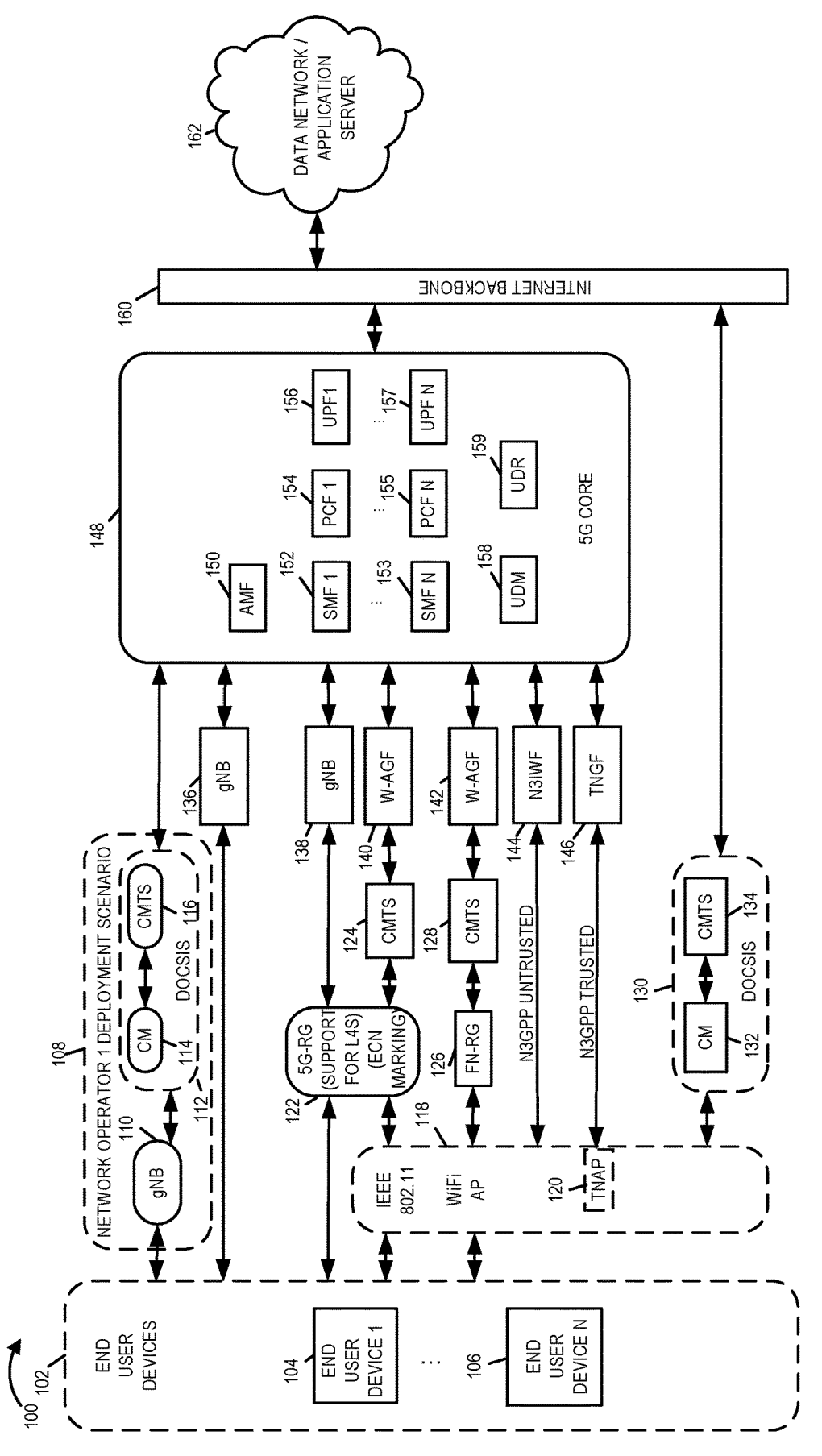
FIG. 2 is a drawing of an exemplary communications system in accordance with an exemplary embodiment.

FIG. 2 is a drawing of an exemplary communications system 100 in accordance with an exemplary embodiment. Exemplary communication system 100 includes end user devices 102, a gNB 110, a Data Over Cable Service Interface Specification (DOCSIS) network 112, a gNB 136, a 5G Residential Gateway (5G-RG) 122, a gNB 138, a IEEE 802.11 WiFi access point (AP) 118, a Cable Modem Termination System (CMTS) 124, a Wireline Access Gateway Function (W-AGF) 140, a Fixed Network Residential Gateway (FN-RG) 126, a CMTS 128, a W-AGF 142, a non-3GPP interworking function (N3IWF) 144, a Trusted Non-3GPP Gateway Function (TNGF) 146, 5G core network 148, a DOCSIS network 130, a Internet backbone 160 and a data network/application server 162, coupled together as shown.

In one exemplary embodiment, 5G-RG 122 of FIG. 2 is a 5G-RG 12 of FIG. 1; gNB 138 of FIG. 2, which is a 3GPP RAN (radio access network) is 3GPP access network 18 of FIG. 1; W-AGF 140 of FIG. 2 is W-AGF 16 of W-5GAN 14 of FIG. 1; AMF 150 of FIG. 2 is AMF 20 of FIG. 1; SMF 1 152 of FIG. 2 is SMF 22 of FIG. 1; UPF 1 156 of FIG. 2 is UPF 24 of FIG. 1; and data network 162 of FIG. 2 is data network 26 of FIG. 1. In various embodiments, exemplary communications system 100 includes a plurality of 5G-RGs, 5G-RG 122 being one of the plurality of 5G-RGs, and at least some of the plurality of 5G-RGs include support for LAS ECN marking.

End user devices 102 includes a plurality of end user devices (end user device 1 104, . . . , end user device N 106). The end user devices (end user device 1 104, . . . , end user device N 106), include, e.g., user equipment (UE) devices, cell phones, laptops, notepad devices, desktop PCs, gaming devices, WiFi end user devices, end user devices supporting 3GPP access, end user devices supporting non-3GPP access, IoT devices, etc. An end user device may, and sometimes does, support multiple access technologies, protocols and/or communications bands. Some end user devices support 3GPP access. Other end user devices support one or more types of non-3GPP access. Still other end user devices support both 3GPP access and non-3GPP access. The end user devices (end user device 1 104, . . . , end user device N 106) may, and sometimes do include applications which require LAS. The gNB 110 and DOCSIS network 112 are part of a network operator 1 deployment scenario 108. The DOCSIS network 112 includes a Cable Modem (CM) 114 and a CMTS 116 coupled together. WiFi AP 118 includes a Trusted Non-3GPP Access Point (TNAP) 120 which is coupled to Trusted Non-3GPP Gateway Function (TNGF) 146. DOCSIS 130 includes CM 132 and CMTS 134 coupled together. 5G core 148 includes access and mobility management function (AMF) 150, a plurality of session management functions (SMFs) (SMF 1 152, . . . , SMF N 153), a plurality of policy control functions (PCFs) (PCF 1 154, . . . , PCF N 155), a plurality of user plane function (UPFs) (UPF1 156, . . . , UPF N 157), a unified data management (UDM) 158, and a unified data repository (UDR) 159.

The 5G-RG 122 appears to the 5G network core 148 as a user equipment (UE).

Exemplary system 100 supports Low Latency, Low Loss and Scalable Throughput services (LAS). In system 100 Explicit Congestion Notification (ECN) marking is used for the purpose of L4S when congestion is detected in the uplink path and downlink path so that the application layer can trigger real-time and gradual rate adaptation of the real-time video encoder based on ECN feedback.

In accordance with a feature of the present invention, RGs e.g., 5G-RG 122, can be enabled to, and sometimes do, detect for congestion at the RG (in its UL and/or DL traffic data buffers (queues)), and perform ECN markings, in addition to (R)ANs, e.g., gNBs. In some embodiments, of the present invention additional devices, e.g., additional devices including data buffers (queues) and/or traffic schedulers, can be, and sometimes are enabled to, and sometimes do detect for congestion, and perform ECN markings. Such additional devices include, e.g., UPFs (e.g., UPF1 156 and/or UPF N 157), a N3IWF 144, TNGF 146, and W-AGFs 140, 142.

In 3GPP R18 specifications thus far, the 5GS provides whether congestion was experienced in the uplink and/or downlink of the NG-RAN only. 3GPP specifies support for providing differentiated services for devices behind a 5G-RG but does not address support for ECN marking for LAS in the 5G-RG.

It is also possible to experience congestion in the uplink and/or downlink when the devices' traffic is routed through a 5G-RG. Any node within 5GS that maintains traffic buffer queues and schedules transmission of traffic may also experience congestion and thus should be able to indicate and perform ECN marking independent of NG-RAN.

It is possible for the 5G-RG to determine congestion in its queue and perform similar functions as the NG-RAN. Therefore, in accordance with some embodiments of the present invention, support is allowed for a 5G-RG to perform ECN marking and report if traffic congestion is experienced within its own buffers/queues for uplink and/or downlink traffic.

Some solution aspects, in accordance with the present invention, include:

One option is for the 5G-RG to indicate its support for ECN marking for LAS in uplink and/or downlink traffic via PDU Session Establishment Request message. This indication can be provided in either the 5GSM Capability field or as a new indication as part of N1 SM container.

An alternative option is that the 5G-RG has a new subscription called "5G-RG LAS information" which is stored in the UDM and/or UDR (and accessed by the UDM).

This solution supports both the (R)AN and 5G-RG performing ECN marking for L4S simultaneously in both directions (i.e., uplink and downlink).

In case the PSA UPF performs the ECN marking based on the congestion information received from the (R)AN, the 5G-RG may share its congestion information with the (R)AN. Then the (R)AN may share the congestion information with the PSA UPF by making use of 5G-RG's congestion information and/or its own congestion information. In some embodiments, including at least one exemplary implementation of the embodiment shown in FIG. 11, the congestion information which is shared includes a percentage of congestion being experienced by the device supplying, e.g., reporting the congestion information, with separate congestion information being provided for the uplink and downlink. Thus, in some embodiments an uplink congestion value and a downlink congestion value is provided by the device sharing its congestion information. In some embodiments a residential gateway, e.g. a 5G-RG, and/or a 3GPP (R)AN, e.g., a gNB, will send over their congestion information, e.g., percentage of congestion being encountered at the reporting device, to the PSA UPF.

The solution, in accordance with the present invention, allows for the RG to perform ECN marking for L4S in both UL and DL as well as providing an indication of 5G-RG support for ECN marking for L4S and/or subscription for the 5G-RG LAS information.

The solution may, and sometimes does include, either or both alternatives, e.g., solution aspects 1 and 2 above, being implemented. How the 5G-RG performs ECN marking for L4S is implementation specific. How the 5G-RG detects congestion and provides to 5GC can be implementation specific.

Implementation of the solution, in accordance with the present invention, involves updates, e.g., revisions, to 3GPP R18 specifications to add support for 5G-RG to performing ECN marking according to IETF RFC 9330 and IETF RFC 9331 for uplink and downlink IP layer of the received packets based on internal determined methods to obtain congestion information.

FIG. 3 is a modified version of FIG. 4.3.2.2.1-1 of 3GPP TS 23.502 V18.3.0 (September 2023) clause 4.3.2.2, which includes new features in accordance with the present invention.

Figure 3A:
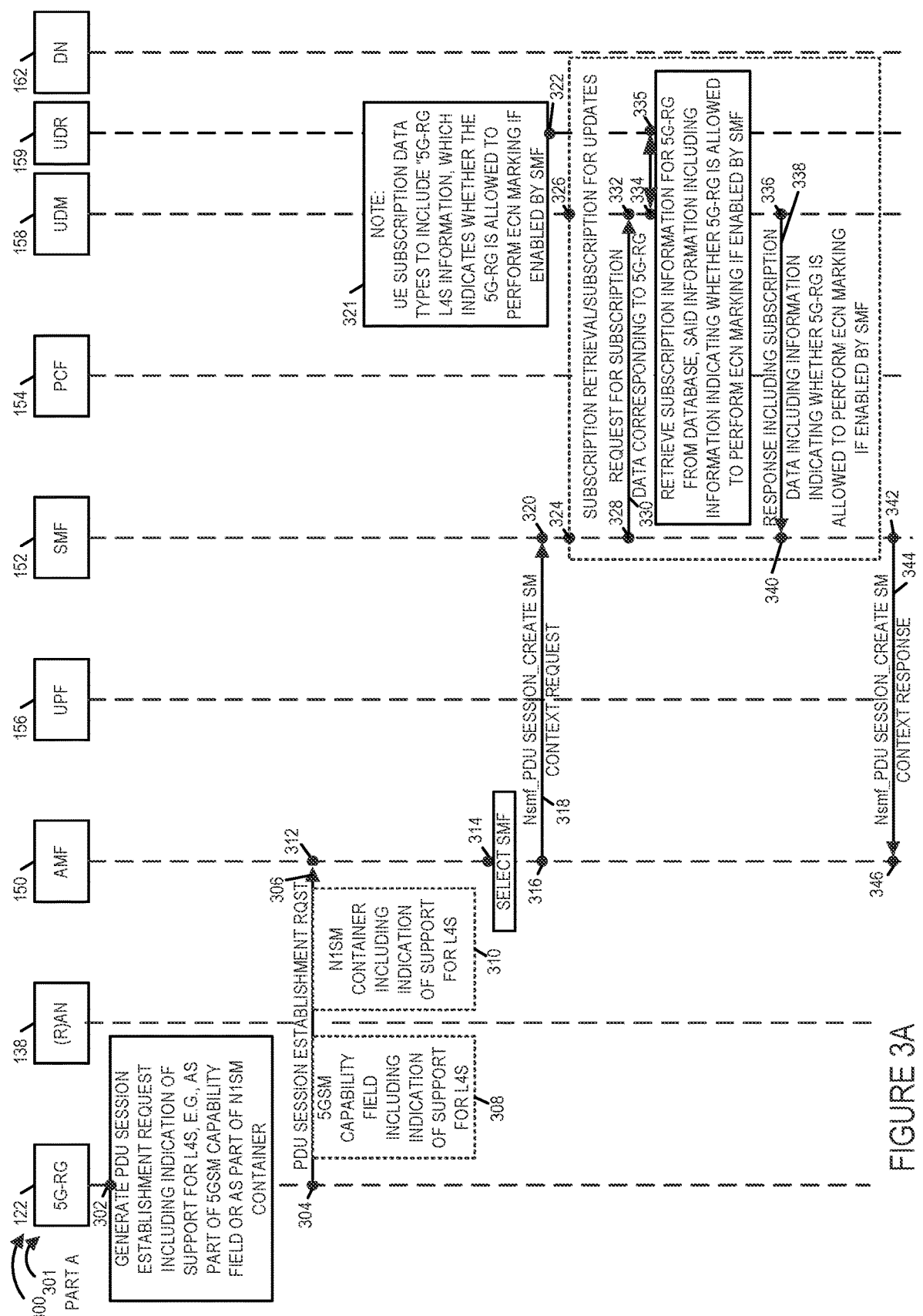
FIG. 3A is a first part of a signaling diagram of exemplary 5G-RG requested PDU Session Establishment, in accordance with an exemplary embodiment.
Figure 3B:
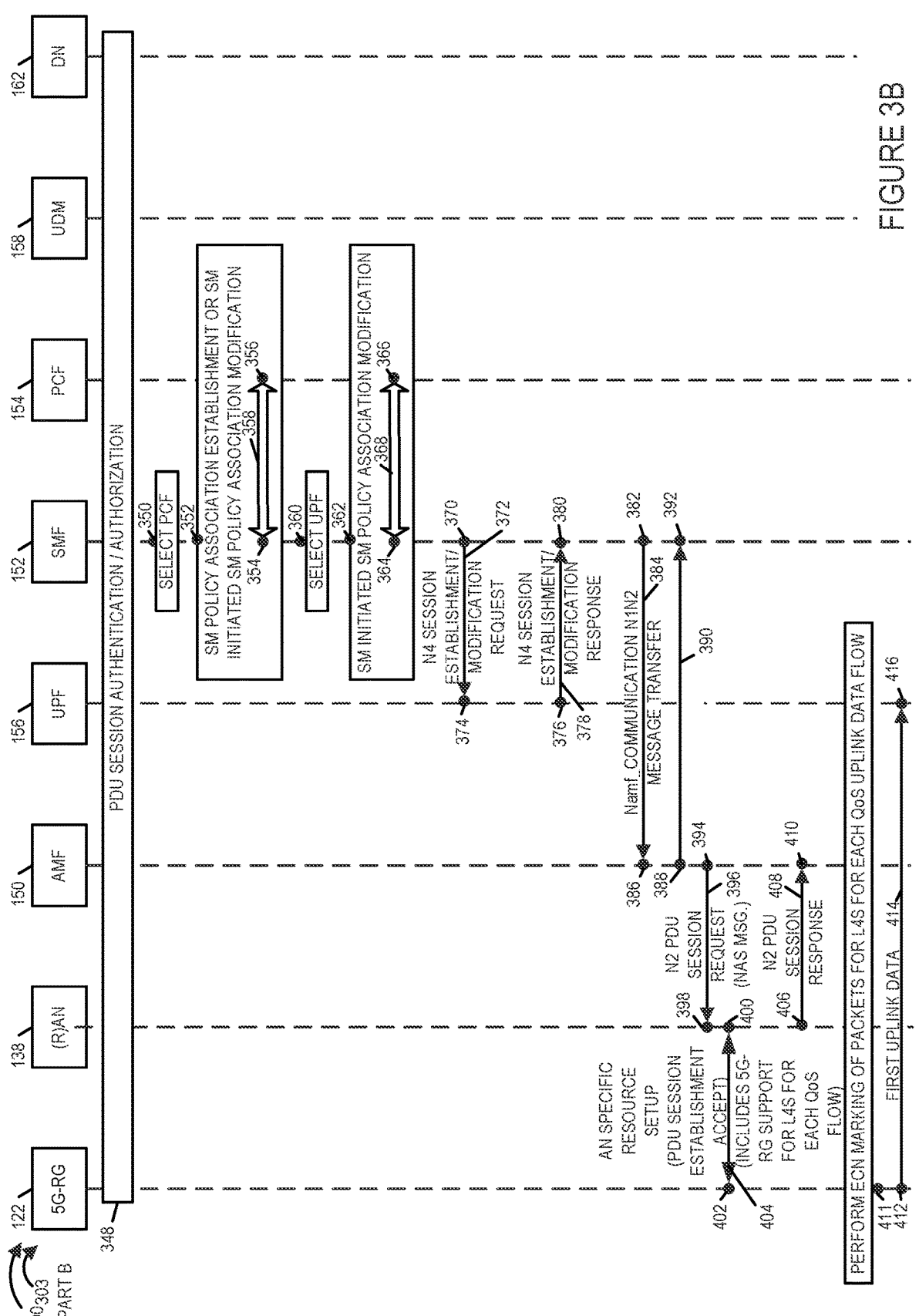
FIG. 3B is a second part of a signaling diagram of exemplary 5G-RG requested PDU Session Establishment, in accordance with an exemplary embodiment.
Figure 3C:
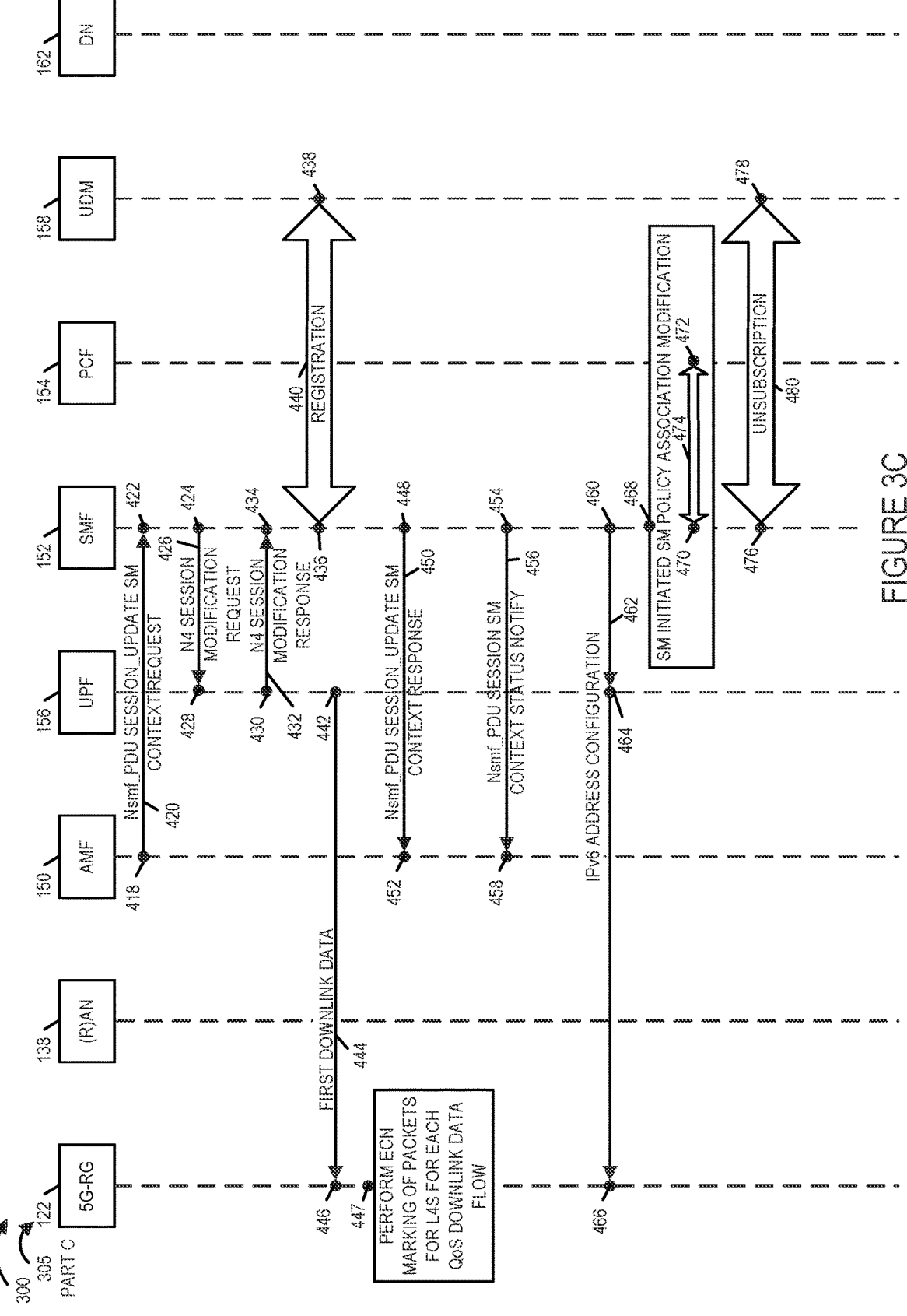
FIG. 3C is a third part of a signaling diagram of exemplary 5G-RG requested PDU Session Establishment, in accordance with an exemplary embodiment.
Figure 4A:
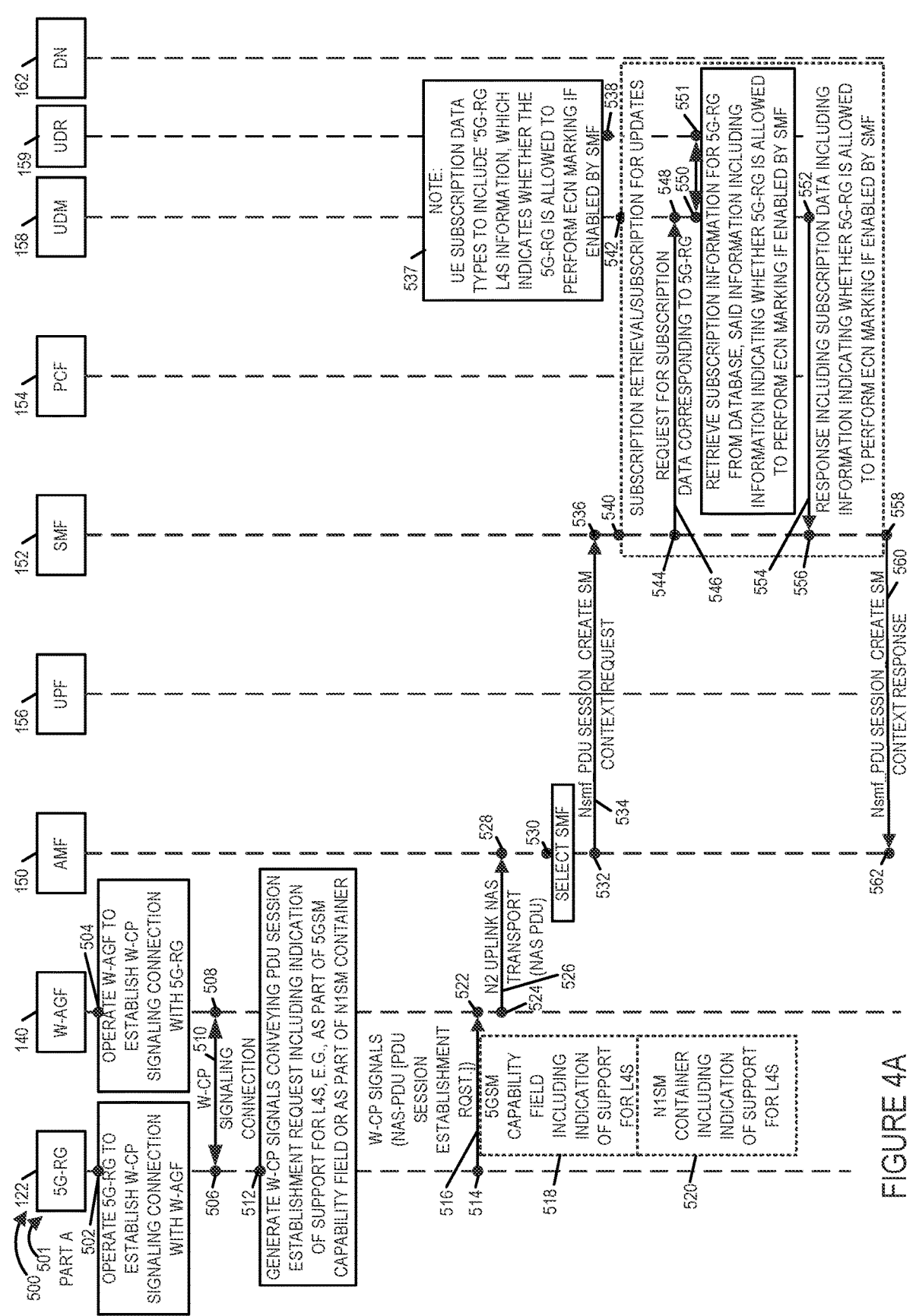
FIG. 4A is a first part of a signaling diagram of exemplary 5G-RG PDU Session Establishment via wireline 5G access network (W-5GAN), in accordance with an exemplary embodiment.
Figure 4B:
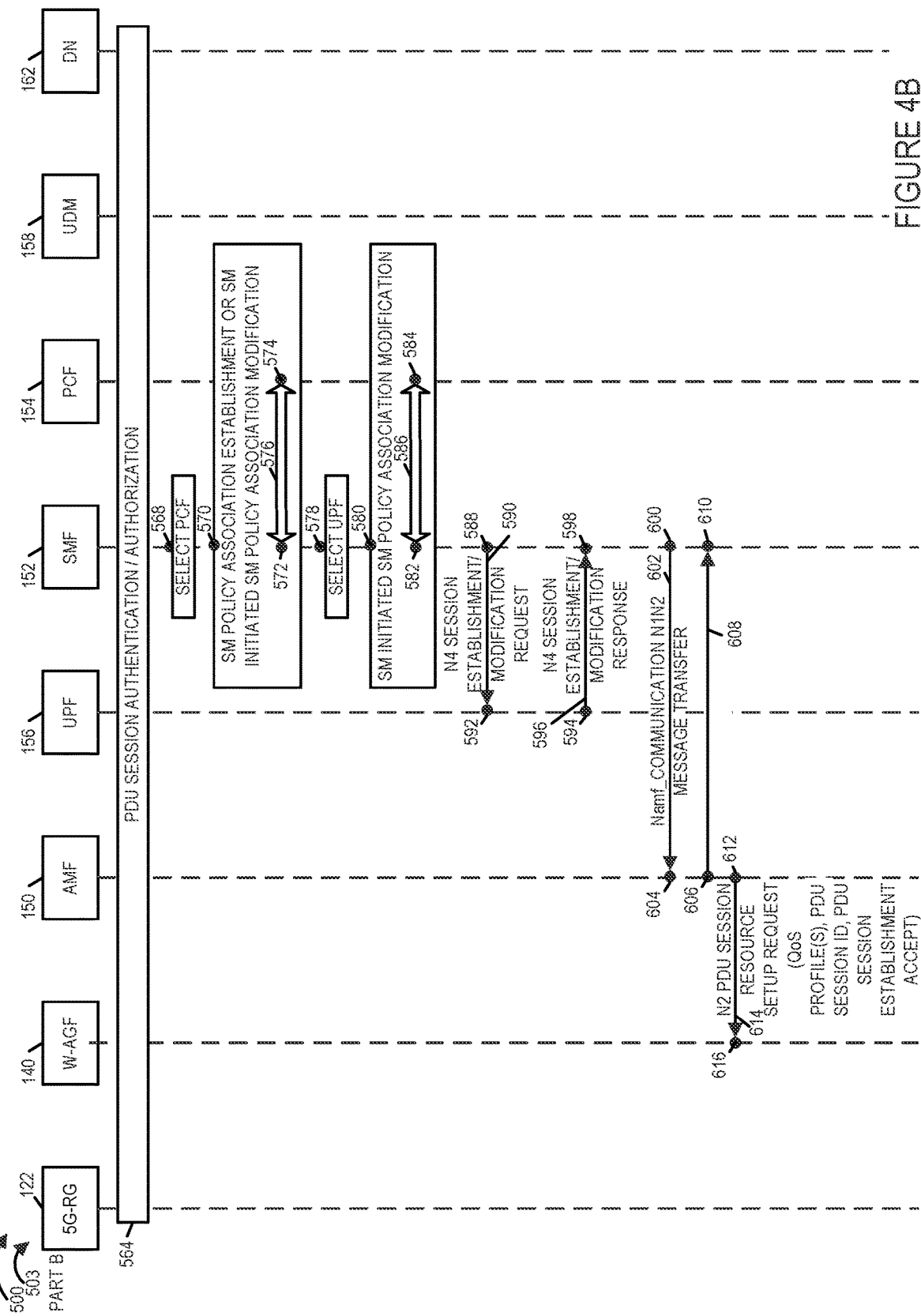
FIG. 4B is a second part of a signaling diagram of exemplary 5G-RG PDU Session Establishment via W-5GAN, in accordance with an exemplary embodiment.
Figure 4C:
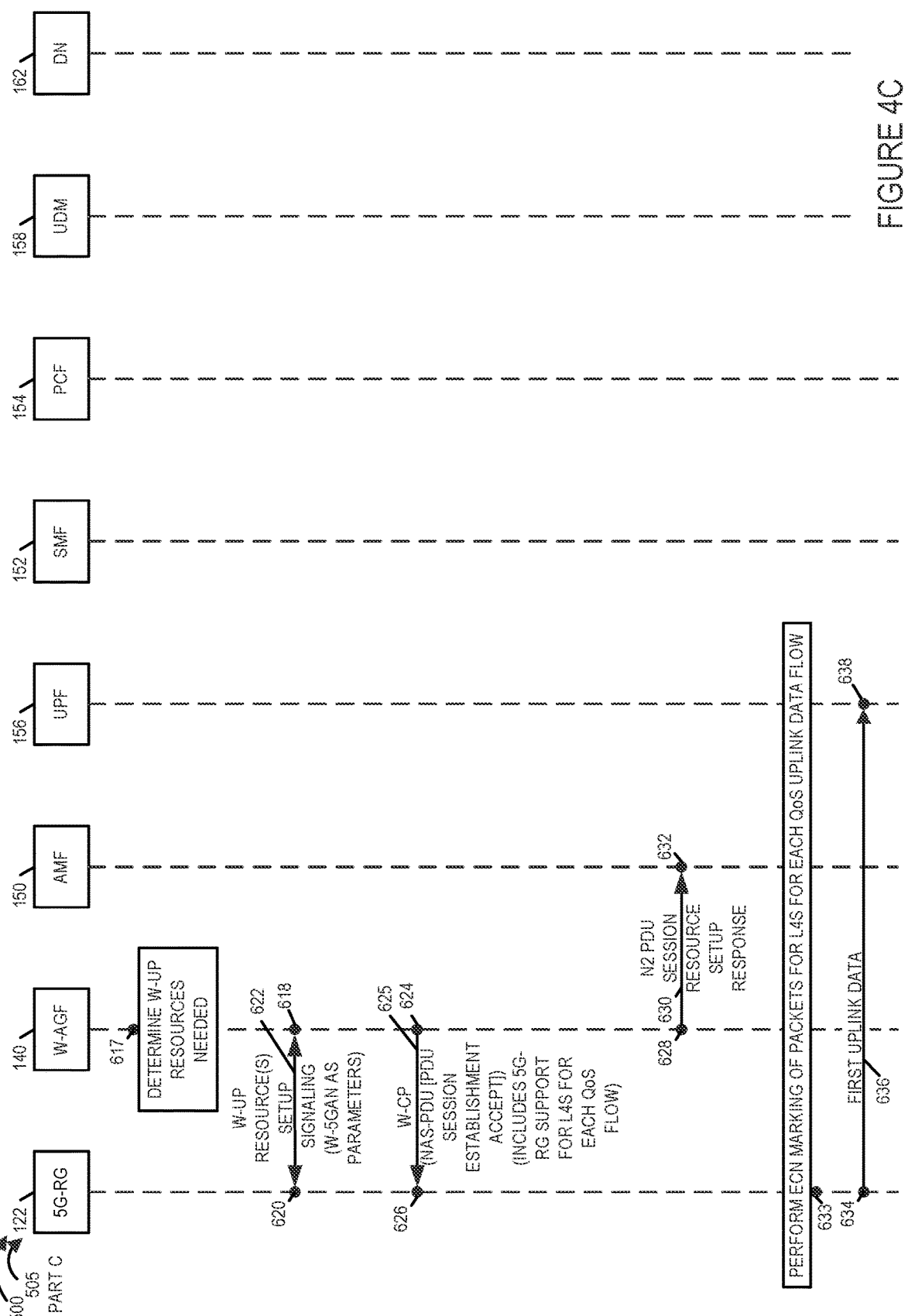
FIG. 4C is a third part of a signaling diagram of exemplary 5G-RG PDU Session Establishment via W-5GAN, in accordance with an exemplary embodiment.
Figure 4D:
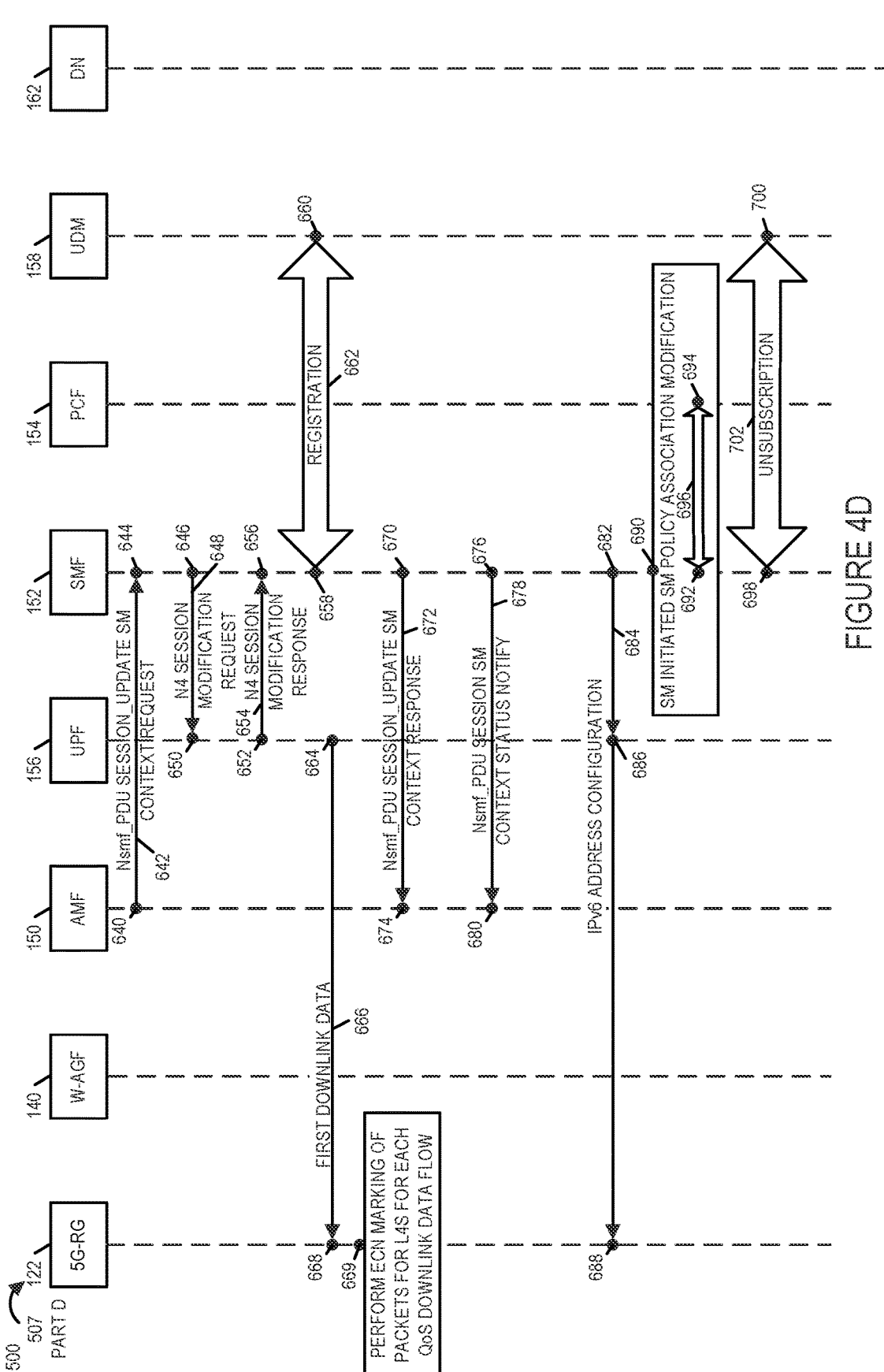
FIG. 4D is a fourth part of a signaling diagram of exemplary 5G-RG PDU Session Establishment via W-5GAN, in accordance with an exemplary embodiment.

FIG. 3, comprising the combination of FIG. 3A, FIG. 3B and FIG. 3C, is a signaling diagram 300, comprising Part A 301, Part B 303 and Part C 305, of exemplary 5G-RG requested PDU Session Establishment, in accordance with an exemplary embodiment.

In step 302 5G-RG 122 generates a PDU session establishment request 306 including an indication of support for LAS, e.g. as part of a 5GSM (5G Session Management) capability information field or as part of a N1 SM (session management) container. In step 304 5G-RG 122 sends the generated PDU session establishment request 306, via (R)AN 138, to AMF 150. The PDU session establishment request message 306 includes a 5GSM capability field including an indication of support for LAS 308 or a N1 SM container including an indication of support for L4S 310. In step 312 AMF 150 receives the PDU session establishment request 306 and recovers the communicated information.

In step 314 AMF 150 selects a SMF, e.g., AMF 150 selects SMF 152 from a plurality of SMFs (SMF 1 152, . . . , SMF N 153). In step 316, AMF 150 generates and sends Nsmf_P-DUSession_CreateSMContext request message 318 to SMF 152, which receives message 318 in step 320 and recovers the communicated information.

Note 321 indicates that UE subscription data types include "5G-RG LAS information", which indicates whether the 5G-RG is allowed to perform ECN making if enabled by the SMF. In step 322, which is performed prior to step 324 (e.g., in some embodiments step 322 is performed prior to step 302), UDR 159 stores UE subscription data corresponding to 5G-RG 122, said subscription data including 5G-RG LAS information indicating whether or not the 5G-RG 122 is allowed to perform ECN marking if enabled by SMF. For this example, consider that the stored 5G-RG L4S information corresponding to 5G-RG 122 indicates that 5G-RG 122 is allowed to perform ECN marking if enabled by SMF.

In steps 324 and 326, the SMF 152 and UDM 158 perform operations for subscription retrieval/subscription for updates.

In step 328 SMF 152 generates and sends a request 330 for subscription data corresponding to 5G-RG 122. In step 332, UDM 158 receives the request 330. In steps 334 and 335, the UDM 158 and UDR 159 perform operations in which the UDM 158 retrieves subscription information for 5G-RG 122 from database of UDR 159, said retrieved subscription information including information indicating whether the 5G-RG 122 is allowed to perform ECN marking if enabled by SMF. In step 336, UDM 158 generates and sends response 338 to SMF 152, said response including subscription information indicating whether 5G-RG 122 is allowed to perform ECN marking if enabled by SMF, e.g., the response includes information indicating that 5G-RG 122 is allowed to perform ECN marking if enabled by SMF.

In step 342, SMF 152 generates and sends Nsmf_P-DUSession_CreateSMContext response message 344 to AMF 150, which receives the message 344 in step 346 and recovers the communicated information.

In step 348, elements of the communications system, perform operations for PDU session authentication and authorization.

Following successful authentication and authorization, in step 350 SMF 152 selects a PCF, e.g., selects PCF 154 from among a plurality of PCFs (PCF 1 154, . . . , PCF N 155), e.g., SMF 152 selects PCF 154 which support L4S.

In step 352 SMF 152 interacts with PCF 154 for SM policy association establishment or to perform and SM initiated SM policy association modification. In steps 354 and step 356, SMF 152 and PCF 154, respectively, communicate signals 358 for the SM policy association establishment or for the SM policy association modification.

In step 360, the SMF 152 selects a UPF, e.g. selects UPF 156 from among a plurality of UPFs (UPF 1 156, . . . , UPF N 157), as the PSA UPF for the PDU session, e.g., SMF select UPF 156 which supports LAS.

In step 362 SMF 152 initiates a SM policy association modification. In steps 364 and step 366, SMF 152 and PCF 154, respectively, communicate signals 368 for the SM policy association modification.

In step 370 SMF 152 generates and sends a N4 session establishment/modification request message 372 to UPF 156, which receives message 372 in step 374 and recovers the communicated information. In step 376 UPF 156 generates and sends N4 session establishment/modification response message 378 to SMF 152, which receives message 378 in step 380 and recovers the communicated information.

In step 382 SMF 152 generates and sends Namf_Communication_NIN2MessageTransfer 384 to AMF 150, which receives the message transfer 384 in step 386 and recovers the communicated information. In step 388, the AMF 150 sends a response message 390 to the SMF 152 in response to the message transfer 384.

In step 394, AMF 150 generates and sends a N2 PDU session request 396 including a NAS message to (R)AN 138, which receives request 396 in step 398 and recovers the communicated information. In steps 400 and 402 the (R)AN 138 and the 5G-RG 122, respectively, perform operations for an AN specific resource setup. These operations include signaling including communicating a PDU session establishment accept which includes information indicating 5G-RG support for L4S for each QoS flow.

In step 406, (R)AN 138 generates and sends a N2 PDU session response message 408 to AMF 150, which receives message 408 in step 410 and recovers the communicated information.

In step 411 5G-RG 122 performs ECN (Explicit Congestion Notification) marking of packets for L4S for each QoS uplink data flow. In step 412 5G-RG 122 generates and sends first uplink data 414 to UPF 156, which is received in step 416 by the UPF 156.

In step 418 the AMF 150 generates and sends Nsmf_PDUSession_UpdateSMContext request message 420 to SMF 152, which receives message 420 in step 422 and recovers the communicated information.

In step 424, SMF 152 generates and sends a N4 session modification request message 426 to UPF 156, which receives message 426 in step 428 and recovers the communicated information. In step 430 UPF 156 generates and sends a N4 session modification response message 432 to SMF 152, which receives message 432 in step 434 and recovers the communicated information.

In steps 436 and 438 SMF 152 and UDM 438 communicate registration signals 440.

In step 442 UPF 156 generates and sends first downlink data 444 to 5G-RG 122, which receives the first downlink data 444 in step 446. In step 447 5G-RG 122 performs ECN (Explicit Congestion Notification) marking of packets for L4S for each QoS downlink data flow.

In step 448, SMF 152 generates and sends a Nsmf_PDUSession_UpdateSMContext response message 450 to AMF 150, which receives the message 450 in step 452 and recovers the communicated information. In step 454, SMF 152 generates and sends a Nsmf_PDUSession_SMContextStatusNotify message 456 to AMF 150, which receives the message 456 in step 458 and recovers the communicated information.

In step 460 SMF 152 generates and sends IPv6 address configuration message 462 to UPF 156 and 5G-RG 122. In step 464 UPF 156 receives the IPV6 address configuration message 462 and recovers the communicated information. In step 466 5G-RG 122 receives the IPV6 address configuration message 462 and recovers the communicated information.

In step 468 SMF 152 initiates a SM policy modification. In step 470 and 472, the SMF 152 and PCF 154, communicate signals 474 to implement the SM initiated SM policy association modification. In step 476 and 478 the SMF 152 and UDM 158 communicate unsubscription signals 480.

The procedures in 3GPP TS 23.502 clause 4.3.2.2.1 were modified, in accordance with the present invention, as follows:

Operations, signaling and modifications with regard to steps 302, 304, 312 and message 306 will now be described. From 5G-RG 122 to AMF 150: NAS Message (S-NSSAI(s), [Alternative S-NSSAI], UE Requested DNN, PDU Session ID, Request type, Old PDU Session ID, N1 SM container (PDU Session Establishment Request, [Port Management Information Container])).

In order to establish a new PDU Session, the 5G-RG 122 generates a new PDU Session ID.

The 5G-RG 122 initiates the UE Requested PDU Session Establishment procedure by the transmission of a NAS message 306 containing a PDU Session Establishment Request within the N1 SM container. The PDU Session Establishment Request includes a PDU session ID, Requested PDU Session Type, a Requested SSC mode, 5GSM Capability, PCO, SM PDU DN Request Container, [Number Of Packet Filters], [Header Compression Configuration], UE Integrity Protection Maximum Data Rate, [Always-on PDU Session Requested], [RSN], [Connection Capabilities] and [PDU Session Pair ID], [Indication of support for L4S]. The 5GSM capability information and indication of support for L4S are new in accordance with the present invention.

The Request Type indicates "Initial request" if the PDU Session Establishment is a request to establish a new PDU Session and indicates "Existing PDU Session" if the request refers to an existing PDU Session switching between 3GPP access and non-3GPP access or to a PDU Session handover from an existing PDN connection in EPC. If the request refers to an existing PDN connection in EPC, the S-NSSAI is set as described in clause 5.15.7.2 of 3GPP TS 23.501.

When Emergency service is required and an Emergency PDU Session is not already established, a 5G-RG 122 shall initiate the Requested PDU Session Establishment procedure with a Request Type indicating "Emergency Request".

Operations, signaling and modifications with regard to steps 324 and 326 regarding subscription retrieval/subscription for updates will now be described. If Session Management Subscription data for corresponding SUPI, DNN and S-NSSAI of the HPLMN is not available, then SMF 152 retrieves the Session Management Subscription data using Nudm_SDM_Get (SUPI, Session Management Subscription data, selected DNN, S-NSSAI of the HPLMN, Serving PLMN ID, [NID]) and subscribes to be notified when this subscription data is modified using Nudm_SDM_Subscribe (SUPI, Session Management Subscription data, selected DNN, S-NSSAI of the HPLMN, Serving PLMN ID, [NID]). UDM 158 may get this information from UDR 159 by Nudr_DM_Query (SUPI, Subscription Data, Session Management Subscription data, selected DNN, S-NSSAI of the HPLMN, Serving PLMN ID, [NID]) and may subscribe to notifications from UDR 159 for the same data by Nudr_DM_ subscribe. If a S-NSSAI is subject to network slice usage control and the S-NSSAI is dedicated to a single AF, for a PDU Session for non-roaming subscribers, the UDM 158 may provide a Slice Usage Policy information including whether a network slice is on demand and a PDU Session inactivity timer value as described in clause 5.15.15 of 3GPP TS 23.501.

The SMF 152 may use DNN Selection Mode when deciding whether to retrieve the Session Management Subscription data e.g. if the (selected DNN, S-NSSAI of the HPLMN) is not explicitly subscribed, the SMF 152 may use local configuration instead of Session Management Subscription data.

If the Request Type in message 318, received in step 320 indicates "Existing PDU Session" or "Existing Emergency PDU Session" the SMF 152 determines that the request is due to switching between 3GPP access and non-3GPP access or due to handover from EPS. The SMF 152 identifies the existing PDU Session based on the PDU Session ID. In such a case, the SMF 152 does not create a new SM context but instead updates the existing SM context and provides the representation of the updated SM context to the AMF 150 in the response (message 344).

If the Request Type is "Initial request" and if the Old PDU Session ID is included in Nsmf_PDUSession_CreateSM-Context Request (318), the SMF 152 identifies the existing PDU Session to be released based on the Old PDU Session ID.

Subscription data includes the Allowed PDU Session Type(s), Allowed SSC mode(s), default 5QI and ARP, subscribed Session-AMBR, SMF-Associated external parameters, 5G-RG LAS information. The 5G-RG LAS information included in the subscription data is new, in accordance with a feature of the present invention.

For the UE subscription "5G-RG LAS information", which indicates the 5G-RG 122 is allowed/capable to perform ECN marking, the SMF 152 may use this information to decide whether to enable the 5G-RG 122 to perform the ECN marking for L4S or provide congestion information as part of QoS Monitoring.

Operations, signaling and modifications with regard to steps 382, 386, 388, 392 and messages 384, 390 will now be described. SMF 152 to AMF 150: Namf_Communication_NIN2MessageTransfer (PDU Session ID, N2 SM information (PDU Session ID, QFI(s), QoS Profile(s), CN Tunnel Info, S-NSSAI from the Allowed NSSAI or Partially Allowed NSSAI, Session-AMBR, PDU Session Type, User Plane Security Enforcement information, UE Integrity Protection Maximum Data Rate, RSN, PDU Session Pair ID, TL-Container), N1 SM container (PDU Session Establishment Accept ([QOS Rule(s) and QoS Flow level QoS parameters if needed for the QoS Flow(s) associated with the QoS rule(s)], selected SSC mode, S-NSSAI(s), UE Requested DNN, allocated IPv4 address, interface identifier, Session-AMBR, selected PDU Session Type, [Reflective QOS Timer] (if available), [P-CSCF address(es)], [Control Plane Only indicator], [Header Compression Configuration], [Always-on PDU Session Granted], [Small Data Rate Control parameters], [Small Data Rate Control Status], [Serving PLMN Rate Control], [PVS FQDN(s) and/or PVS IP address(es)], [Non-3GPP QOS Assistance Information Container]))). If multiple UPFs are used for the PDU Session, the CN Tunnel Info contains tunnel information related with the UPFs that terminate N3.

The SMF 152 may provide the SMF derived CN assisted RAN parameters tuning to the AMF 150 by invoking Nsmf_PDUSession_SMContextStatusNotify (SMF derived CN assisted RAN parameters tuning) service. The AMF 150 stores the SMF derived CN assisted RAN parameters tuning in the associated PDU Session context for this RG-5G 122.

The N2 SM information carries information that the AMF 150 shall forward to the (R)AN 138 which includes:

The CN Tunnel Info corresponds to the Core Network address(es) of the N3 tunnel corresponding to the PDU Session. If two CN Tunnel Info are included for the PDU session for redundant transmission, the SMF 152 also indicates the NG-RAN that one of the CN Tunnel Info used as the redundancy tunnel of the PDU session as described in clause 5.33.2.2 of 3GPP TS 23.501.

One or multiple QoS profiles and the corresponding QFIs can be provided to the (R)AN 138. This is further described in clause 5.7 of 3GPP TS 23.501. The SMF 152 may indicate for each QoS Flow whether redundant transmission shall be performed by a corresponding redundant transmission indicator.

The PDU Session ID may be used by AN signaling with the 5G-RG 122 to indicate to the 5G-RG 122 the association between (R)AN resources and a PDU Session for the 5G-RG 122.

A PDU Session is associated to an S-NSSAI of the HPLMN and if applicable, to a S-NSSAI of the VPLMN and a DNN. The S-NSSAI provided to the (R)AN 138, is the S-NSSAI with the value for the Serving PLMN (i.e. the HPLMN S-NSSAI or, in LBO roaming case, the VPLMN S-NSSAI). When Alternative S-NSSAI is received from AMF 150 in step 320, the S-NSSAI provided to the (R)AN 136 is the Alternative S-NSSAI.

User Plane Security Enforcement information is determined by the SMF 152 as described in clause 5.10.3 of 3GPP TS 23.501.

If the User Plane Security Enforcement information indicates that Integrity Protection is "Preferred" or "Required", the SMF also includes the UE Integrity Protection Maximum Data Rate as received in the PDU Session Establishment Request.

The use of the RSN parameter and the PDU Session Pair ID by NG-RAN are described in clause 5.33.2.1 of 3GPP TS 23.501.

For each QoS Flow:

an ECN marking for L4S indicator to (R)AN in the case of ECN marking for L4S in RAN and/or 5G-RG as described in clause 5.37.3 of 3GPP TS 23.501; or a QoS monitoring configuration for congestion information as described in clause 5.45.3 of 3GPP TS 23.501 in the case of ECN marking for L4S by PSA UPF as described in clause 5.37.3 of 3GPP TS 23.501 or QoS monitoring for congestion information as described in clause 5.45.3 of 3GPP TS 23.501.

TL-Container as described in clause 5.28a.2 of 3GPP TS 23.501. If interworking with TSN deployed in the transport network is supported (see clause 4.4.8 of 3GPP TS 23.501), the SMF includes a TL-Container with a get-request to the N2 SM information, as described in clause 5.28a.2 of 3GPP TS 23.501.

The N1 SM container contains the PDU Session Establishment Accept that the AMF 150 shall provide to the 5G-RG 122. If the 5G-RG 122 requested P-CSCF discovery then the message shall also include the P-CSCF IP address (es) as determined by the SMF 152 and as described in clause 5.16.3.4 of 3GPP TS 23.501. The PDU Session Establishment Accept includes S-NSSAI from the Allowed NSSAI or Partially Allowed NSSAI. The S-NSSAI value of the Alternative S-NSSAI is included in the PDU session Establishment Accept if the SMF 152 has received the Alternative S-NSSAI from the AMF 150. For LBO roaming scenario, the PDU Session Establishment Accept includes the S-NSSAI from the Allowed NSSAI or Partially Allowed NSSAI for the VPLMN and also it includes the corresponding S-NSSAI of the HPLMN from the Mapping Of Allowed NSSAI or Mapping Of Partially Allowed NSSAI that SMF 152 received in step 320. If the SMF 152 has received the VPLMN Alternative S-NSSAI from the AMF 150, the PDU Session Establishment Accept includes the VPLMN Alternative S-NSSAI. If the SMF 152 has received the HPLMN Alternative S-NSSAI from the AMF 150, the PDU Session Establishment Accept includes the HPLMN Alternative S-NSSAI.

If the 5G-RG 122 indicated support for LAS (in message 306 received in step 312) and/or a "5G-RG LAS information" subscription is available in the UDM 158, in accordance with a feature of the present invention the N1 SM container carries information that the AMF 150 shall forward to the 5G-RG 122 which includes for each QoS Flow:

> an ECN marking for LAS indicator to 5G-RG 122 in the case of ECN marking for L4S in 5G-RG; or > a QoS monitoring configuration for congestion information in the case of ECN marking for L4S by PSA UPF (156) or QoS monitoring for congestion information.

Operations, signaling and modifications with regard to steps 400, 402 and signaling 404 will now be described. (R)AN 138 to 5G-RG 122: The (R)AN 138 may issue AN specific signaling exchange 404 with the 5G-RG 122 that is related with the information received from SMF 152. For example, in the case of a NG-RAN, an RRC Connection Reconfiguration may take place with the 5G-RG 122 establishing the necessary NG-RAN resources related to the QoS Rules for the PDU Session request received in step 398.

(R)AN 138 also allocates (R)AN Tunnel Info for the PDU Session. In the case of Dual Connectivity, the Master RAN node may assign some (zero or more) QFIs to be setup to a Master RAN node and others to the Secondary RAN node. The AN Tunnel Info includes a tunnel endpoint for each involved (R)AN node and the QFIs assigned to each tunnel endpoint. A QFI can be assigned to either the Master RAN node or the Secondary RAN node and not to both.

If the (R)AN 138 receives two CN Tunnel Info for a PDU session in step 398 for redundant transmission, (R)AN 138 also allocates two AN Tunnel Info correspondingly and indicate to SMF 152 one of the AN Tunnel Info is used as the redundancy tunnel of the PDU session as described in clause 5.33.2.2 of 3GPP TS 23.501.

(R)AN 138 forwards the NAS message (PDU Session ID, N1 SM container (PDU Session Establishment Accept)) provided in step 398 to the 5G-RG 122. (R)AN 138 shall only provide the NAS message to the 5G-RG 122 if the AN specific signaling exchange with the 5G-RG 122 includes the (R)AN resource additions associated to the received N2 command.

If Mobile Initiated Connection Only (MICO) mode is active and the NAS message Request Type in message 306 indicated "Emergency Request", then the 5G-RG 122 and the AMF 150 shall locally deactivate MICO mode.

If the N2 SM information is not included in message 384 received in the step 386, then the following steps 406, 410, 418, 422, 424, 428, 430, 434 are omitted.

If the AMF 150 is running a slice deregistration inactivity timer for the S-NSSAI PDU Session, the AMF 150 stops the timer as described in clause 5.15.15 of 3GPP TS 23.501.

If the 5G-RG 122 is running a slice deregistration inactivity timer for the S-NSSAI of the established PDU Session, the 5G-RG 122 stops the timer as described in clause 5.15.15 of TS 3GPP 23.501.

If 5G-RG 122 indicated support for L4S (in message 306) and/or a "5G-RG L4S information" subscription is available in the UDM 158, in accordance with a feature of the present invention the N1 SM container carries information to the 5G-RG 122 which includes for each QoS flow:

> an ECN marking for L4S indicator to 5G-RG in the case of ECN marking for L4S in 5G-RG; or > a QoS monitoring configuration for congestion information in the case of ECN marking for L4S by PSA UPF or QoS monitoring for congestion information.

> Note: in the scenario where the 5G-RG is connected to the 5GC via NG-RAN, QOS congestion information monitoring is sent over the Uu reference point and possibly carried as an SDAP message from 5G-RG 122 to NG-RAN 138.

> Note: in the scenario where the 5G-RG 122 is connected to the 5GC via W-AGF 140, QOS congestion information monitoring is sent over the Y4 reference point and is implementation specific.

Figure 7:
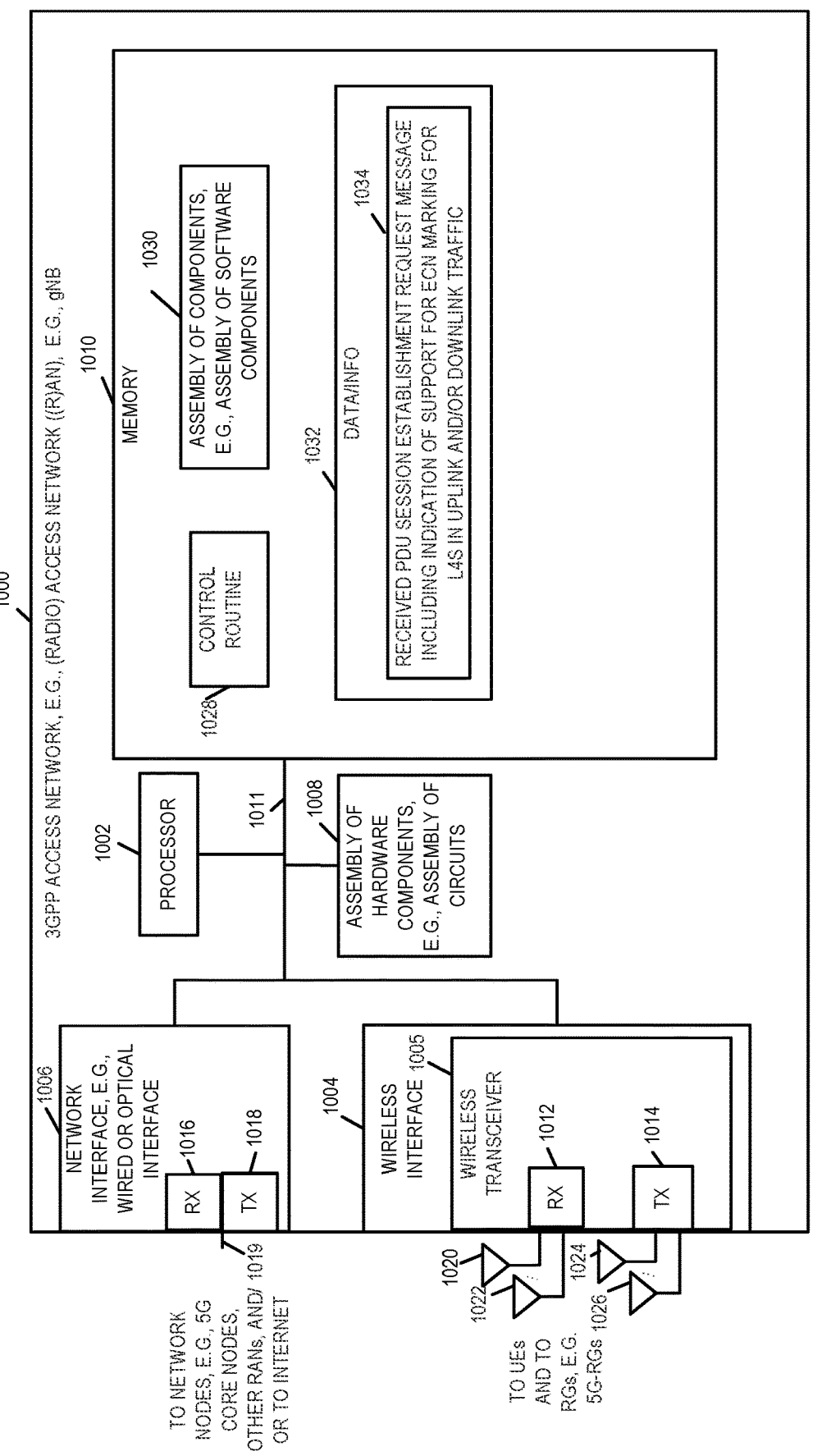
FIG. 7 is a drawing of an exemplary 3GPP access network, sometimes also referred to as a radio access network (RAN), e.g., a gNB, in accordance with an exemplary embodiment.

FIG. 4 is a modified version, in accordance with an exemplary embodiment of the present invention, of FIG. 7.3.1.1-2 of 3GPP TS 23.316 clause 7.3.1, which illustrates procedures for a 5G-RG PDU Session establishment via W-AGF 140. These procedures leverage the same procedures as in 3GPP TS 23.502 clause 4.3.2.2 for a 5G-RG requested PDU Session establishment as described above and include similar novel features as described with respect to FIG. 3.

FIG. 4, comprising the combination of FIG. 4A, FIG. 4B, FIG. 4C and FIG. 4D, is a signaling diagram 500, comprising Part A 501, Part B 503, Part C 505 and Part D 507, of exemplary 5G-RG PDU Session Establishment via W-5GAN, in accordance with an exemplary embodiment.

In step 502, the 5G-RG 122 is operated to establish a W-CP (wireline-control plane) signaling connection with W-AGF 140. In step 504, the W-AGF 140 is operated to establish a W-CP (wireline-control plane) signaling connection with 5G-RG 122. In steps 506 and 508 the 5G-RG 122 and W-AGF 140 have established W-CP signaling connection 510.

In step 512 5G-RG 122 generates signals 516 conveying a PDU session establishment request including an indication of support for LAS, e.g. as part of a 5GSM (5G Session Management) capability information field or as part of a N1 SM (session management) container. In step 514 5G-RG 122 sends the generated W-CP signals 516 including (NAS-PDU [PDU session establishment request]). The PDU session establishment request message, included in W-CP signals 516, includes a 5GSM capability field including an indication of support for L4S 518 or a N1 SM container including an indication of support for L4S 520. In step 522 W-AGF 140 receives the signals 516 communicating the PDU session establishment request and recovers the communicated information.

In step 524, the W-AGF 140 generates and sends a N2 Uplink NAS Transport message 526, including the NAS PDU including the PDU session establishment request message, to the AMF 250, which receives the N2 uplink transport message 526 in step 528 and recovers the communicated information.

In step 530 AMF 150 selects a SMF, e.g., AMF 150 selects SMF 152 from a plurality of SMFs (SMF 1 152, . . . . SMF N 153). In step 532, AMF 150 generates and sends Nsmf_PDUSession_CreateSMContext request message 534 to SMF 152, which receives message 534 in step 536 and recovers the communicated information.

Note 537 indicates that UE subscription data types include "5G-RG LAS information", which indicates whether the 5G-RG is allowed to perform ECN making if enabled by the SMF. In step 538, which is performed prior to step 540 (e.g., in some embodiments step 538 is performed prior to step 502), UDR 159 stores UE subscription data corresponding to 5G-RG 122, said subscription data including 5G-RG L4S information indicating whether or not the 5G-RG 122 is allowed to perform ECN marking if enabled by SMF. For this example, consider that the stored 5G-RG LAS information corresponding to 5G-RG 122 indicates that 5G-RG 122 is allowed to perform ECN marking if enabled by SMF.

In steps 540, and 542, the SMF 152 and UDM 158 perform operation for subscription retrieval/subscription for updates.

In step 544 SMF 152 generates and sends a request 546 for subscription data corresponding to 5G-RG 122. In step 548, UDM 158 receives the request 546. In steps 550 and 551, the UDM 158 and UDR 159 perform operations in which the UDM 158 retrieves subscription information for 5G-RG 122 from database of UDR 159, said retrieved subscription information including information indicating whether the 5G-RG 122 is allowed to perform ECN marking if enabled by SMF, e.g., the retrieved subscription information includes information indicating that the 5G-RG 122 is allowed to perform ECN marking if enabled by SMF. In step 552, UDM 158 generates and sends response 554 to SMF 152, said response including subscription information indicating whether 5G-RG 122 is allowed to perform ECN marking if enabled by SMF, e.g., the retrieved subscription information includes information indicating that the 5G-RG 122 is allowed to perform ECN marking if enabled by SMF. In step 556 SMF 152 receives response 554 and recovers the communicated information.

In step 558, SMF 152 generates and sends Nsmf_P-DUSession_CreateSMContext response message 560 to AMF 150, which receives the message 560 in step 562 and recovers the communicated information.

In step 564, elements of the communications system, perform operations for PDU session authentication and authorization.

Following successful authentication and authorization, in step 568 SMF 152 selects a PCF, e.g., selects PCF 154 from among a plurality of PCFs (PCF 1 154, . . . , PCF N 155), e.g., the SMF 152 selects PCF 154 which supports L4S.

In step 570 SMF 152 interacts with PCF 154 for SM policy association establishment or to perform and SM initiated SM policy association modification. In steps 572 and step 574, SMF 152 and PCF 154, respectively, communicate signals 576 for the SM policy association establishment or for the SM policy association modification.

In step 578, the SMF 152 selects a UPF, e.g. selects UPF 156 from among a plurality of UPFs (UFP 1 156, . . . , UPF N 157), as the PSA UPF for the PDU session, e.g., SMF 152 selects UPF 156 which supports L4S.

In step 580 SMF 152 initiates a SM policy association modification. In steps 582 and step 584, SMF 152 and PCF 154, respectively, communicate signals 586 for the SM policy association modification.

In step 588 SMF 152 generates and sends a N4 session establishment/modification request message 590 to UPF 156, which receives message 590 in step 592 and recovers the communicated information. In step 594 UPF 156 generates and sends N4 session establishment/modification response message 596 to SMF 152, which receives message 596 in step 598 and recovers the communicated information.

In step 600 SMF 152 generates and sends Namf_Communication_NIN2MessageTransfer 602 to AMF 150, which receives the message transfer 602 in step 604 and recovers the communicated information. In step 606, the AMF 150 sends a response message 608 to the SMF 152 in response to the message transfer 602.

In step 612, AMF 150 generates and sends a N2 PDU session resource setup request 614 to W-AGF 140, said N2 PDU session resource setup request 614 including QoS profiles(s), PDU session ID, and a PDU session establishment accept, e.g., including an indication of 5G-RG support for L4S for each QoS flow. In step 616, the W-AGF 140 receives the N2 PDU session resource setup request 614 and recovers the communicated information.

In step 617, the W-AGF 140 determines the W-UP (wire-line-user plane) resources needed based on received message 614. In steps 618 and 620, the W-AGF 140 and 5G-RG 122 communicate W-UP resource(s) setup signaling including W-5GAN AS (access signaling) parameters.

In step 624 the W-AGF 140 generates and sends W-CP signals 625 including NAS-PDU including a PDU session establishment accept message including an indication of 5G-RG support for L4S for each QoS flow. In step 626 the 5G-RG 122 receives the W-CP signals 625 and recovers the communicated information.

In step 628 the W-AGF 140 generates and sends a N2 PDU session resource setup response message 630 to AMF 150, which receives message 630 in step 632 and recovers the communicated information.

In step 633 5G-RG 122 performs ECN (Explicit Congestion Notification) marking of packets for L4S for each QoS uplink data flow. In step 634 5G-RG 122 generates and sends first uplink data 636 to UPF 156, which is received in step 638 by the UPF 156.

In step 640 the AMF 150 generates and sends Nsmf_P-DUSession_UpdateSMContext request message 642 to SMF 152, which receives message 642 in step 644 and recovers the communicated information.

In step 646, SMF 152 generates and sends a N4 session modification request message 648 to UPF 156, which receives message 648 in step 650 and recovers the communicated information. In step 652 UPF 156 generates and sends a N4 session modification response message 654 to SMF 152, which receives message 654 in step 656 and recovers the communicated information.

In steps 658 and 660 SMF 152 and UDM 158 communicate registration signals 662.

In step 664 UPF 156 generates and sends first downlink data 666 to 5G-RG 122, which receives the first downlink data 666 in step 668. In step 669 5G-RG 122 performs ECN (Explicit Congestion Notification) marking of packets for L4S for each QoS downlink data flow.

In step 670, SMF 152 generates and sends a Nsmf_P-DUSession_UpdateSMContext response message 672 to AMF 150, which receives the message 672 in step 674 and recovers the communicated information. In step 676, SMF 152 generates and sends a Nsmf_PDUSession_SMContext-StatusNotify message 678 to AMF 150, which receives the message 678 in step 680 and recovers the communicated information.

In step 682 SMF 152 generates and sends IPv6 address configuration message 684 to UPF 156 and 5G-RG 122. In step 686 UPF 156 receive the IPV6 address configuration message 684 and recovers the communicated information. In step 688 5G-RG 122 receives the IPV6 address configuration message 684 and recovers the communicated information.

In step 690 SMF 152 initiates a SM policy modification. In step 692 and 694, the SMF 152 and PCF 154, communicate signals 696 to implement the SM initiated SM policy association modification. In step 698 and 700 the SMF 152 and UDM 158 communicate unsubscription signals 702.

The method of FIG. 4 has been described for exemplary 5G-RG 122 and exemplary W-AGF 140.

Figure 11:
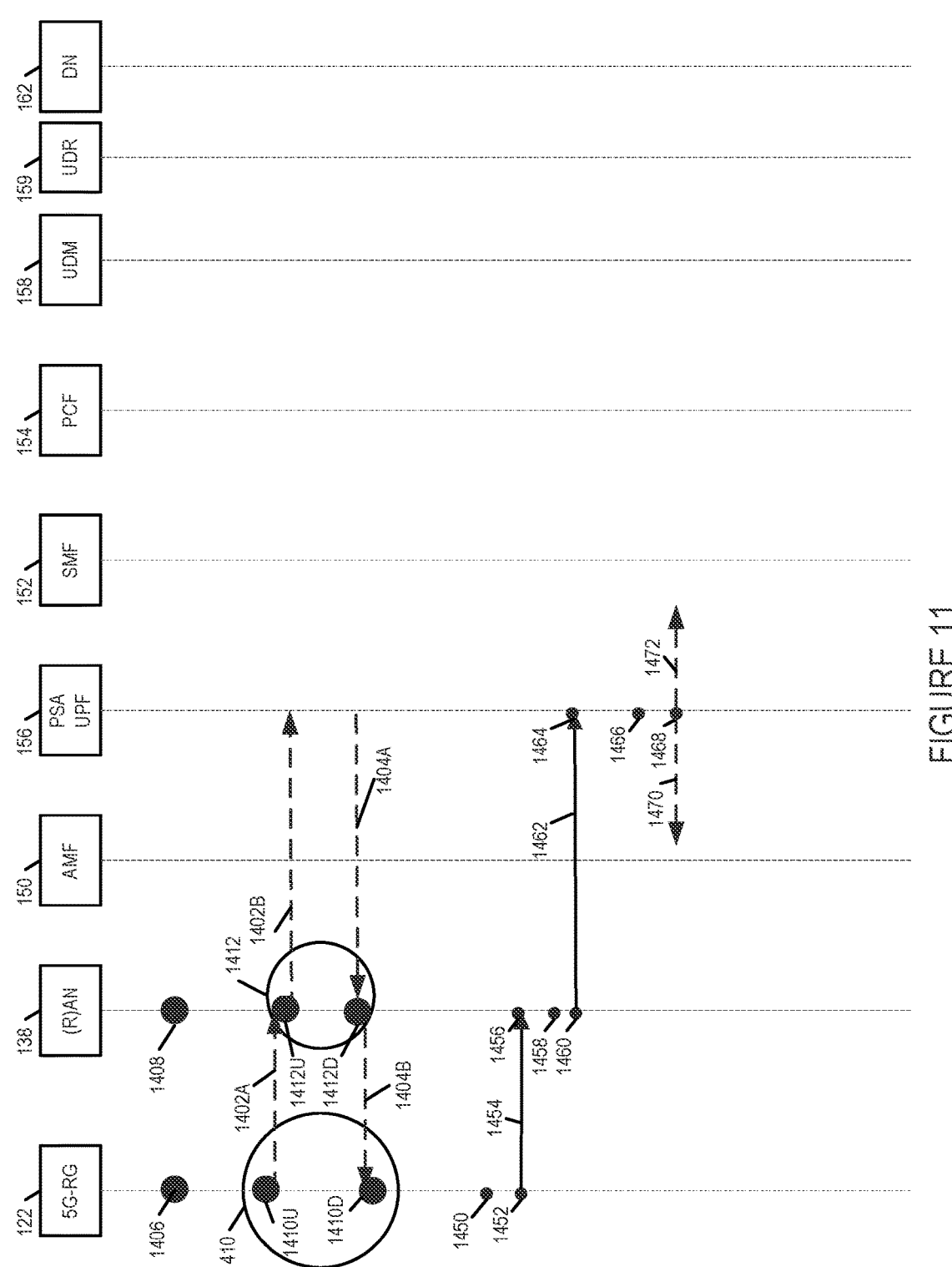
FIG. 11 shows a diagram in which various devices, including a 5G-RG, (R)AN and PCF support ECN marking of packets communicated as part of one or more PDU sessions, e.g., PDU sessions corresponding to a residential gateway (e.g., 5G-RG).

FIG. 11 shows a diagram 1400 in which various devices, including a 5G-RG 122, (R)AN 138 and/or PSA UPF 156 support ECN marking of packets communicated as part of one or more PDU sessions, e.g., PDU sessions corresponding to a residential gateway (e.g., 5G-RG) 122. In various embodiments, the PCF 154, which was selected by the SMF 152 for supporting the communications session, supports operations allowing a 5G-RG to perform ECN marking of packets for LAS as part of the communications session, e.g., the PCF 154 includes rules and/or information to facilitate the inclusion of allowing a 5G-RG 122 to perform ECN marking and/or to communicate congestion information, e.g. in addition to allowing the RAN 138 to perform ECN marking. From the 5G core perspective, the 5G-RG 122 appears as a UE.

The residential gateway (e.g., 5G-RG) 122 performs ECN marking for L4S in both the uplink and/or downlink, this can and in some embodiments does, involve setting an ECN bit in a data packet or packets passing through the residential gateway 122 as part of a PDU session corresponding to the residential gateway 122. The ECN marking is performed by the 5G-RG 122 for packets passing in the uplink direction or downlink direction, or is performed with respect to both uplink and downlink direction with the marking depending on whether there is congestion at the 5G-RG 122 with respect to the corresponding uplink or downlink direction. In some cases, congestion marking is performed for both uplink and downlink direction with uplink packets being marked as being subject to congestion when uplink congestion is present at the 5G-RG 122 and downlink packets being marked as being subject to congestion when downlink congestion is present at the 5G-RG 122.

Congestion information is communicated from the 5G-RG 122 to the (R)AN 138. The congestion information may be, and sometimes is, of the type defined in 3GPP TS 23.501, clause 5.45.3. Thus, in some embodiments the congestion information communicated to the PSA UPF 156 includes, e.g., a percentage of congestion level for exposure. However, the congestion information may be different and/ or include other information in other embodiments. The congestion information. e.g., a congestion percentage value, may be sent in a separate congestion information message and/or communicated in a data packet, e.g., in the form of an ECN indicator, communicated from 5G-RG 122 to (R)AN as part of a PDU session corresponding to the residential gateway 122. The congestion information, e.g., percentage of congestion being experienced by a node providing the information to the PSA UPF 156 is in some embodiments different from the ECN marking used to indicate congestion that is set in an IP data packet header.

Adding 5G-RG support of ECN Marking for L4S can also be implemented to enhance one or more of the procedures found in the listed specifications/figures:

23.502 FIG. 4.2.3.2-1 UE Triggered Service Request Procedures.

Nsmf_PDUSession_UpdateSMContext Response N2 Request Ack 23.502 FIG. 4.3.3.2-1 UE or Network requested PDU Session Modification.

Namf_Communication_NIN2MessageTransfer

N2 PDU Session Ack

N4 Session Modification Request 23.502 FIG. 4.9.1.2.2-1 Xn based inter NG-RAN handover w/o UPF re-allocation.

N2 Path Switch Request

Nsmf_PDUSession_UpdateSMContext Response

Handover Request Ack 23.502 FIG. 4.15.6.6-1 Setting up an AF session with required QoS Procedures.

Nnef_AFSession WithQoS_Create

Nnef_AFSession WithQoS_Update

Npcf_Policy Authorization_Create

Naf_EventExposure_Service

Congestion detection and reporting at the node that experienced the congestion allows for reporting at the earliest possible time (i.e., when congestion is first encountered in the 5GS). This enables a more robust and exhaustive support of Low Latency Low Loss Scalable Throughput support throughout the 5GS where traffic queues are managed.

Figure 5:
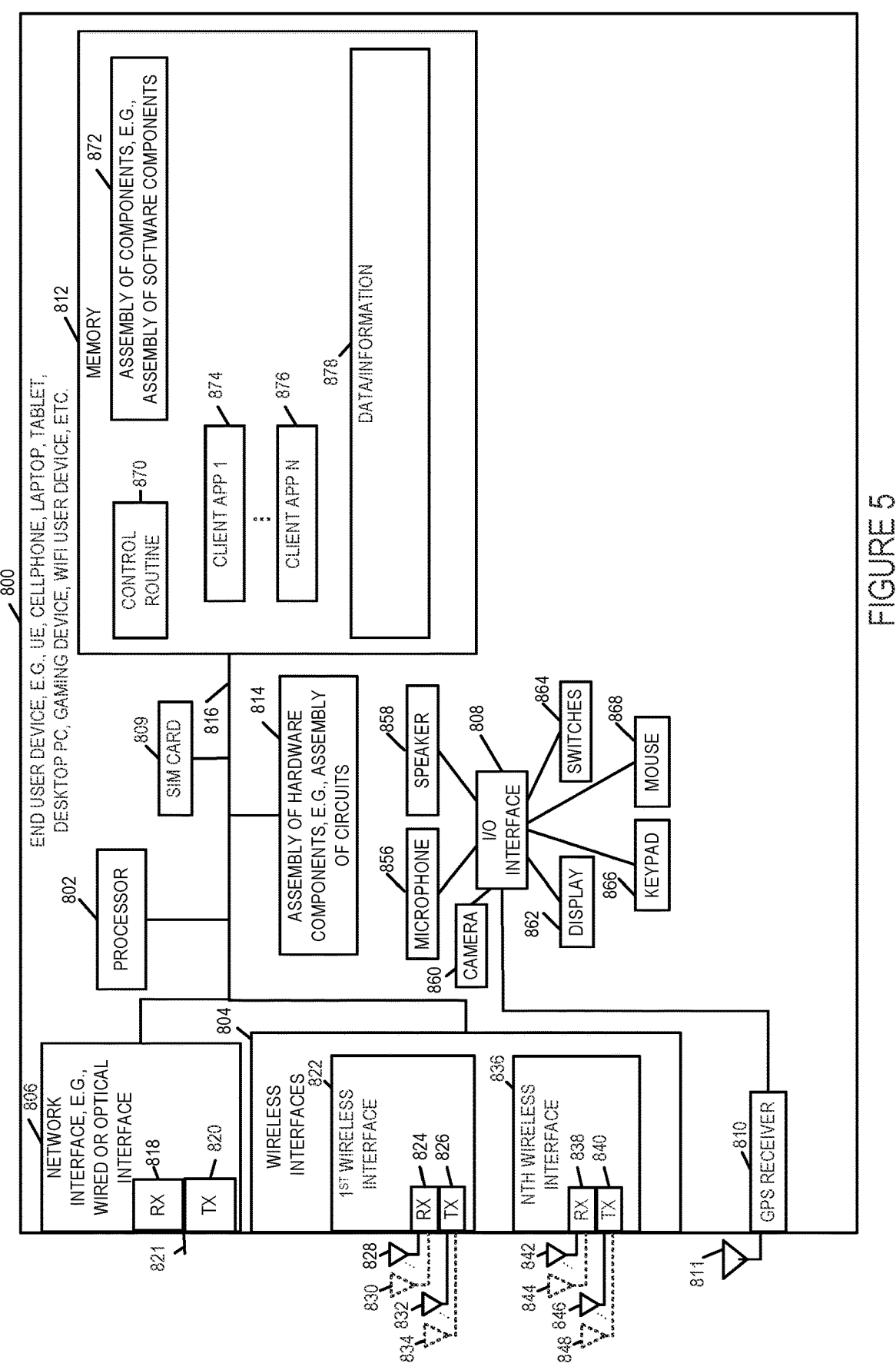
FIG. 5 is a drawing of an exemplary end user device, e.g., a user equipment (UE), a cellphone, a laptop, a tablet, a desktop PC, a gaming device, a WiFi end user device, an Internet-of-Things (IoT) end user device, a end user device supporting 3GPP access, an end user device supporting one or more different types of non-3GPP access, an end user device supporting both 3GPP access and non-3GPP access, etc., in accordance with an exemplary embodiment.

FIG. 5 is a drawing of an exemplary end user device 800, e.g., a user equipment, a cellphone, a laptop, a tablet, a desktop PC, a gaming device, a WiFi end user device, a IoT end user device, a end user device supporting 3GPP access, an end user device supporting one or more different types of non-3GPP access, and end user device supporting both 3GPP access and non-3GPP access, etc., in accordance with an exemplary embodiment. Exemplary end user device 800 is, e.g., any of the end user devices 102 (end user 1 104, . . . , end user device N 106) of system 100 of FIG. 2 or any of end user devices (end user 1 104, . . . , end user device N 106, end user 1' 1804, . . . , end user device N' 1806, end user 1" 1904, . . . , end user device N" 1906) of system 1800 of FIG. 15. Exemplary end user device 800 includes a processor 802, e.g., a CPU, wireless interfaces 804, a network interface 806, an I/O interface 808, a SIM card 809, a GPS receiver 810, memory 812, and an assembly of hardware components 814, e.g., an assembly of circuits, coupled together via a bus 816 over which the various elements may interchange data and information.

Wireless interfaces 808 includes one or more wireless interfaces (1st wireless interface 822, . . . , Nth wireless interface 836). For example, the 1st wireless interface 822 is a cellular wireless interface, and the Nth wireless interface 836 is a WiFi wireless interface. 1st wireless interface 822 includes a wireless receiver 824 coupled to one or more receive antennas or receive antenna elements (828, . . . , 830), via which the end user device 800 may receive wireless signals. 1st wireless interface 822 further includes a wireless transmitter 826 coupled to one or more transmit antennas or transmit antenna elements (832, . . . , 834), via which the end user device 800 may transmit wireless signals. Nth wireless interface 836 includes a wireless receiver 838 coupled to one or more receive antennas or receive antenna elements (842, . . . , 844), via which the end user device 800 may receive wireless signals. Nth wireless interface 836 further includes a wireless transmitter 840 coupled to one or more transmit antennas or transmit antenna elements (846, . . . , 848), via which the end user device 800 may transmit wireless signals. In some embodiments the same antennas or antenna elements are used for both receive and transmit.

Network interface 806, e.g., a wired or optical interface, includes a receiver 818, a transmitter 820 and connector 821. Network interface 806 may be, and sometimes is, used by end user device 800 to communicate with other devices, e.g., a 5G-RG, when the end user device 800 is located at a premises in which a wireline connection is available.

End user device 800 further includes a plurality of I/O devices (microphone 856, speaker 858, camera 860, display 862, switches 864, keypad 866, mouse 868), which are coupled to I/O interface 808. The I/O interface 808 couples the various I/O devices included in end user device 800 to other elements within end user device 800.

SIM card 809 includes UE subscriber information. GPS receiver 810 is coupled to GPS antenna 811, via which the end user device 800 receives GPS signals. The GPS receiver 810 processes the received GPS signals to determine time, end user device position, e.g., latitude, longitude, and altitude, and end user device velocity information. In some embodiments, the GPS receiver 810 also performs navigation functions based on processed received GPS signals and/or other received inputs, e.g., inertial measurement information from sensors, e.g., gyroscopes and/or accelerometers (e.g., in an IMU chip) included in end user device 800.

Memory 812 includes control routine 870, and assembly of components 872, e.g., an assembly of software components, a plurality of client applications (client application 1 874, . . . , client application 876), and data/information 878. In some embodiments, at least some of the client applications included in client application (874, . . . , 876), are applications requiring L4S. Control routine 870 includes instructions which when executed by processor 802 control the end user device 800 to implement basic operational functions, e.g., read memory, write to memory, control an interface, load a program, subroutine, or app, etc. Assembly of components 872, e.g., an assembly of software components, e.g., routines, subroutines, applications, etc., includes, e.g., code, e.g., machine executable instructions, which when executed by processor 802, controls the end user device 800 to implement steps of a method, e.g., steps of a method which are performed by an end user device communicating via a residential gateway, e.g., a 5G-RG, with a core network, e.g., a 5G core network.

Figure 6:
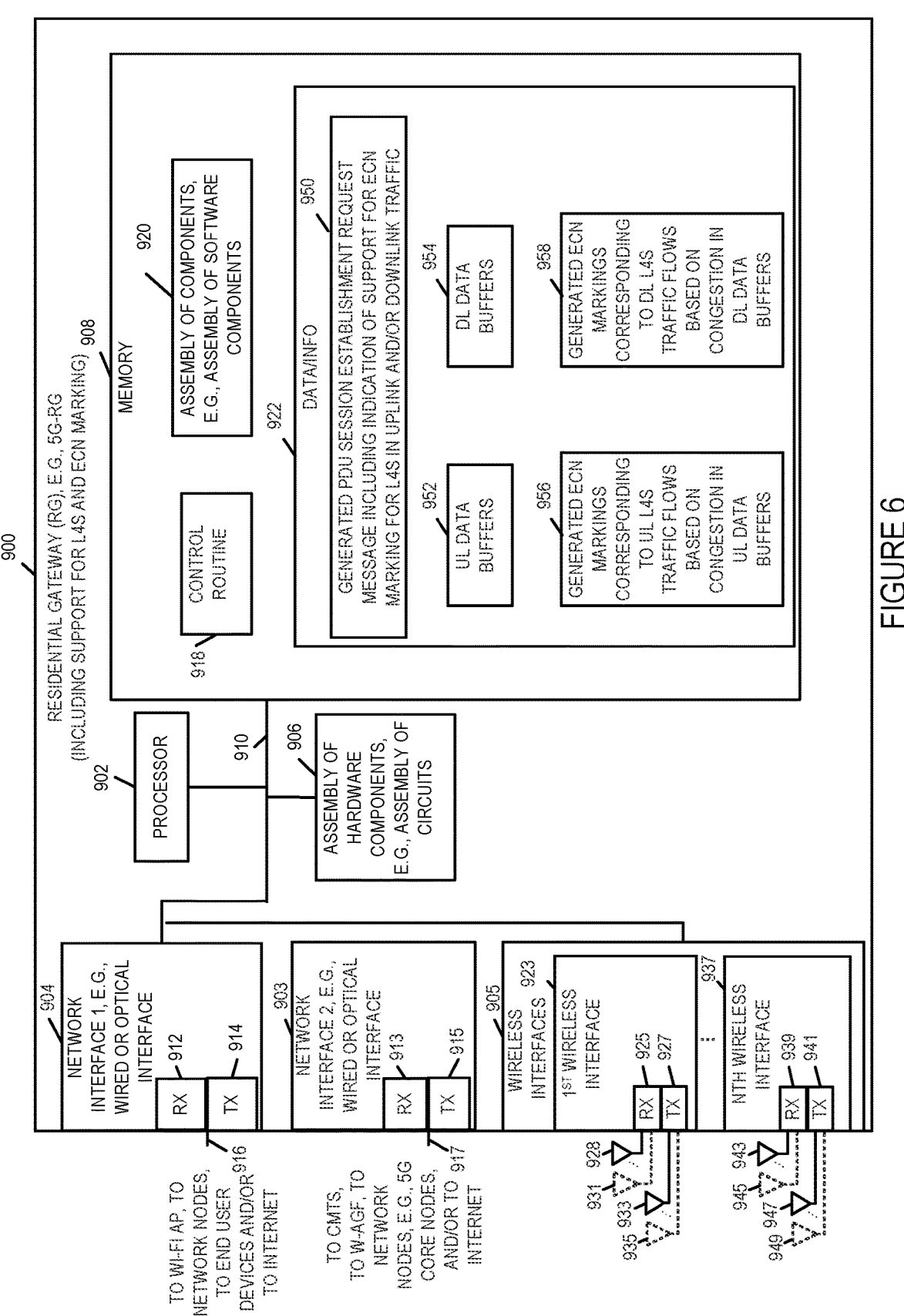
FIG. 6 is a drawing of an exemplary residential gateway (RG) 900, e.g., a 5G-RG (5G-Residential Gateway), including support for L4S and ECN marking in accordance with an exemplary embodiment.

FIG. 6 is a drawing of an exemplary residential gateway (RG) 900, e.g., a 5G-RG (5G-Residential Gateway), including support for L4S and ECN marking in accordance with an exemplary embodiment. Exemplary RG 900 is, e.g., any of: 5G-RG 12 of FIG. 1, 5G-RG 122 of system 100 of FIG. 2, 5G-RG 122 of FIG. 3, FIG. 4 and/or FIG. 11, an RG implementing steps of any of flowchart 1500 of FIG. 12, flowchart 1600 of FIG. 13, and/or flowchart 1700 of FIG. 14, 5G-RG 1 122 of system 1800 of FIG. 15, 5G-RG 2 1822 of system 1800 of FIG. 15, or RG-5G N 1922 of system 1800 of FIG. 15. Exemplary RG 900 includes a processor 902, e.g., a CPU, network interface 1 904, network interface 2 903, wireless interfaces 905, an assembly of hardware components 906, e.g., an assembly of circuits, and memory 908 coupled together via a bus 910 over which the various elements may interchange data and information.

Network interface 1 904, e.g., a wired or optical interface, includes a receiver 912, a transmitter 914 and connector 916. Network interface 1 904 may be, and sometimes is, used by RG 900 to communicate with other devices, e.g., end user devices, a WiFi AP, other network nodes and/or the Internet. Network interface 2 903, e.g., a wired or optical interface, includes a receiver 913, a transmitter 915 and connector 917. Network interface 2 903 may be, and sometimes is, used by RG 900 to communicate with other devices, e.g., a CMTS, a W-AGF, other network nodes, e.g., 5G core network nodes, and/or the Internet.

Wireless interfaces 905 includes one or more wireless interfaces (1st wireless interface 923, . . . , Nth wireless interface 937). Different wireless interfaces may, and sometimes do, correspond to different technologies, different protocols, and/or different communications bands. 1st wireless interface 923 includes a wireless receiver 925 coupled to one or more receive antennas or receive antenna elements (928, . . . , 931), via which the RG 900 may receive wireless signals. 1st wireless interface 923 further includes a wireless transmitter 927 coupled to one or more transmit antennas or transmit antenna elements (933, . . . , 935), via which the RG 900 may transmit wireless signals. Nth wireless interface 937 includes a wireless receiver 939 coupled to one or more receive antennas or receive antenna elements (943, . . . , 945), via which the RG 900 may receive wireless signals. Nth wireless interface 937 includes a wireless transmitter 941 coupled to one or more transmit antennas or transmit antenna elements (947, . . . , 949), via which the RG 900 may transmit wireless signals. In some embodiments, one of the wireless interfaces is used by the RG 900 to communicate with end user devices, e.g., UEs, and another one of the wireless interfaces is used by the RG 900 to communicate with a 3GPP RAN node, e.g., a gNB coupled to a 5G core. In some embodiments the same antennas or antenna elements are used for both receive and transmit.

Memory 908 includes control routine 918, an assembly of components 920, e.g., an assembly of software components, and data/information 922. Control routine 918 includes instructions which when executed by processor 902 control the RG 900 to implement basic operational functions, e.g., read memory, write to memory, control an interface, load a program, subroutine, or app, etc. Assembly of components 920, e.g., an assembly of software components, e.g., routines, subroutines, applications, etc., includes, e.g., code, e.g., machine executable instructions, which when executed by processor 902, controls the RG 900 to implement steps of a method which are performed by a RG, e.g., steps of the method of signaling diagram 300 of FIG. 3, which are performed by 5G-RG 122, steps of the method of signaling diagram 500 of FIG. 4, which are performed by 5G-RG 122, steps of the method of signaling diagram 1400 of FIG. 11, which are performed by 5G-RG 122, steps of the method of flowchart 1500 of FIG. 12, which are performed by an RG, steps of the method of flowchart 1600 of FIG. 13, which are performed by an RG and/or steps of the method of flowchart 1700 of FIG. 14, which are performed by an RG. Data/information 922 includes a generated PDU session establishment request message 950 including an indication of support for ECN marking for L4S in uplink and/or downlink traffic, UL data buffers 952, DL data buffers 954, generated ECN markings 956 corresponding to UL L4S traffic flows based on congestion in the UL buffers for the RG 900, and generated ECN markings 958 corresponding to DL L4S traffic flows based on congestion in the downlink data buffers of the RG 900.

FIG. 7 is a drawing of an exemplary 3GPP access network 1000, sometimes also referred to as a radio access network (RAN) 1000, e.g., a gNB, in accordance with an exemplary embodiment. In some embodiments, RAN 1000 is a CBRS capable base station, e.g. a CBRS capable gNB. Exemplary RAN 1000 is, e.g., any of: 3GPP access network 18 of FIG. 1, gNB 110, gNB 136, or gNB 138 (which are RANs) of system 100 of FIG. 2 or (R)AN 138, e.g., gNB 138 of FIG. 3 or (R)AN 138, e.g., gNB 138, of FIG. 11, gNB 138 of FIG. 15, gNB 1938 of FIG. 15, or a 3GPP access network node implementing steps of flowchart 1500 of FIG. 12. Exemplary RAN 1000 includes a processor 1002, e.g., a CPU, wireless interface 1004, a network interface 1006, an assembly of hardware components 1008, e.g., an assembly of circuits, and memory 1010 coupled together via a bus 1011 over which the various elements may interchange data and information.

Wireless interface 1004 includes a wireless receiver 1012 coupled to one or more receive antennas or receive antenna elements (1020, . . . , 1022), via which the RAN 1000 may receive wireless signals, e.g., from end user devices which are UEs and/or from RGs, e.g., 5G-RGs. Wireless interface 1004 further includes a wireless transmitter 1014 coupled to one or more transmit antennas or transmit antenna elements (1024, . . . , 1026), via which the RAN 1000 may transmit wireless signals, e.g., to end user devices which are UEs and/or to RGs, e.g., 5G-RGs. In some embodiments, the wireless receiver 1012 and wireless transmitter 1014 are included as part of a wireless transceiver 1005.

Network interface 1006, e.g., a wired or optical interface, includes a receiver 1016, a transmitter 1018 and connector 1019. Network interface 1006 couples the RAN 1000 to a core network, e.g., a 5G core network, including core network nodes, e.g., a node implementing an AMF, a node implementing a SMF, nodes implementing UPFs, a node implementing a PSA UPF, a node implementing a UDM, a node implementing a UDR, a node implementing a PCF, etc., to other nodes, to other (R)ANs, and/or to the Internet. Memory 1010 includes control routine 1028, an assembly of components 1030, e.g., an assembly of software components, and data/information 1032. Control routine 1028 includes instructions which when executed by processor 1002 control the RAN 1000 to implement basic operational functions, e.g., read memory, write to memory, control an interface, load a program, subroutine, or app, etc. Assembly of components 1030, e.g., an assembly of software components, e.g., routines, subroutines, applications, etc., includes, e.g., code, e.g., machine executable instructions, which when executed by processor 1002, controls the RAN 1000 to implement steps of a method, e.g., steps of a method which are performed by a RAN, e.g., steps of the method of signaling diagram 300 of FIG. 3, which are performed by RAN 138, steps of the method of signaling diagram 1400 of FIG. 11, which are performed by RAN 138, and/or steps of the method of flowchart 1500 of FIG. 12, which are performed by a 3GPP access network node. Data/information 1032 includes a received PDU session establishment request message 1034 including an indication of support for ECN marking for L4S in uplink and/or downlink traffic, said received PDU session establishment request being from an RG, e.g., a 5G-RG, and being forwarded, by RAN 1000 to a core network, e.g. to an AMF in a 5GC.

Figure 8:
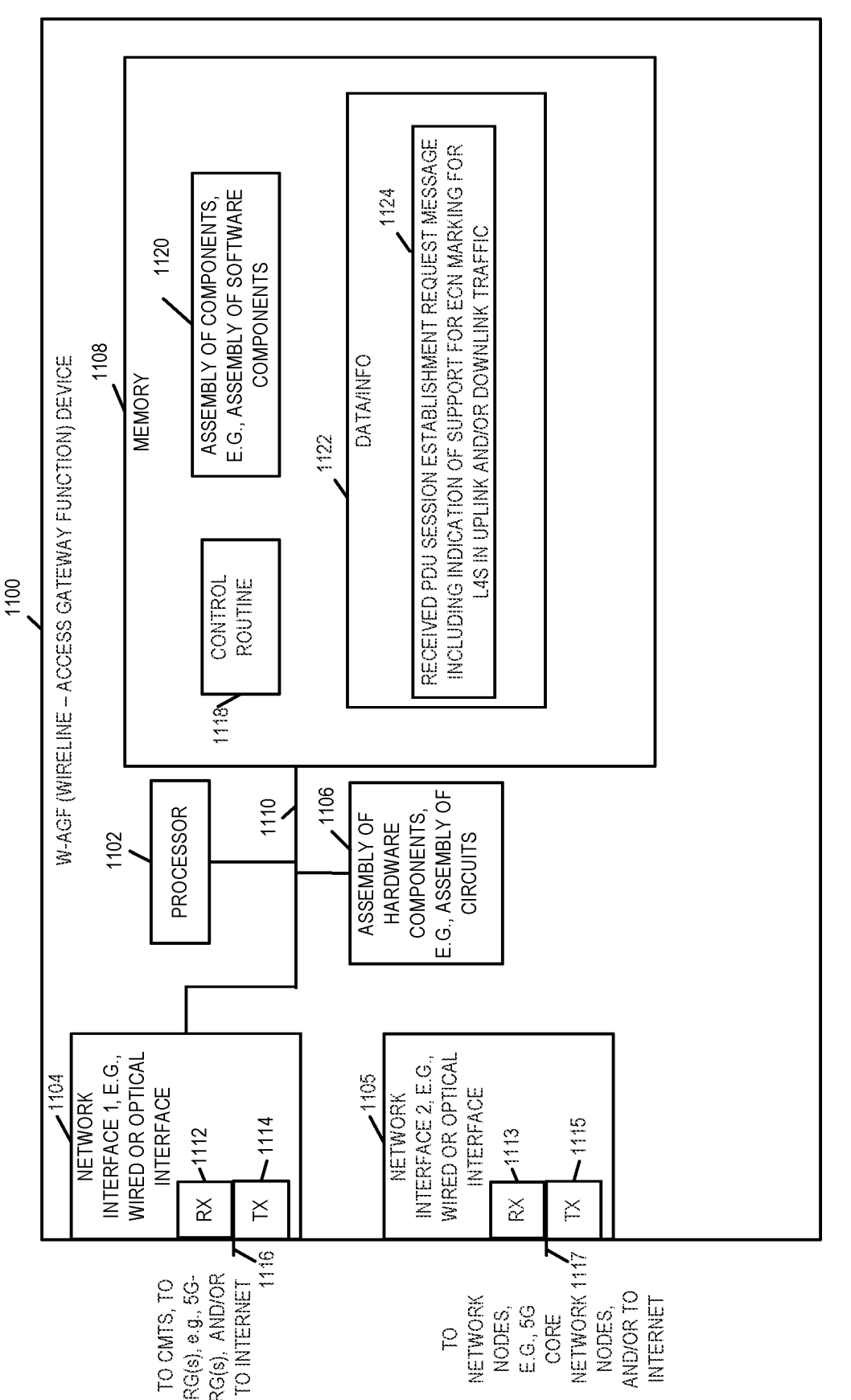
FIG. 8 is a drawing of an exemplary W-AGF (wireline-access gateway function) device in accordance with an exemplary embodiment.

FIG. 8 is a drawing of an exemplary W-AGF (wireline-access gateway function) device 1100 in accordance with an exemplary embodiment. Exemplary W-AGF is, e.g., any of W-AGF 16 of FIG. 1, W-AGF 140, or W-AGF 142 of system 100 of FIG. 2 or W-AGF 140 of FIG. 4, W-AGF 140 or W-AGF 1940 of system 1800 of FIG. 15, or a W-AGF implementing steps of flowchart 1600 of FIG. 13. Exemplary W-AGF 1100 includes a processor 1102, e.g., a CPU, network interface 1 1104, network interface 2 1105, an assembly of hardware components 1106, e.g., an assembly of circuits, and memory 1108 coupled together via a bus 1110 over which the various elements may interchange data and information.

Network interface 1 1104, e.g., a wired or optical interface, includes a receiver 1112, a transmitter 1114 and connector 1116. Network interface 1 1104 couples the W-AGF 1100 to a RG(s), e.g., to 5G-RG(s), to a CMTS, and/or to the Internet. Network interface 2 1105, e.g., a wired or optical interface, includes a receiver 1113, a transmitter 1115 and connector 1117. Network interface 2 1105 couples the W-GF 1100 to network nodes, e.g. 5G core network nodes, and/or to the Internet. Memory 1108 includes control routine 1118, an assembly of components 1120, e.g., an assembly of software components, and data/information 1122.

Control routine 1118 includes instructions which when executed by processor 1102 control the W-AGF 1100 to implement basic operational functions, e.g., read memory, write to memory, control an interface, load a program, subroutine, or app, etc. Assembly of components 1120, e.g., an assembly of software components, e.g., routines, subroutines, applications, etc., includes, e.g., code, e.g., machine executable instructions, which when executed by processor 1102, controls the W-AGF 1100 to implement steps of a method, e.g., steps of a method of signaling diagram 500 of FIG. 5, which are performed by W-AGF 140, and/or steps of the method of flowchart 1600 of FIG. 13, which are performed by a W-AGF. Data/information 1122 includes a received PDU session establishment request message including an indication of support for ECN marking for L4S in uplink and/or downlink traffic, said received PDU session establishment request being received from an RG, e.g., a 5G-RG, (e.g., as part of W-CP signals (NAS-PDU [PDU session establishment request]) and being forwarded, by W-AGF 1100 to a core network, e.g. to an AMF in a 5GC (e.g., as part of N2 Uplink NAS Transport (NAS PDU)).

Figure 9:
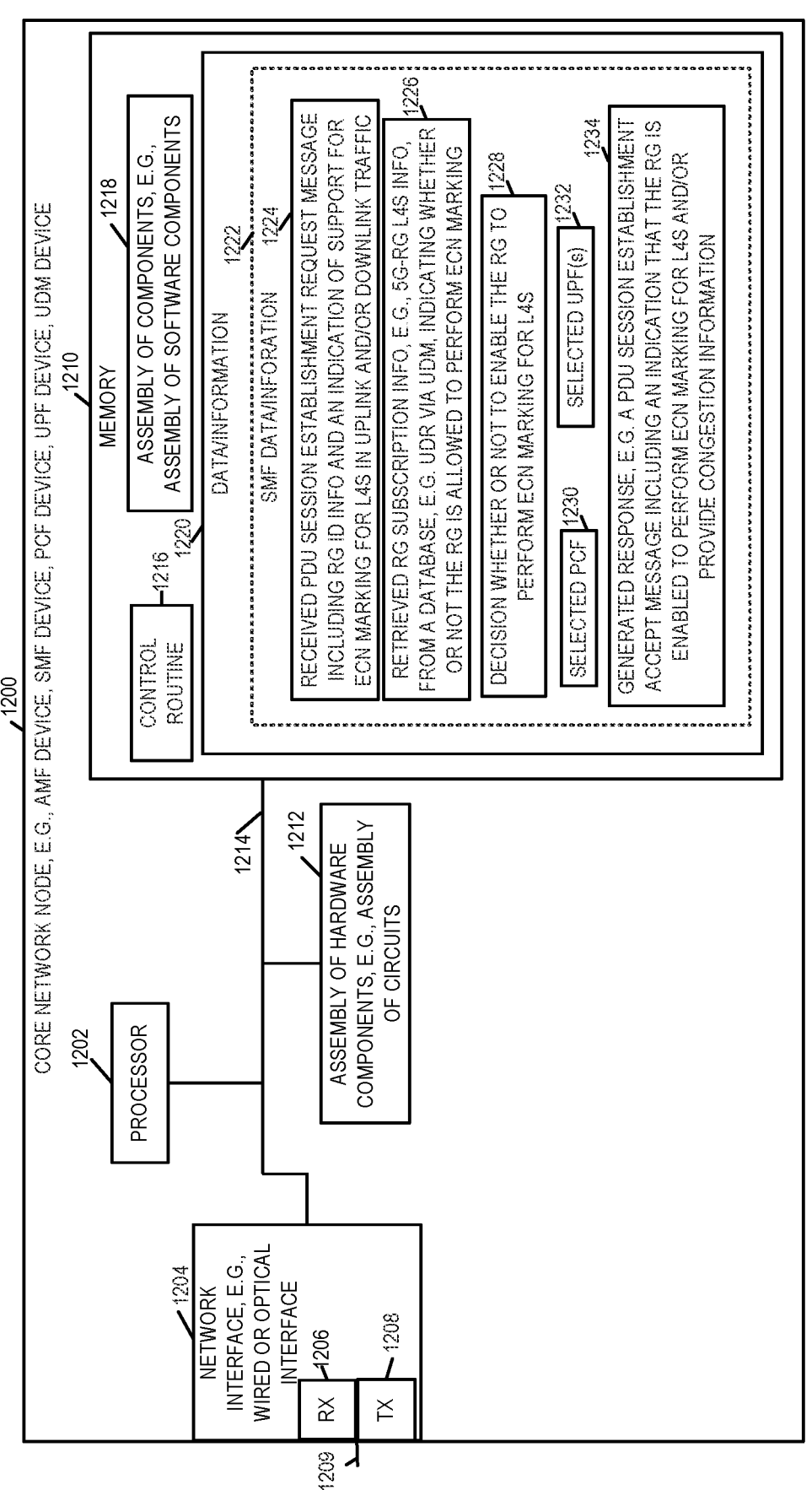
FIG. 9 is a drawing of an exemplary core network node, e.g., an access and mobility management function (AMF) device, session management function (SMF) device, policy control function (PCF) device, unified data management (UDM) device, a user plane function (UPF) device, etc., in accordance with an exemplary embodiment.

FIG. 9 is a drawing of an exemplary core network node 1200, e.g., an AMF device, SMF device, PCF device, UDM device, a UPF device, etc., in accordance with an exemplary embodiment. Core network node 1200 is, e.g., any of AMF 20, SMF 22, or UPF 24 of FIG. 1, AMF 150, SMF1 152, SMF N 153, PCF 1 154, PCF N 155, UPF 1 156, UPF N 157, UDM 158 of system 100 of FIG. 2 or of FIG. 3, 4, 11, or 15 or a core network node, implementing one or more core network function(s) such as a SMF, PCF, UPF, UDM, etc., which implements steps of an exemplary method of any of flowchart 1500 of FIG. 12, flowchart 1600 of FIG. 13, or flowchart 1700 of FIG. 14. Core network node 1200 includes a processor 1202, e.g., a CPU, a network interface 1204, e.g., a wired or optical interface, and assembly of hardware components 1212, e.g., an assembly of circuits, and memory 1210 coupled together via a bus 1214 over which the various elements may interchange data and information.

Network interface 1204, e.g., a wired or optical interface, includes a receiver 1206, a transmitter 1208 and a connector 1209. Memory 1210 includes a control routine 1216, an assembly of components 1218, e.g., and assembly of software components, and data/information 1220. Control routine 1216 includes instructions which when executed by processor 1202 control the core network node 1200 to implement basic operational functions, e.g., read memory, write to memory, control an interface, load a program, subroutine, or app, etc. Assembly of components 1218, e.g., an assembly of software components, e.g., routines, subroutines, applications, etc., includes, e.g., code, e.g., machine executable instructions, which when executed by processor 1202, controls the core network node 1200 to implement steps of a method, e.g., steps of a method which are performed by a core network node, e.g., steps of a method of any of: signaling diagram 300 of FIG. 3, signaling diagram 500 of FIG. 4, signaling diagram 1400 of FIG. 11, flowchart 1500 of FIG. 12, flowchart 1600 of FIG. 13, or flowchart 1700 of FIG. 14, which are performed by a core network node such as AMF 150, UPF 156, SMF 152, PCF 154, UDM 158 or UDR 159.

Data/information 1220 includes SMF data/information 1222 for an embodiment in which the core network node 1200 is an SMF device, e.g., core network node 1200 implements a SMF. SMF data/information 1222 includes a received PDU session establishment request message 1224 including RG ID information and an indication of support for ECN marking for L4S in uplink and/or downlink traffic, retrieved RG subscription information 1226, e.g. 5G-RG LAS information, from a database, e.g. a UDR via a UDM, said retrieved RG subscription information indicating whether or not the RG is allowed to perform ECN marking, a decision 1228 as to whether or not to enable the RG to perform ECN marking for L4S, information 1230 identifying a selected PCF to be used to support a PDU session corresponding to the RG which sent the PDU session establishment request, information 1232 identifying one or more selected UPF(s) to be used to support the PDU session corresponding to the RG which sent the PDU session establishment request, and a generated response, e.g., a generated PDU session establishment accept message, to be sent to the RG, said generated response including an indication that the RG is enabled to perform ECN marking for L4S and/or enabled provide congestion information, e.g. provide RG congestion information to a PSA UPF.

Figure 10:
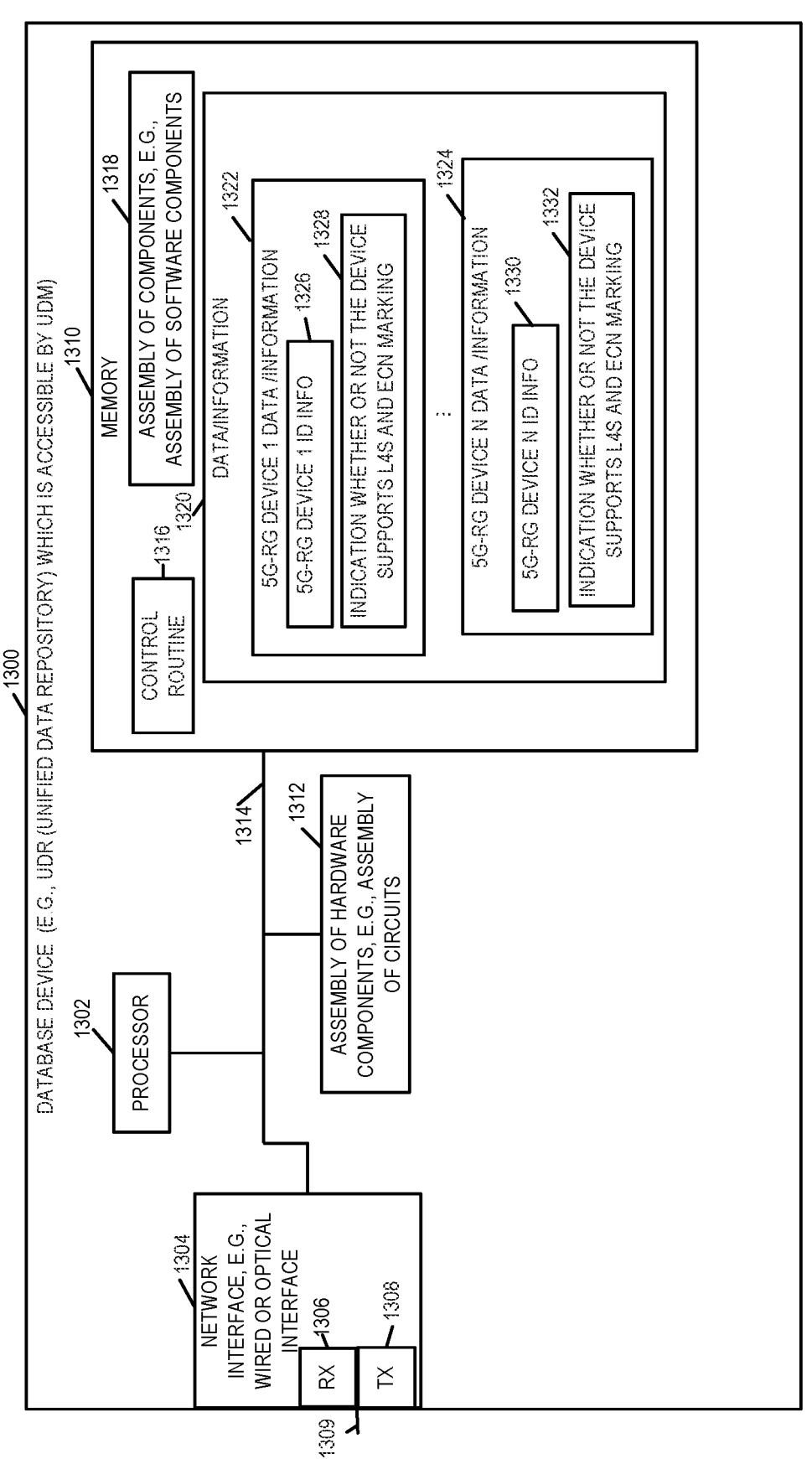
FIG. 10 is a drawing of an exemplary database device, e.g., a UDR (unified data repository) which is accessible by a UDM, in accordance with an exemplary embodiment.

FIG. 10 is a drawing of an exemplary database device 1300, e.g., a UDR (unified data repository) which is accessible by a UDM, in accordance with an exemplary embodiment. Database device 1300 is, e.g., UDR 159 of system 100 of FIG. 2 or of FIG. 3, 4, 11, or 15, or a UDR implementing steps of any of the methods of flowchart 1500 of FIG. 12, flowchart 1600 of FIG. 13, and/or flowchart 1700 of FIG. 14. Database device 1300 includes a processor 1302, e.g., a CPU, a network interface 1304, e.g., a wired or optical interface, an assembly of hardware components 1312, e.g., an assembly of circuits, and memory 1310 coupled together via a bus 1314 over which the various elements may interchange data and information. Network interface 1304, e.g., a wired or optical interface, includes a receiver 1306, a transmitter 1308 and a connector 1309. Memory 1310 includes a control routine 1316, an assembly of components 1318, e.g., and assembly of software components, and data/information 1320. Control routine 1316 includes instructions which when executed by processor 1302 control the database device 1300 to implement basic operational functions, e.g., read memory, write to memory, control an interface, load a program, subroutine, or app, etc. Assembly of components 1318, e.g., an assembly of software components, e.g., routines, subroutines, applications, etc., includes, e.g., code, e.g., machine executable instructions, which when executed by processor 1302, controls the database device 1300 to implement steps of a method, e.g., e.g., steps of a method which are performed by a database device, e.g., steps of a method of any of: signaling diagram 300 of FIG. 3, signaling diagram 500 of FIG. 4, signaling diagram 1400 of FIG. 11, flowchart 1500 of FIG. 12, flowchart 1600 of FIG. 13, or flowchart 1700 of FIG. 14, which are performed by UDR 159.

Data/information 1320 includes 5G-RG device information corresponding to a plurality of 5G-RG devices (5G-RG device 1 data information 1322, . . . , 5G-RG device N data information 1324). 5G-RG device 1 data information 1322 includes 5G-RG device 1 ID information 1326, e.g., a device identifier, e.g., a globally unique device identifier corresponding to 5G-RG 122, and an indication 1328 whether or not the device supports LAS and ECN marking. 5G-RG device N data information 1324 includes 5G-RG device N ID information 1326, e.g., a device identifier, e.g., a globally unique device identifier corresponding to another 5G-RG, and an indication 1332 whether or not the device supports LAS and ECN marking.

FIG. 11 shows a diagram 1400 in which various devices, including a 5G-RG 122, (R)AN 138 and PSA UPF 156 support ECN marking of packets communicated as part of one or more PDU sessions, e.g., PDU sessions corresponding to a residential gateway (e.g., 5G-RG) 122. In FIG. 11, the series of arrows 1402A, 1402B represent an uplink packet follow communicated from the residential gateway 122 through (R)AN 138 to PSA UPF 156, while arrows 1404A and 1404B represent a downlink data packet flow from the PSA UPF 156 via (R)AN 238 to the residential gateway 122. As the flow passes from device to device, ECN marking of the flow can be implemented with each device in the flow path potentially setting a congestion indicator associated with a packet in the data packet flow if it has not already been set to indicate the packet flow is encountering congestion as is progresses along the uplink or downlink path to which the flow corresponds.

In accordance with the invention data packet ECN LAS marking can be, and sometimes is implemented, at both the residential gateway 122 and (R)AN 138, but in other embodiments such marking may be implemented in one but not both of these devices (122, 138). Accordingly, in at least some embodiments both the residential gateway 122 and (R)AN 138 perform ECN marking in both the uplink and downlink directions, e.g., concurrently, based on the presence or lack of congestion detected along the path.

In some embodiments both the (R)AN 138 and residential gateway 122 (e.g., 5G-RG) perform ECN marking. The LAS marking performed in the (R)AN 138 and residential gateway 122 can be, and sometimes is, performed for both directions of packet communication, e.g., uplink and downlink. Step 1410 represents ECN marking being performed by the residential gateway 122 on data packets passing through the residential gateway while step 1412 represents (R)AN ECN marking being performed by the (R)AN 138 on data packets passing through the (R)AN 138.

To support ECN marking, the residential gateway 122 monitors in step 1406 uplink buffer status at the residential gateway 122 to determine if the residential gateway is suffering from uplink congestion and monitors downlink buffer status at the residential gateway to determine if the residential gateway is suffering from downlink congestion. Marking is then performed by the residential gateway 122 in step 1410 with uplink data packets passing through the residential gateway 122 being marked in sub-step 1410U and with downlink packets being marked in sub-step 1410D.

When the monitoring indicates uplink congestion at the residential gateway 122, the gateway 122 will set an ECN bit to indicate uplink congestion with regard to uplink data packets passing through the gateway 122 if a congestion indicator has not already been set in the uplink packets. In addition, when the monitoring in step 1406 indicates downlink congestion, the residential gateway 122 will set an ECN bit in downlink packets to indicate congestion if a congestion indicator has not already been set in the downlink packets passing through the residential gateway 122. If congestion has not been detected in a given uplink or downlink direction by the residential gateway 122, the residential gateway 122 will not alter the value of the congestion indicator that may be present in packets being communicated in the given direction.

Thus, in step 1410U the residential gateway 122 applied ECN congestion marking to uplink packets received as part of an uplink flow, e.g., from an end user device coupled to the 5G-RG, before sending them onward to the (R)AN 138 as part of uplink flow portion 1402A. Similarly in step 1410D the residential gateway 122 applies ECN congestion marking to downlink packets received as part of downlink flow 1404B before sending them onward, e.g., toward an end user device coupled to the 5G-RG 122 as part of downlink flow.

In step 1408 the (R)AN 138 monitors uplink buffer status at the (R)AN 138 to determine if the (R)AN 138 is suffering from uplink congestion and monitors downlink buffer status at the (R)AN 138 to determine if the (R)AN 138 is suffering from downlink congestion.

The (R)AN 138 performs ECN marking in step 1412 with uplink data packet marking being performed in sub-step 1412U and downlink data packet marking being performed in sub-step 1412D.

When the monitoring indicates uplink congestion at the (R)AN 138, the (R)AN 138 will set an ECN bit in the uplink packets to indicate uplink congestion with regard to uplink data packets passing through the (R)AN 138 if a congestion indicator has not already been set in the received uplink packets being passed through the (R)AN 138. When the monitoring indicates downlink congestion at the (R)AN 138, the (R)AN will set an ECN bit in downlink packets to indicate congestion if a congestion indicator has not already been set in the downlink packets passing through the (R)AN 138. If congestion has not been detected in a given uplink or downlink direction by the (R)AN 138, the (R)AN 138 will not alter the value of the congestion indicator that may be present in packets being communicated in the given direction.

In step 1412U the (R)AN 138 applied ECN congestion marking to uplink packets received as part of uplink flow 1402A before sending them onward to the PSA UPF, as part of uplink flow portion 1402B. Similarly in step 1410D the (R)AN 138 applies ECN congestion marking to downlink packets received as part of downlink flow 1404A before sending them onward to the 5G-RG 122 as part of downlink flow portion 1404B.

Thus, in some embodiments both the residential gateway 122 and (R)AN 138 monitor local buffer status and perform ECN L4S data packet marking in the uplink and downlink directions with the marking being performed concurrently by both devices on the packets as they pass through the individual devices 122, 138.

In some embodiments the PSA UPF 156 performs ECN marking based on congestion information received from the (R)AN 138 and/or the residential gateway 122 where in some embodiments the residential gateway congestion information is communicated via the (R)AN 138 to the PSA UPF 156. In some embodiments the residential gateway congestion information includes information on the amount of congestion being encountered at the uplink and/or downlink being suffered at the residential gateway 122 and not a simple bit indicating the presence or absence of congestion in a given direction. However, in other embodiments the value of a single bit, e.g., set to a value of 1, can be used to indicate the presence of congestion in the uplink and another single bit, e.g., set to the value 1, can be used to indicate the presence of congestion in the downlink.

In one embodiment the PSA UPF 156 uses the congestion information corresponding to the (R)AN 138 and/or residential gateway 122 it receives, and/or congestion information relating to congestion at the PSA UPF 156, to control setting of an ECN LAS indicator in one or more data packets passing through the PSA UPF 156 as part of a PDU session in the direction to which the congestion information corresponds.

Exemplary steps 1450 through 1468 of FIG. 11 correspond to one such embodiment. In such an embodiment ECN marking may not be implemented at the residential gateway 122 or (R)AN 138 with the marking being performed at the PSA UPF 156, e.g., in step 1468. Thus, in the embodiment to which steps 1450 to 1468 are implemented steps 1410 and 1412 may be omitted.

In step 1450 a congestion determination is made at the residential gateway 122. As part of step 1450 the residential gateway determines if it is suffering from congestion in its uplink, its downlink and/or both its uplink and downlink. In step 1452 the congestion information 1454 determined in step 1450 is communicated to another device, e.g., to (R)AN 138 so that it can then be communicated to the PSA UPF 156. Alternatively in some embodiments the residential gateway 122 communicates its determined congestion information directly to PSA UPF 156 in step 1452.

In step 1456 the (R)AN 138 receives the congestion information 1454 determined in step 1450 at the (R)AN 138.

In step 1458 the (R)AN 138 makes a congestion determination. As part of step 1458 the (R)AN 138 determines if it is suffering from congestion in its uplink, its downlink and/or both its uplink and downlink. In step 1460 the congestion information determined in step 1458, along with congestion information if any received from the residential gateway 122, is communicated to the PSA UPF 156 so that it can then used in congestion marking decisions made at the PSA UPF 156.

In step 1464 the PSA UPF 156 receives the congestion information 1462 from the (R)AN 138. In some embodiments the congestion information 1462 indicates the presence of uplink congestion, and in some cases the amount of congestion. In some cases the PSA 156 will set a congestion indicator in uplink data packets, if either of the residential gateway 122 or (R)AN 138 congestion information indicates they one of the devices is suffering from uplink congestion. Similarly, in some embodiments if the congestion information 1462 indicates the presence of downlink congestion, the PSA 156 will set a congestion indicator in downlink data packets, if either of the residential gateway 122 or (R)AN 138 detected that they were suffering from downlink congestion. In step 1464 the PSA UPF 156 receives the congestion information 1462. In step 1466 the PSA UPF makes an uplink congestion determination and downlink congestion determination with regard to the buffers and/or communication status at the PSA UPF 156. In step 1468, the PSA UPF 156 performs ECN L4S congestion marking based on the received congestion information 1462 and/or the congestion information determined in step 1466. The marking is performed on data packets in the downlink flows represented by arrow 1470 and uplink flows represented by arrow 1472. In some embodiments the PSA UPF 156 will set a congestion indicator in downlink packets of PDU data packets corresponding to the residential gateway 122 when any of the residential gateway, (R)AN 138 or PSA UPF 156 detected or reported downlink congestion, e.g., downlink congestion which will affect downlink packet flows corresponding to the residential gateway 122. Similarly in some embodiments the PSA UPF 156 will set a congestion indicator in uplink packets of PDU data packets corresponding to the residential gateway 122 when any of the residential gateway, (R)AN 138 or PSA UPF 156 detected or reported uplink congestion that will affect uplink flows corresponding to the residential gateway 122.

Figure 15:
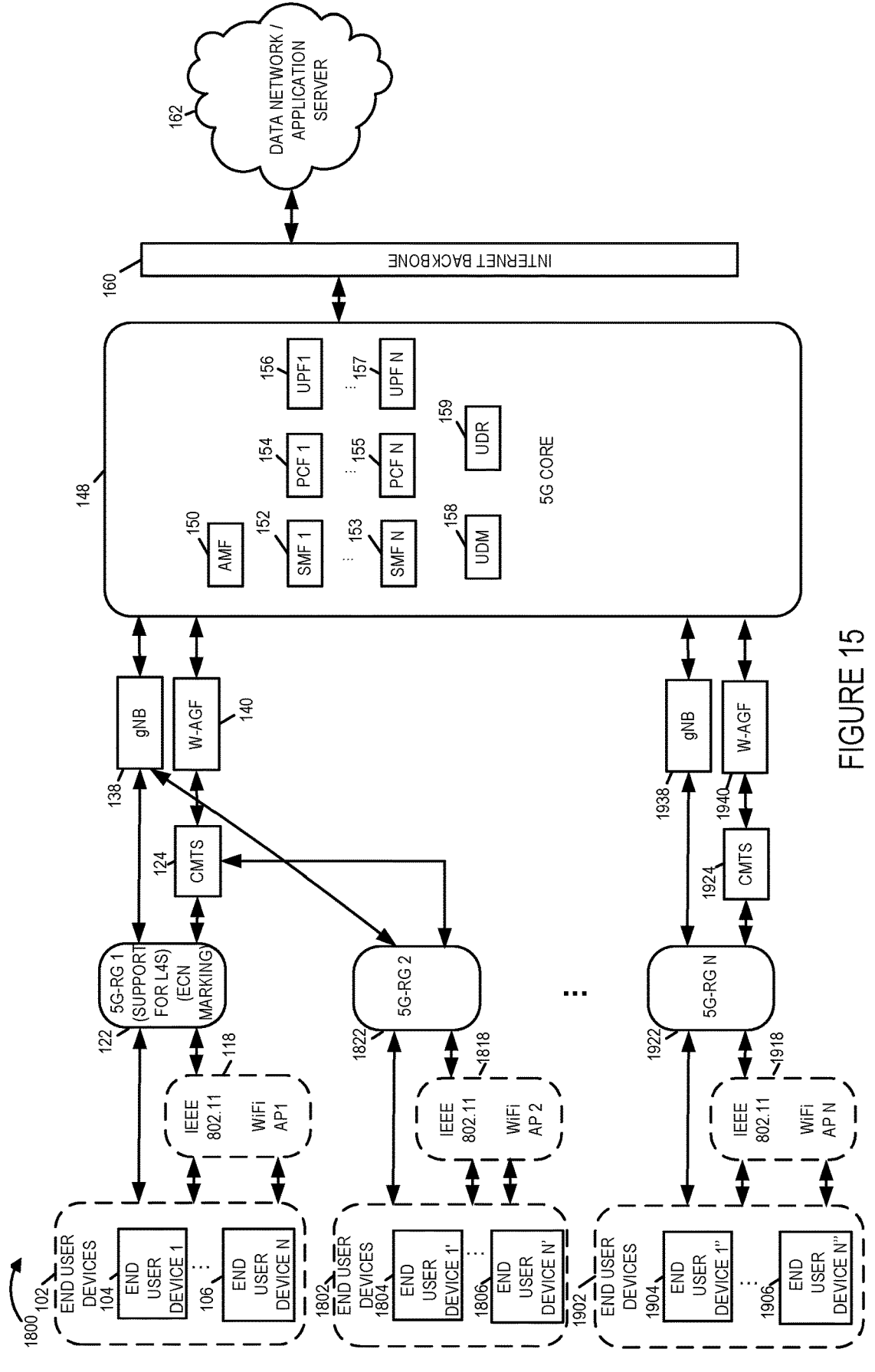
FIG. 15 is a drawing of an exemplary communications system in accordance with an exemplary embodiment, said exemplary communications system including a plurality of residential gateways (RGs), e.g., a plurality of 5G-RGs, wherein one or more or all of the RGs support L4S, detect for congestion and perform ECN marking.

FIG. 12 is a flowchart 1500 of an exemplary communication method, which may be performed by a communications system, e.g., system 100 of FIG. 2 or system 1800 of FIG. 15, in accordance with an exemplary embodiment. Operation of the exemplary method starts in step 1502 in which the communications system is powered on and initialized. Operation proceeds from start step 1502 to step 1504.

In step 1504, a unified data repository (UDR), e.g., UDR 159, is operated to store residential gateway (RG) subscription data indicating whether or not a RG, e.g. 5G-RG 122, is allowed to perform ECN (explicit congestion notification) marking, e.g., when ECN marking is enabled by an SMF for a PDU session corresponding to the RG to which a PDU session request message sent by the RG relates. Operation proceeds from step 1504 to step 1506.

In step 1506 the RG, e.g. 5G-RG 122, is operated to communicate, via a 3GPP access network node, e.g. gNB 138 which is a RAN node, a first PDU session request message, e.g., a PDU session establishment request message or a PDU session modification request message, to an access and mobility management function (AMF), e.g., AMF 150, said first PDU session request message including RG LAS (Low Latency Low Loss and Scalable Throughput) capability information in at least one of: i) a capability field (e.g., a 5GSM (5G session management) capability field) including an indication (e.g., a predetermined value in the capability field used to indicated support for L4S) of support by the RG for L4S or ii) a N1 SM (N1 Session Management) container including an indication (e.g., an indicator value included in the container used to indicate L4S) of support by the RG for L4S. In some embodiments, the PDU session request message includes i) a capability field including an indication of support by the RG for L4S and/or ii) an N1 SM container including and indication of support by the RG for LAS. In some embodiments, the RG LAS capability information indicates RG support for L4S in both an uplink and downlink direction. In some embodiments, the RG LAS capability information indicates RG support for L4S in a downlink direction. In some embodiments, the RG L4S capability information indicates RG support for L4S in an uplink direction. In some embodiments, the RG is a 5G-RG, e.g., 5G-RG 122, that appears to the 5G network core, e.g. 5G network core 148, including the AMF, e.g. AMF 150, as a user equipment (UE). Operation proceeds from step 1506 to step 1508.

In step 1508, a SMF, e.g. SMF 152, assigned to provide session management services for the PDU session corresponding to the first PDU session request message, is operated to retrieve stored subscription information corresponding to the RG, said stored subscription information including LAS information corresponding to the RG, e.g., information indicating whether the RG is allowed to perform ECN marking when ECN marking is enabled by the SMF assigned to provide session management service for the PDU session corresponding to the first PDU session request message. Operation proceeds from step 1508 to step 1510.

In step 1510 the SMF selects, based on the LAS information included in the received subscription information, a PCF, e.g., PCF 154 or PCF 155, to be used to support the PDU session to which the first PDU session request message relates. In some embodiments, the SMF select a PCF, e.g., PCF 154, which supports L4S when the retrieved LAS information indicates the RG supports ECN marking and selects a PCF, e.g., PCF 155, which does not support LAS when the retrieved 14S information indicates that the RG does not support ECN marking. Operation proceeds from step 1510 to step 1512.

In step 1512, the RG receives a response message, e.g., a PDU session establishment accept message or a PDU session modification command message, in response to the first PDU session request message. In some embodiments, the response message, e.g., a PDU session establishment accept message or a PDU session modification command message, includes an indicator indicating support for LAS (e.g., support by the communications network providing service to the RG for LAS for each QoS flow to which the PDU session request message relates. Operation proceeds from step 1512 to step 1514.

In step 1514 the RG sends a data packet including ECN marking in a header of said data packet, as part of said PDU session to which the first PDU session request message relates. In some embodiments, both the RG, e.g. 5G-RG 122, and the 3GPP access network node, e.g., gNB 138, perform ECN marking in both the uplink and downlink directions.

Operation proceeds from step 1514 to the input of step 1506, when the RG is to communicate another PDU session request message, via the 3GPP access network node, to the AMF.

FIG. 13 is a flowchart 1600 of an exemplary communication method, which may be performed by a communications system, e.g., system 100 of FIG. 2 or system 1800 of FIG. 15, in accordance with an exemplary embodiment. Operation of the exemplary method starts in step 1602 in which the communications system is powered on and initialized. Operation proceeds from start step 1602 to step 1604.

In step 1604, a unified data repository (UDR), e.g., UDR 159, is operated to store residential gateway (RG) subscription data indicating whether or not a RG, e.g. 5G-RG 122, is allowed to perform ECN (explicit congestion notification) marking, e.g., when ECN marking is enabled by an SMF for a PDU session corresponding to the RG to which a PDU session request message sent by the RG relates. Operation proceeds from step 1604 to step 1606.

In step 1606 the RG, e.g. 5G-RG 122, is operated to communicate to a wireline access gateway function (W-AGF), e.g., W-AGF 140, a first PDU session request message, e.g., a PDU session establishment request message or a PDU session modification request message, said first PDU session request message including RG L4S (Low Latency Low Loss and Scalable Throughput) capability information in at least one of: i) a capability field (e.g., a 5GSM (5G session management) capability field) including an indication (e.g., a predetermined value in the capability field used to indicated support for L4S) of support by the RG for LAS or ii) a N1 SM (N1 Session Management) container including an indication (e.g., an indicator value included in the container used to indicate L4S) of support by the RG for L4S. In some embodiments, the PDU session request message includes i) a capability field including an indication of support by the RG for L4S and/or ii) an N1 SM container including and indication of support by the RG for L4S. In some embodiments, the RG LAS capability information indicates RG support for L4S in both an uplink and downlink direction. In some embodiments, the RG LAS capability information indicates RG support for L4S in a downlink direction. In some embodiments, the RG LAS capability information indicates RG support for LAS in an uplink direction. In some embodiments, the RG is a 5G-RG, e.g., 5G-RG 122, that appears to the 5G network core, e.g. 5G network core 148, including the SMF, e.g. SMF 152, as a user equipment (UE). Operation proceeds from step 1606 to step 1608.

In step 1608, a SMF, e.g. SMF 152, assigned to provide session management services for the PDU session corresponding to the first PDU session request message, is operated to retrieve stored subscription information corresponding to the RG, said stored subscription information including LAS information corresponding to the RG, e.g., information indicating whether the RG is allowed to perform ECN marking when ECN marking is enabled by the SMF assigned to provide session management service for the PDU session corresponding to the first PDU session request message. Operation proceeds from step 1608 to step 1610.

In step 1610 the SMF selects, based on the LAS information included in the received subscription information, a PCF, e.g., PCF 154 or PCF 155, to be used to support the PDU session to which the first PDU session request message relates. In some embodiments, the SMF select a PCF, e.g., PCF 154, which supports LAS when the retrieved LAS information indicates the RG supports ECN marking and selects a PCF, e.g., PCF 155, which does not support L4S when the retrieved 14S information indicates that the RG does not support ECN marking. Operation proceeds from step 1610 to step 1612.

In step 1612, the RG receives a response message, e.g., a PDU session establishment accept message or a PDU session modification command message, in response to the first PDU session request message. In some embodiments, the response message, e.g., a PDU session establishment accept message or a PDU session modification command message, includes an indicator indicating support for L4S (e.g., support by the communications network providing service to the RG for LAS for each QoS flow to which the PDU session request message relates. Operation proceeds from step 1612 to step 1614.

In step 1614 the RG sends a data packet including ECN marking in a header of said data packet, as part of said PDU session to which the first PDU session request message relates.

Operation proceeds from step 1614 to the input of step 1606, when the RG is to communicate another PDU session request message to the W-AGF 140.

Figure 14A:
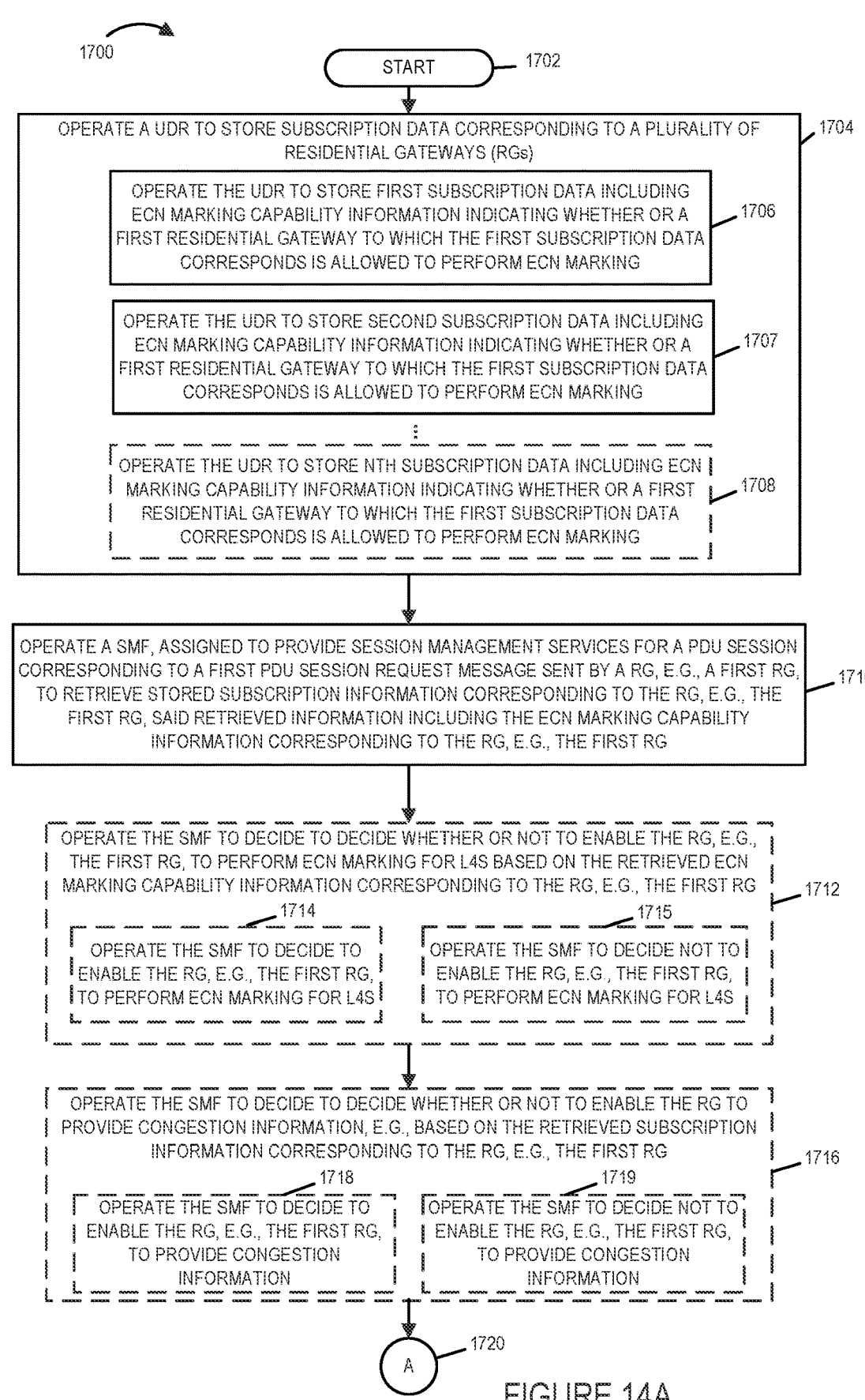
FIG. 14A is first part of a flowchart of an exemplary communication method, which may be performed by a communications system in accordance with an exemplary embodiment, said exemplary method including storing, accessing and using residential gateway (RG), e.g., 5G-RG, subscription data, said RG subscription data including ECN marking capability information.
Figure 14B:
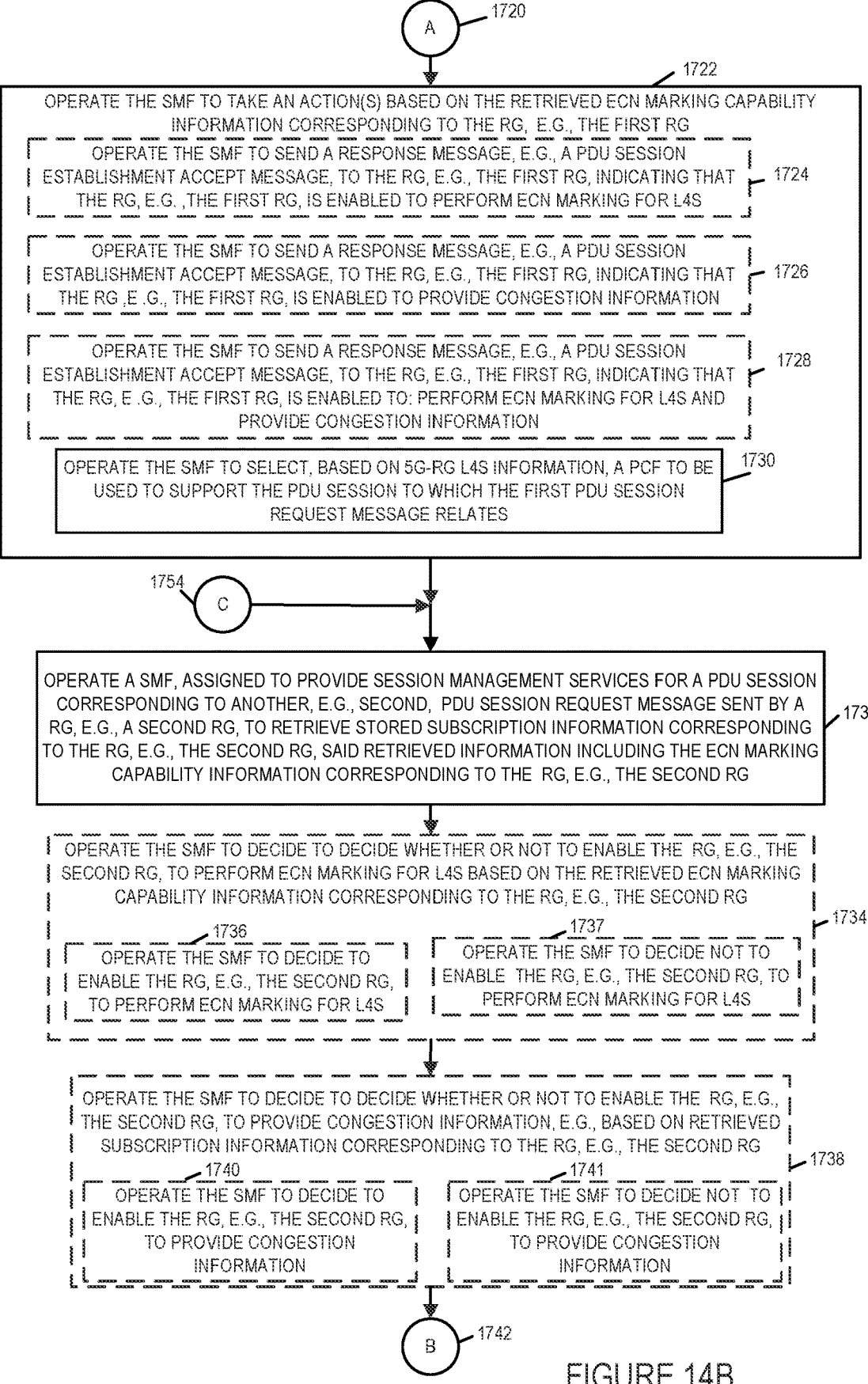
FIG. 14B is second part of a flowchart of an exemplary communication method, which may be performed by a communications system in accordance with an exemplary embodiment, said exemplary method including storing, accessing and using residential gateway (RG), e.g., 5G-RG, subscription data, said RG subscription data including ECN marking capability information.
Figures 14, 14A, 14B, 14C:
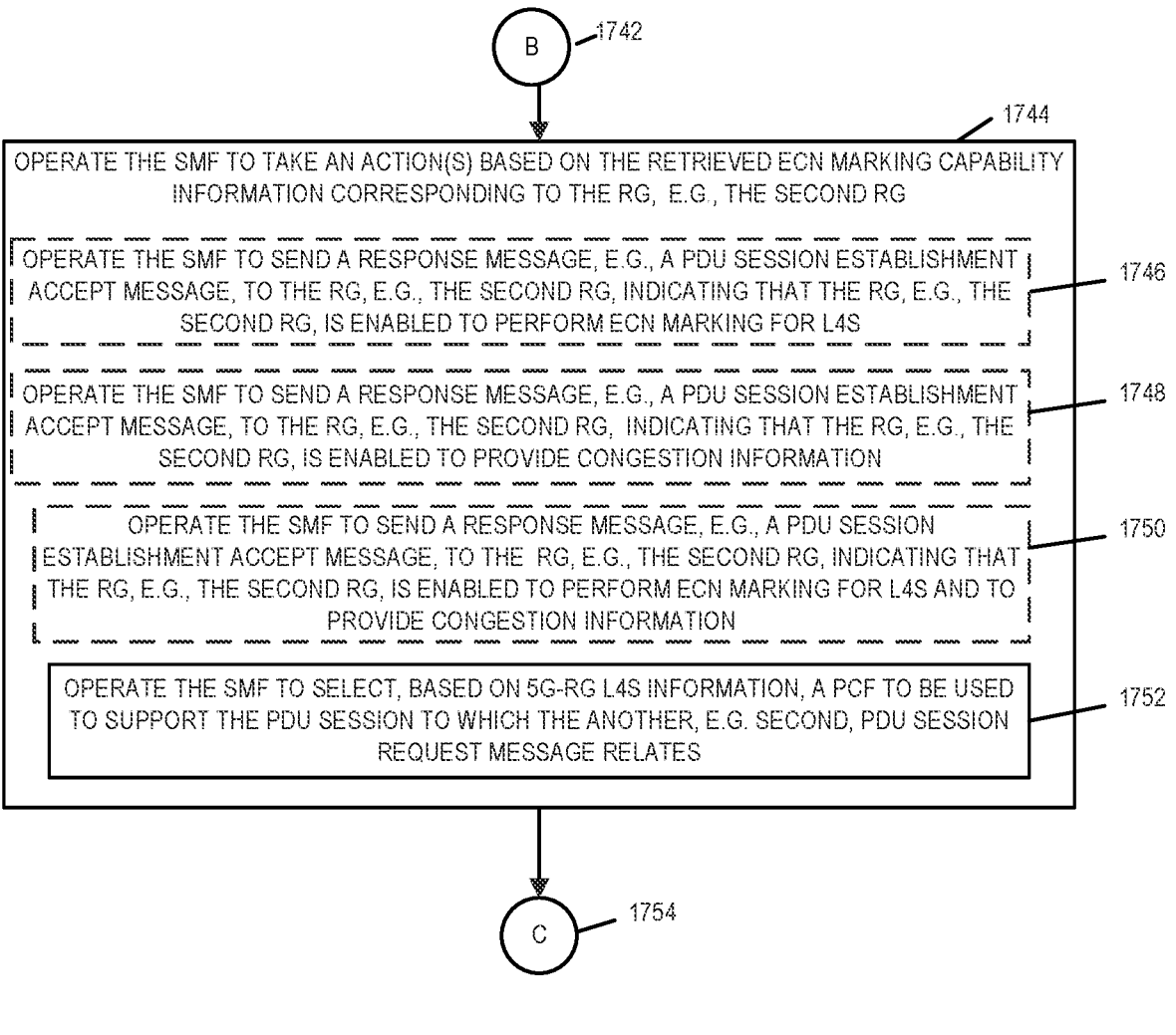
FIG. 14C is third part of a flowchart of an exemplary communication method, which may be performed by a communications system in accordance with an exemplary embodiment, said exemplary method including storing, accessing and using residential gateway (RG), e.g., 5G-RG, subscription data, said RG subscription data including ECN marking capability information.
FIG. 14 comprises the combination of FIG. 14A, FIG. 14B and FIG. 14C.

FIG. 14, comprising the combination of FIG. 14A, FIG. 14B and FIG. 14C, is a flowchart 1700 of an exemplary communication method, which may be performed by a communications system, e.g., system 100 of FIG. 2 or system 1800 of FIG. 15, in accordance with an exemplary embodiment. Operation of the exemplary method starts in step 1702 in which the communications system is powered on and initialized. Operation proceeds from start step 1702 to step 1704.

In step 1704, a unified data repository (UDR), e.g., UDR 159, stores subscription information corresponding to a plurality of residential gateways (RGs), e.g., a plurality of 5G-RGs (5G-RG 1 122, 5G-RG 2 1822, 5G-RG N 1922) including 5G-RG 122. Step 1704 includes steps 1706, 1707 and 1708. In step 1706 the UDR stores first subscription data including ECN (explicit congestion notification) marking capability information indicating whether or not a first residential gateway, e.g., 5G-RG 122, to which the first subscription data corresponds, is allowed to be perform ECN marking. In step 1707 the UDR stores second subscription data including ECN marking capability information indicating whether or not a second residential gateway, to which the second subscription data corresponds, is allowed to be perform ECN marking. In step 1708 the UDR stores Nth subscription data including ECN marking capability information indicating whether or not an Nth residential gateway, to which Nth subscription data corresponds, is allowed to be perform ECN marking. Operation proceeds from step 1704 to step 1710.

In step 1710 an SMF, e.g., SMF 152, assigned to provide session management services for a PDU session corresponding to a first PDU session request message (e.g., a PDU session establishment request message or a PDU session modification request message) sent by a RG, e.g., a first RG, e.g., 5G-RG 122, is operated to retrieve stored subscription information corresponding to the RG, e.g., the first RG 122, said retrieved information including the ECN marking capability information corresponding to the RG, e.g. the first RG. In some embodiments, the ECN marking capability information stored as part of the first subscription data is 5G-RG L4S information which indicates whether the RG (e.g., 5G-RG 122) is allowed to perform ECN marking when such marking is enabled by the SMF (e.g., SMF 152) with respect to the RG (e.g., 5G-5G 122).

In some embodiments, said first subscription data, stored in the unified data repository (UDR) 159) is accessible to the SMF (e.g., SMF 152) via a unified data management (UDM) (e.g., UDM 158). In various embodiments the RG is a 5G-RG (e.g., 5G-RG 122) that appears to a 5G network core (e.g., 5GC 148) including said SMF (e.g., SMF 152) as a user equipment (UE).

In some embodiments, the RG, e.g., 5G-RG 122, is coupled to a network core, e.g. 5GC 148, including said SMF, e.g., SMF 152, by a 3GPP access network, e.g., (R)AN 138, which is a gNB. In some embodiments, the RG, e.g., 5G-RG 122, is coupled to a network core, e.g. 5GC 148, including said SMF, e.g., SMF 152, by a wireline-access gateway function (W-AGF), e.g., W-AGF 140, which is part of a non-3GPP W-5GAN, e.g., wireline-5G access network 14.

Steps 1712 is an optional step which may be performed or bypassed, depending upon the particular embodiment. Step 1716 is an optional step which may be performed or bypassed, depending upon the particular embodiment. Operation proceeds from step 1710 to one of step 1712, step 1716 or step 1722, depending upon the particular embodiment. The flowchart will be described for an exemplary embodiment, in which optional steps 1712 and 1716 are performed.

Operation proceeds from step 1710 to step 1712. In step 1712 the SMF, e.g. SMF 152, is operated to decide whether or not to enable the RG, e.g. the first RG, to perform ECN marking for L4S based on the retrieved ECN marking capability information corresponding to the RG, e.g., the first RG. For each iteration of step 1712 one of step 1714 and step 1715 is performed. In step 1714 the SMF is operated to decide to enable the RG, e.g. the first RG, to perform ECN marking for LAS, e.g., in response to the retrieved ECN marking capability information corresponding to the RG, e.g. the first RG, indicating that the RG, e.g. the first RG, is allowed to perform ECN marking. In step 1715 the SMF is operated to decide to not to enable the RG, e.g. the first RG, to perform ECN marking for LAS, e.g., in response to the retrieved ECN marking capability information corresponding to the RG, e.g. the first RG, indicating that the RG, e.g. the first RG, is not allowed to perform ECN marking. Operation proceeds from step 1712 to step 1716.

In step 1716 the SMF, e.g. SMF 152, is operated to decide whether or not to enable the RG, e.g. the first RG, to provide congestion information (e.g., to a PSA UPF) e.g., based on the retrieved subscription information corresponding to the RG, e.g., the first RG. For each iteration of step 1716 one of step 1718 and step 1719 is performed. In step 1718 the SMF is operated to decide to enable the RG, e.g. the first RG, to provide congestion information, e.g., in response to the retrieved subscription information corresponding to the RG, e.g. the first RG, indicating that the RG, e.g. the first RG, is allowed to provide congestion information. In step 1715 the SMF is operated to decide to not to enable the RG, e.g. the first RG, to provide congestion information, e.g., in response to the retrieved subscription information corresponding to the RG, e.g. the first RG, indicating that the RG, e.g. the first RG, is not allowed to provide congestion information. Operation proceeds from step 1716, via connecting node A 1720, to step 1722.

In step 1722 the SMF, e.g., SMF 152, takes one or more actions based on the retrieved ECN marking capability information corresponding to the RG, e.g. the first RG. Step 1722 includes one or more of steps 1724, 1726, 1728 and 1730. In some embodiments, each iteration of step 1722 includes step 1730 and may, and sometimes does, include one of steps 1724, 1726 and step 1728. In step 1724 the SMF sends a response message, e.g., a PDU session establishment accept message, to the RG, e.g. the first RG, indicating that the RG, e.g., the first RG, is enabled to perform ECN marking for L4S. In step 1726 the SMF sends a response message, e.g., a PDU session establishment accept message, to the RG, e.g. the first RG, indicating that the RG, e.g., the first RG, is enabled to provide congestion information. In step 1728 the SMF sends a response message, e.g., a PDU session establishment accept message, to the RG, e.g. the first RG, indicating that the RG, e.g., the first RG, is enabled to: perform ECN marking for L4S and provide congestion information. In step 1730 the SMF, e.g., SMF 152, selects, based on 5G-RG LAS information, a PCF to be used to support the PDU session to which the first PDU session request message relates, said 5G-RG L4S information being included as part of the retrieved ECN marking capability information. In some embodiments said SMF, e.g., SMF 152, selects a PCF, e.g., PCF 154, which supports LAS when the retrieved 5G-RG LAS information indicates the first RG supports ECN marking and selects a PCF, e.g., PCF 155 which does not support LAS when the retrieved 5G-RG LAS information indicates the RG does not support ECN marking. Operation proceeds from step 1730 to step 1732.

In step 1732 an SMF, e.g., SMF 152, assigned to provide session management services for a PDU session corresponding to another, e.g., a second, PDU session request message (e.g., a PDU session establishment request message or a PDU session modification request message) sent by a RG, e.g., a second RG, e.g., 5G-RG 1822, is operated to retrieve stored subscription information corresponding to the RG, e.g., the second RG 1822, said retrieved information including the ECN marking capability information corresponding to the RG, e.g. the second RG. In some embodiments, the ECN marking capability information stored as part of the second subscription data is 5G-RG LAS information which indicates whether the RG (e.g., 5G-RG 1822) is allowed to perform ECN marking when such marking is enabled by the SMF (e.g., SMF 152) with respect to the RG (e.g., 5G-RG 1822).

In some embodiments, said second subscription data, stored in the unified data repository (UDR) 159) is accessible to the SMF (e.g., SMF 152) via a unified data management (UDM) (e.g., UDM 158). In various embodiments the second RG is a 5G-RG (e.g., 5G-RG 1822) that appears to a 5G network core (e.g., 5GC 148) including said SMF (e.g., SMF 152) as a user equipment (UE).

In some embodiments, the second RG, e.g., 5G-RG 1822, is coupled to a network core, e.g. 5GC 148, including said SMF, e.g., SMF 152, by a 3GPP access network, e.g., (R)AN 138, which is a gNB. In some embodiments, the second RG, e.g., 5G-RG 1822, is coupled to a network core, e.g. 5GC 148, including said SMF, e.g., SMF 152, by a wireline-access gateway function (W-AGF), e.g., W-AGF 140, which is part of a non-3GPP W-5GAN, e.g., wireline-5G access network 14.

Steps 1734 is an optional step which may be performed or bypassed, depending upon the particular embodiment. Step 1738 is an optional step which may be performed or bypassed, depending upon the particular embodiment. Operation proceeds from step 1732 to one of step 1734, step 1738 or step 1744, depending upon the particular embodiment. The flowchart will be described for an exemplary embodiment, in which optional steps 1734 and 1738 are performed.

Operation proceeds from step 1732 to step 1734. In step 1734 the SMF, e.g. SMF 152, is operated to decide whether or not to enable the RG, e.g. the second RG 1822, to perform ECN marking for L4S based on the retrieved ECN marking capability information corresponding to the RG, e.g., the second RG. For each iteration of step 1734 one of step 1736 and step 1737 is performed. In step 1736 the SMF is operated to decide to enable the RG, e.g. the second RG, to perform ECN marking for L4S, e.g., in response to the retrieved ECN marking capability information corresponding to the RG, e.g. the second RG, indicating that the RG, e.g. the second RG is allowed to perform ECN marking. In step 1737 the SMF is operated to decide not to enable the RG, e.g. the second RG, to perform ECN marking for L4S, e.g., in response to the retrieved ECN marking capability information corresponding to the RG, e.g. the second RG, indicating that the RG, e.g. the second RG, is not allowed to perform ECN marking. Operation proceeds from step 1734 to step 1738.

In step 1738 the SMF, e.g. SMF 152, is operated to decide whether or not to enable the RG, e.g. the second RG, to provide congestion information, e.g., based on the retrieved subscription information corresponding to the RG, e.g., the second RG. For each iteration of step 1738 one of step 1740 and step 1741 is performed. In step 1740 the SMF is operated to decide to enable the RG, e.g. the second RG, to provide congestion information, e.g., in response to the retrieved subscription information corresponding to the RG, e.g. the second RG, indicating that the RG, e.g. the second RG, is allowed to provide congestion information. In step 1741 the SMF is operated to decide not to enable the RG, e.g. the second RG, to provide congestion information, e.g., in response to the retrieved subscription information corresponding to the RG, e.g. the second RG, indicating that the RG, e.g. the second RG, is not allowed to provide congestion information. Operation proceeds from step 1738, via connecting node B 1742, to step 1744.

In step 1744 the SMF, e.g., SMF 152, takes one or more actions based on the retrieved ECN marking capability information corresponding to the RG, e.g. the second RG. Step 1744 includes one or more of steps 1746, 1748, 1750 and 1752. In some embodiments, each iteration of step 1744 includes step 1752 and may, and sometimes does, include one of steps 1746, 1748 and step 1750. In step 1746 the SMF sends a response message, e.g., a PDU session establishment accept message, to the RG, e.g. the second RG, indicating that the RG, e.g., the second RG, is enabled to perform ECN marking for L4S. In step 1748 the SMF sends a response message, e.g., a PDU session establishment accept message, to the RG, e.g. the second RG, indicating that the RG, e.g., the second RG, is enabled to provide congestion information, e.g., to a PSA UPF. In step 1750 the SMF sends a response message, e.g., a PDU session establishment accept message, to the RG, e.g. the second RG, indicating that the RG, e.g., the second RG, is enabled to: perform ECN marking for LAS and provide congestion information. In step 1752 the SMF, e.g., SMF 152, selects, based on 5G-RG LAS information, a PCF to be used to support the PDU session to which the another, e.g., second, PDU session request message relates, said 5G-RG L4S information being included as part of the retrieved ECN marking capability information. In some embodiments said SMF, e.g., SMF 152, selects a PCF, e.g., PCF 154, which supports L4S when the retrieved 5G-RG LAS information indicates the second RG supports ECN marking and selects a PCF, e.g., PCF 155 which does not support L4S when the retrieved 5G-RG LAS information indicates that the second RG does not support ECN marking.

Operation proceeds from step 1744, via connecting node C 1754, to step 1732. Thus steps 1732, 1734, 1738 and 1744 can be performed on a recurring basis, e.g., an iteration of steps 1732, 1734, 1738 and 1744 are performed in response to each PDU session request message, e.g., each PDU session establishment request message, which is received by the core network, and which was sourced from an RG and communicated to the core network via a 3GPP RAN or via a W-AGF.

FIG. 15 is a drawing of an exemplary communications system 1800 in accordance with an exemplary embodiment. Exemplary communication system 1800 includes end user devices 102, end user devices 1802, end user devices 1902, a plurality of 5G Residential Gateways (5G-RGs) (5G-RG 1 122, 5G-RG 2 1802, . . . , 5G-RG N 1902), a plurality of gNBs including gNB 138 and gNB 1938, a plurality of WiFi access points (WiFi AP) (WiFi AP 1 118, WiFi AP 2 1818, . . . , WiFi AP N 1918), a plurality of Cable Modem Termination Systems (CMTSs) including CMTS 124 and CMTS 1924, a plurality of Wireline Access Gateway Functions (W-AGFs) including W-AGF 140 and W-AGF 1940, 5G core network 148, a Internet backbone 160 and a data network/application server 162, coupled together as shown.

In one exemplary embodiment, 5G-RG 122 of FIG. 15 is 5G-RG 12 of FIG. 1; gNB 138 of FIG. 15, which is a 3GPP RAN (radio access network) is 3GPP access network 18 of FIG. 1; W-AGF 140 of FIG. 15 is W-AGF 16 of W-5GAN 14 of FIG. 1; AMF 150 of FIG. 15 is AMF 20 of FIG. 1; SMF 1 152 of FIG. 15 is SMF 22 of FIG. 1; UPF 1 156 of FIG. 15 is UPF 24 of FIG. 1; and data network 162 of FIG. 15 is data network 26 of FIG. 1. At least some of the RGs in plurality of 5G-RGs in system 1800 include support for LAS ECN marking. For example, 5G-RG 1 122 includes support for LAS ECN marking; 5G-RG 2 1822 may or may include support for L4S ECN marking, e.g. depending upon the particular exemplary embodiment; and 5G-RG N 1922 may or may include support for L4S ECN marking, e.g. depending upon the particular exemplary embodiment. In some such embodiments, UDR 159 includes stored subscription data corresponding to each of the 5G-RGs (122, 1822, . . . , 1922), said stored subscription data corresponding to a 5G-RG includes ECN marking capability information.

End user devices 102 includes a plurality of end user devices (end user device 1 104, . . . , end user device N 106). End user devices 1802 includes a plurality of end user devices (end user device 1' 1804, . . . , end user device N' 1806). End user devices 1902 includes a plurality of end user devices (end user device 1" 1904, . . . , end user device N" 1906). The end user devices (end user device 1 104, . . . , end user device N 106, end user device 1' 1804, . . . , end user device N' 1806, end user device 1" 1904, . . . , . . . end user device N" 1906), include, e.g., user equipment (UE) devices, cell phones, laptops, notepad devices, desktop PCs, gaming devices, WiFi end user devices, end user devices supporting 3GPP access, end user devices supporting non-3GPP access, IoT devices, etc. An end user device may, and sometimes does, support multiple access technologies, protocols and/or communications bands. Some end user devices support 3GPP access. Other end user devices support one or more types of non-3GPP access. Still other end user devices support both 3GPP access and non-3GPP access. The end user devices (end user device 1 104, . . . , end user device N 106, end user device 1' 1804, . . . , end user device N' 1806, end user device 1" 1904, . . . , end user device N" 1906) may, and sometimes do include applications which require L4S.

5G core 148 includes access and mobility management function (AMF) 150, a plurality of session management functions (SMFs) (SMF 1 152, . . . , SMF N 153), a plurality of policy control functions (PCFs) (PCF 1 154, . . . , PCF N 155), a plurality of user plane function (UPFs) (UPF1 156, . . . , UPF N 157), a unified data management (UDM) 158, and a unified data repository (UDR) 159.

5G-RG 1 122 appears to the 5G network core 148 as a user equipment (UE). 5G-RG 2 1822 appears to the 5G network core 148 as a user equipment (UE). 5G-RG N 1922 appears to the 5G network core 148 as a user equipment (UE).

Exemplary system 1800 supports Low Latency, Low Loss and Scalable Throughput services (LAS). In system 100 Explicit Congestion Notification (ECN) marking is used for the purpose of LAS when congestion is detected in the uplink path and downlink path so that the application layer can trigger real-time and gradual rate adaptation of the real-time video encoder based on ECN feedback.

In accordance with a feature of the present invention, one or more of the RGs e.g., 5G-RG 1 122 and, in some embodiments, one or both of 5G-RG 2 1822 and 5G-RG N 1922, can be enabled to, and sometimes do, detect for congestion at the RG (in its UL and/or DL traffic data buffers (queues)), and perform ECN markings, in addition to (R)ANs, e.g., gNBs. In some embodiments of the present invention additional devices, e.g., additional devices including data buffers (queues) and/or traffic schedulers, can be, and sometimes are enabled to, and sometimes do detect for congestion, and perform ECN markings. Such additional devices include, e.g., UPFs (e.g., UPF1 156 and/or UPF N 157), and W-AGFs (e.g., W-AGF 140, W-AGF 1940).

References to numbered embodiments, in the following lists of numbered embodiments, refer to an embodiment in the same list as the embodiment which is referring to another numbered embodiment.

1st Numbered List of Exemplary Method Embodiments

Method Embodiment 1. A communications method, the method comprising: operating a residential gateway (RG) (e.g., 5G-RG 122) to communicate (304 or 1506), via a 3GPP access network node (e.g., gNB 138), a first protocol data unit (PDU) session request message (e.g., a PDU session establishment request message or a PDU session modification request message) to an access and mobility management function (AMF) (150), said PDU session request message including RG L4S (Low Latency Low Loss and Scalable Throughput) capability information in at least one of: i) a capability field (e.g., a 5GSM (5G session management) capability field) including an indication (e.g., a predetermined value in the capability field used to indicate support for L4S) of support by the RG for L4S or ii) a N1 SM (N1 session management) container including an indication (e.g., an indicator value included in the container used to indicate LAS support) of support by the RG for L4S; and operating the RG to receive (402 or 1512) a response message (e.g., PDU session establishment accept message or a PDU session modification command message) in response to the PDU session request message.

Method Embodiment 1AA. The method of Method Embodiment 1, wherein said RG is a 5G-RG (122).

Method Embodiment 1A. The method of Method Embodiment 1 wherein the first PDU session request message includes i) a capability field including an indication of support by the RG for L4S and/or ii) an N1 SM container including an indication of support by the RG for L4S.

Method Embodiment 2. The communications method of Method Embodiment 1, wherein said response message (404) (e.g., a PDU session establishment accept message or a PDU session modification command message) includes an indicator indicating support for LAS (e.g., support by the communications network providing service to the RG for L4S for each QoS flow to which the PDU session request message relates).

Method Embodiment 2A. The communications method of Method Embodiment 2, wherein the RG LAS capability information indicates RG support for L4S in both an uplink and downlink direction.

Method Embodiment 2B. The communications method of Method Embodiment 2, wherein the first L4S capability information indicates RG support for L4S in a downlink direction.

Method Embodiment 2C. The communications method of Method Embodiment 2, wherein the RG LAS capability information indicates RG support for L4S in an uplink direction.

Method Embodiment 3. The communications method of Method Embodiment 1, wherein said first PDU session request message is one of a PDU session establishment request message or a PDU session modification request message.

Method Embodiment 4. The communications method of Method Embodiment 2, further comprising: storing (322 or 1504) RG subscription data (e.g., in a UDR (unified data repository) 159) indicating whether or not the RG is allowed to perform ECN (explicit congestion notification) marking (e.g., when ECN marking is enabled by an SMF for the PDU session corresponding to the RG to which the PDU session request message sent by the RG relates).

Method Embodiment 5. The communications method of Method Embodiment 4, further comprising: operating a session management function (SMF) (152), assigned to provide session management services for the PDU session corresponding to the first protocol data unit (PDU) session request message, to retrieve (328 or 1508) stored subscription information corresponding to the RG including L4S information corresponding to the RG (e.g., information indicating whether the RG is allowed to perform ECN marking when ECN marking is enabled by the SMF assigned to provide session management service for the PDU session corresponding to the first PDU session request message).

Method Embodiment 6. The communications method of Method Embodiment 5, further comprising: operating said SMF (152) to select, (350 or 1510) based on LAS information included in the retrieved subscription information, a policy control function (PCF) (154 or 155) to be used to support the PDU session to which the first PDU session request message relates.

Method Embodiment 7. The communication method of Method Embodiment 6, wherein said SMF (152) selects a PCF (154) which supports L4S when the retrieved LAS information indicates the RG supports ECN marking and selects a PCF (155) which does not support LAS when the retrieved LAS information indicates the RG does not support ECN marking.

Method Embodiment 8. The communications method of Method Embodiment 7, further comprising: operating the RG to send (412 or 1514) a data packet including ECN marking in a header of said data packet as part of said PDU communications session to which the first PDU session request message relates.

Method Embodiment 9. The communications method of Method Embodiment 1, wherein the RG is a 5G-RG (5G Residential Gateway 122) that appears to a 5G network core (148) including said AMF (150) as a user equipment (UE).

Method Embodiment 10. The communications method of Method Embodiment 1, wherein both the RG (e.g., 5G-RG 122) and 3GPP access network node (e.g., gNB 138) perform ECN marking in both the uplink and downlink directions.

1st Numbered List of Exemplary System Embodiments

System Embodiment 1. A communications system (100), the system comprising: a residential gateway (RG) (e.g., 5G-RG 122 or RG 900) including a first processor (902) configured to: operating the RG (122) to communicate (304 or 1506), via a 3GPP access network node (e.g., gNB 138), a first protocol data unit (PDU) session request message (e.g., a PDU session establishment request message or a PDU session modification request message) to an access and mobility management function (AMF) (150), said PDU session request message including RG L4S (Low Latency Low Loss and Scalable Throughput) capability information in at least one of: i) a capability field (e.g., a 5GSM (5G session management) capability field) including an indication (e.g., a predetermined value in the capability field used to indicate support for L4S) of support by the RG for L4S or ii) a N1 SM (N1 session management) container including an indication (e.g., an indicator value included in the container used to indicate L4S support) of support by the RG for L4S; and operate the RG to receive (402 or 1512) a response message (e.g., PDU session establishment accept message or a PDU session modification command message) in response to the PDU session request message.

System Embodiment 1AA. The communications system of System Embodiment 1, wherein said RG is a 5G-RG (122).

System Embodiment 1A. The communications system of System Embodiment 1 wherein the first PDU session request message includes i) a capability field including an indication of support by the RG for L4S and/or ii) an N1 SM container including an indication of support by the RG for L4S.

System Embodiment 2. The communications system of System Embodiment 1, wherein said response message (404) (e.g., a PDU session establishment accept message or a PDU session modification command message) includes an indicator indicating support for LAS (e.g., support by the communications network providing service to the RG for L4S for each QoS flow to which the PDU session request message relates).

System Embodiment 2A. The communications system of System Embodiment 2, wherein the RG LAS capability information indicates RG support for L4S in both an uplink and downlink direction.

System Embodiment 2B. The communications system of System Embodiment 2, wherein the first LAS capability information indicates RG support for L4S in a downlink direction.

System Embodiment 2C. The communications system of System Embodiment 2, wherein the RG LAS capability information indicates RG support for L4S in an uplink direction.

System Embodiment 3. The communications system of System Embodiment 1, wherein said first PDU session request message is one of a PDU session establishment request message or a PDU session modification request message.

System Embodiment 4. The communications system of System Embodiment 2, further comprising: a storage device (e.g., UDR (unified data repository) (159) or database device 1300) storing (322 or 1504) RG subscription data (e.g., in the UDR (unified data repository) (159)) indicating whether or not the RG is allowed to perform ECN (explicit congestion notification) marking (e.g., when ECN marking is enabled by an SMF for the PDU session corresponding to the RG to which the PDU session request message sent by the RG relates).

System Embodiment 5. The communications system of System Embodiment 4, further comprising: a session management function (SMF) (152) including a second processor (1202) configured to: operate the SMF (152), assigned to provide session management services for the PDU session corresponding to the first protocol data unit (PDU) session request message, to retrieve (328 or 1508) stored subscription information corresponding to the RG including L4S information corresponding to the RG (e.g., information indicating whether the RG is allowed to perform ECN marking when ECN marking is enabled by the SMF assigned to provide session management service for the PDU session corresponding to the first PDU session request message).

System Embodiment 6. The communications system of System Embodiment 5, wherein said second processor is further configured to: operate said SMF (152) to select (350 or 1510), based on LAS information included in the retrieved subscription information, a policy control function (PCF) (154 or 155) to be used to support the PDU session to which the first PDU session request message relates.

System Embodiment 7. The communication system of System Embodiment 6, wherein said SMF (152) is configured to select a PCF (154) which supports L4S when the retrieved LAS information indicates the RG supports ECN marking and to select a PCF (155) which does not support LAS when the retrieved LAS information indicates the RG does not support ECN marking, as part of being configured to operate the SMF to select a PCF.

System Embodiment 8. The communications system of System Embodiment 7, wherein said first processor is further configured to: operate the RG (122) to send (412 or 1514) a data packet including ECN marking in a header of said data packet as part of said PDU communications session to which the first PDU session request message relates.

System Embodiment 9. The communications system of System Embodiment 1, wherein the RG is a 5G-RG (5G-Residential Gateway (122)) that appears to a 5G network core (148) including said AMF (150) as a user equipment (UE).

System Embodiment 10. The communications system of System Embodiment 1, wherein both the RG (e.g., 5G-RG 122) and 3GPP access network node (e.g., gNB 138) perform ECN marking in both the uplink and downlink directions.

1st Numbered List of Exemplary Non-Transitory Computer Readable Medium Embodiments Non-Transitory Computer Readable Medium Embodiment 1. A non-transitory computer readable medium (908)

including machine executable instruction which when implemented by a processor (902) of a residential gateway (RG) (e.g., 5G-RG 122 or RG 900) cause the RG to perform the steps of: operating the residential gateway (RG) (e.g., 5G-RG 122) to communicate (304 or 1506), via a 3GPP access network node (e.g., gNB 138), a first protocol data unit (PDU) session request message (e.g., a PDU session establishment request message or a PDU session modification request message) to an access and mobility management function (AMF) (150), said PDU session request message including RG LAS (Low Latency Low Loss and Scalable Throughput) capability information in at least one of: i) a capability field (e.g., a 5GSM (5G session management) capability field) including an indication (e.g., a predetermined value in the capability field used to indicate support for LAS) of support by the RG for L4S or ii) a N1 SM (N1 session management) container including an indication (e.g., an indicator value included in the container used to indicate L4S support) of support by the RG for LAS; and operate the RG to receive (402 or 1512) a response message (e.g., PDU session establishment accept message or a PDU session modification command message) in response to the PDU session request message.

2nd Numbered List of Exemplary Method Embodiments

Method Embodiment 1. A communications method, the method comprising: operating a residential gateway (RG) (e.g., 5G-RG 122), to communicate (514 or 1606) to a wireline access gateway function (W-AGF) (140) a first PDU session request message (e.g., a PDU session establishment request message or a PDU session modification request message), said PDU session request message including RG LAS (Low Latency Low Loss and Scalable Throughput) capability information in at least one of: i) a capability field (e.g., a 5GSM (5G session management) capability field) including an indication (e.g., a predetermined value in the capability field used to indicate support for L4S) of support by the RG for L4S or ii) a N1 SM (session management) container including an indication (e.g., an indicator value included in the container used to indicate L4S support) of support by the RG for LAS; and operating the RG (122) to receive (626 or 1612) a response message (e.g., PDU session establishment accept message or a PDU session management command message) in response to the first PDU session request message.

Method Embodiment 1AA. The method of Method Embodiment 1, wherein said RG is a 5G-RG (122).

Method Embodiment 1A. The method of Method Embodiment 1 wherein the first PDU session request message includes i) a capability field including an indication of support by the RG for LAS and/or ii) a N1 SM container including an indication of support by the RG for L4S.

Method Embodiment 2. The communications method of Method Embodiment 1, wherein said response message (404) (e.g., a PDU session establishment accept message or a PDU session modification command message) includes an indicator indicating support for LAS (e.g., support by the communications network providing service to the RG for L4S for each QoS flow to which the PDU session request message relates).

Method Embodiment 2A. The communications method of Method Embodiment 2, wherein the RG LAS capability information indicates RG support for LAS in both an uplink and downlink direction.

Method Embodiment 2B. The communications method of Method Embodiment 2, wherein the first LAS capability information indicates RG support for L4S in a downlink direction.

Method Embodiment 2C. The communications method of Method Embodiment 2, wherein the RG LAS capability information indicates RG support for L4S in an uplink direction.

Method Embodiment 3. The communications method of Method Embodiment 1, wherein said first PDU session request message is one of a PDU session establishment request message or a PDU session modification request message.

Method Embodiment 4. The communications method of Method Embodiment 2, further comprising: storing (538 or 1604) RG subscription data (e.g., in a UDR (unified data repository) 159) indicating whether or not the RG is allowed to perform ECN (explicit congestion notification) marking (e.g., when ECN marking is enabled by an SMF for the PDU session corresponding to the RG to which the PDU session request message sent by the RG relates).

Method Embodiment 5. The communications method of Method Embodiment 4, further comprising: operating a session management function (SMF) (152), assigned to provide session management services for the PDU session corresponding to the first protocol data unit (PDU) session request message, to retrieve (544 or 1608) stored subscription information corresponding to the RG including L4S information corresponding to the RG (e.g., information indicating whether the RG is allowed to perform ECN marking when ECN marking is enabled by the SMF assigned to provide session management service for the PDU session corresponding to the first PDU session request message).

Method Embodiment 6. The communications method of Method Embodiment 5, further comprising: operating said SMF (152) to select (568 or 1610), based on LAS information included in the retrieved subscription information, a policy control function (PCF) (154 or 155) to be used to support the PDU session to which the first PDU session request message relates.

Method Embodiment 7. The communication method of Method Embodiment 6, wherein said SMF (152) selects a PCF (154) which supports L4S when the retrieved LAS information indicates the RG (122) supports ECN marking and selects a PCF (155) which does not support LAS when the retrieved LAS information indicates the RG (122) does not support ECN marking.

Method Embodiment 8. The communications method of Method Embodiment 7, further comprising: operating the RG (122) to send (634 or 1614) a data packet including ECN marking in a header of said data packet as part of said PDU communications session to which the first PDU session request message relates.

Method Embodiment 9. The communications method of Method Embodiment 1, wherein the RG is a 5G-RG (5G Residential Gateway 122) that appears to a 5G network core (148) including said SMF (152) as a user equipment (UE).

2nd Numbered List of Exemplary System Embodiments

System Embodiment 1. A communications system (100), the system comprising: a residential gateway (RG) (e.g., 5G-RG 122 or RG 900) including a first processor (902) configured to: operate, the RG (122) to communicate (514 or 1606) to a wireline access gateway function (W-AGF) (140)

a first PDU session request message (e.g., a PDU session establishment request message or a PDU session modification request message), said PDU session request message including RG L4S (Low Latency Low Loss and Scalable Throughput) capability information in at least one of: i) a capability field (e.g., a 5GSM (5G session management) capability field) including an indication (e.g., a predetermined value in the capability field used to indicate support for LAS) of support by the RG for L4S or ii) a N1 SM (session management) container including an indication (e.g., an indicator value included in the container used to indicate LAS support) of support by the RG for LAS; and operate the RG (122) to receive (626 or 1612) a response message (e.g., PDU session establishment accept message or a PDU session management command message) in response to the first PDU session request message.

System Embodiment 1AA. The communications system of System Embodiment 1, wherein said RG is a 5G-RG (122).

System Embodiment 1A. The communications system of System Embodiment 1 wherein the first PDU session request message includes i) a capability field including an indication of support by the RG for L4S and/or ii) a N1 SM container including an indication of support by the RG for L4S.

System Embodiment 2. The communications system of System Embodiment 1, wherein said response message (404) (e.g., a PDU session establishment accept message or a PDU session modification command message) includes an indicator indicating support for LAS (e.g., support by the communications network providing service to the RG for L4S for each QoS flow to which the PDU session request message relates).

System Embodiment 2A. The communications system of System Embodiment 2, wherein the RG LAS capability information indicates RG support for LAS in both an uplink and downlink direction.

System Embodiment 2B. The communications system of System Embodiment 2, wherein the first LAS capability information indicates RG support for L4S in a downlink direction.

System Embodiment 2C. The communications system of System Embodiment 2, wherein the RG L4S capability information indicates RG support for LAS in an uplink direction.

System Embodiment 3. The communications system of System Embodiment 1, wherein said first PDU session request message is one of a PDU session establishment request message or a PDU session modification request message.

System Embodiment 4. The communications system of System Embodiment 2, further comprising: a storage device (e.g., UDR (unified data repository) (159) or database device 1300) storing (538 or 1604) RG subscription data (e.g., in a UDR (unified data repository) 159) indicating whether or not the RG is allowed to perform ECN (explicit congestion notification) marking (e.g., when ECN marking is enabled by an SMF for the PDU session corresponding to the RG to which the PDU session request message sent by the RG relates).

System Embodiment 5. The communications system of System Embodiment 4, further comprising: a session management function (SMF) (152) including a second processor (1202) configured to: operate the SMF (152), assigned to provide session management services for the PDU session corresponding to the first protocol data unit (PDU) session request message, to retrieve (544 or 1608) stored subscription information corresponding to the RG including L4S information corresponding to the RG (e.g., information indicating whether the RG is allowed to perform ECN marking when ECN marking is enabled by the SMF assigned to provide session management service for the PDU session corresponding to the first PDU session request message).

System Embodiment 6. The communications system of System Embodiment 5, wherein said second processor (1202) is further configured to: operate said SMF (152) to select (568 or 1610), based on LAS information included in the retrieved subscription information, a policy control function (PCF) (154 or 155) to be used to support the PDU session to which the first PDU session request message relates.

System Embodiment 7. The communication system of System Embodiment 6, wherein said second processor is further configured to operate the SMF (152) to select a PCF (154) which supports L4S when the retrieved LAS information indicates the RG (122) supports ECN marking and to select a PCF (155) which does not support L4S when the retrieved LAS information indicates the RG (122) does not support ECN marking, as part of being configured to operate the SMF (152) to select a PCF.

System Embodiment 8. The communications system of System Embodiment 7, wherein said first processor is further configured to: operate the RG (122) to send (634 or 1614) a data packet including ECN marking in a header of said data packet as part of said PDU communications session to which the first PDU session request message relates.

System Embodiment 9. The communications system of System Embodiment 1, wherein the RG is a 5G-RG (5G Residential Gateway 122) that appears to a 5G network core (148) including said SMF (152) as a user equipment (UE).

2nd Numbered List of Exemplary Non-transitory Computer Readable Medium Embodiments Non-transitory Computer Readable Medium Embodiment 1. A non-transitory computer readable medium (908) including machine executable instruction which when implemented by a processor (902) of a residential gateway (RG) (e.g., 5G-RG 122 or RG 900) cause the RG to perform the steps of: operating the residential gateway (RG) (e.g., 5G-RG 122), to communicate (514 or 1606) to a wireline access gateway function (W-AGF) (140) a first PDU session request message (e.g., a PDU session establishment request message or a PDU session modification request message), said PDU session request message including RG L4S (Low Latency Low Loss and Scalable Throughput) capability information in at least one of: i) a capability field (e.g., a 5GSM (5G session management) capability field) including an indication (e.g., a predetermined value in the capability field used to indicate support for L4S) of support by the RG for L4S or ii) a N1 SM (session management) container including an indication (e.g., an indicator value included in the container used to indicate L4S support) of support by the RG for L4S; and operating the RG (122) to receive (626 or 1612) a response message (e.g., PDU session establishment accept message or a PDU session management command message) in response to the first PDU session request message.

3rd Numbered List of Exemplary Method Embodiments

Method Embodiment 1. A communications method, the method comprising: storing (322 or 538 or 1706) first subscription data (e.g., in a database, e.g., in a UDR (unified data repository 159)) including ECN marking capability information indicating whether or not a residential gateway (RG) (e.g., 5G-RG 122), to which the first subscription data corresponds, is allowed to perform ECN (explicit congestion notification) marking (e.g., when ECN marking is enabled by a SMF (152) for a PDU session corresponding to the RG to which a PDU session request message sent by the RG relates); operating a session management function (SMF) (152), assigned to provide session management services for a PDU session corresponding to a first protocol data unit (PDU) session request message sent by the RG, to retrieve (328 or 544 or 1710) stored subscription information corresponding to the RG, said retrieved information including the ECN marking capability information corresponding to the RG; and operating the SMF (152) to take an action (e.g., PCF selection 350 or 568, or 1722) based on the retrieved ECN marking capability information corresponding to the RG (122).

Method Embodiment 1A. The communications method of Method Embodiment 1, wherein the ECN marking capability information stored as part of the first subscription data is 5G-RG LAS information which indicates whether the RG (e.g., 5G-RG 122) is allowed to perform ECN marking when such marking is enabled by the SMF 152 with respect to the RG.

Method Embodiment 1B. The communications device of Method Embodiment 1A, wherein the RG (122) is coupled to a network core (148) including said SMF (152) by a 3GPP access network (e.g., (R)AN 138).

Method Embodiment 1B1. The communications method of Method Embodiment 1A, wherein the RG (e.g., 5G-RG 122) is coupled to a network core (148) including said SMF (152) by a wireline-access gateway function (W-AGF) (140) (which is part of a non-3GPP W-5GAN (wireline-5G access network 14)).

Method Embodiment 2. The communications method of Method Embodiment 1A, wherein operating (1722) the SMF (152) to take an action based on the retrieved ECN marking capability information corresponding to the RG includes operating the SMF (152) to select (350 or 568 or 1730), based on 5G-RG LAS information, a policy control function (PCF) (154 or 155) to be used to support the PDU session to which the first PDU session request message relates.

Method Embodiment 3. The communication method of Method Embodiment 2, wherein said SMF (152) selects (in step 350 or 568 or 1722 a PCF (154) which supports LAS when the retrieved 5G-RG LAS information indicates the RG supports ECN marking and selects (in step 350 or 568 or 1722) a PCF (155) which does not support L4S when the retrieved 5G-RG LAS information indicates the RG does not support ECN marking.

Method Embodiment 4. The communications method of Method Embodiment 2, wherein said first subscription data is stored in a database (e.g., unified data repository (UDR) 159) accessible to the SMF (152) via a unified data management (UDM) (158).

Method Embodiment 5. The communications method of Method Embodiment 1, wherein the RG is a 5G-RG (5G Residential Gateway) (122) that appears to a 5G network core (148) including said SMF (152) as a user equipment (UE).

Method Embodiment 6. The communications method of Method Embodiment 2, wherein said database includes 5G-RG LAS information corresponding to a plurality of 5G-RGs (122, 1822, 1922), said RG (e.g., 5G-RG 122) being one of said plurality of 5G-RGs.

Method Embodiment 7. The method of Method Embodiment 1, further comprising: operating (1712) the SMF to decide whether or not to enable the RG (122) to perform ECN marking for L4S based on the retrieved ECN marking capability information corresponding to the RG (122).

Method Embodiment 7A. The method of Method Embodiment 7, wherein operating (1712) the SMF (152) to decide whether or not to enable the RG (122) to perform ECN marking for L4S based on the retrieved ECN marking capability information corresponding to the RG (122) includes operating the SMF (152) to decide (1714) to enable the RG (122) to perform ECN marking for L4S in response to the retrieved ECN marking capability information corresponding to the RG (122) indicating that the RG (122) is capable of performing ECN marking.

Method Embodiment 7B. The method of Method Embodiment 7, wherein operating (1712) the SMF (152) to decide whether or not to enable the RG (152) to perform ECN marking for L4S based on the retrieved ECN marking capability information corresponding to the RG (122) includes operating the SMF (152) to decide (1715) not to enable the RG (122) to perform ECN marking for L4S in response to the retrieved ECN marking capability information corresponding to the RG (122) indicating that the RG (122) is not capable of performing ECN marking.

Method Embodiment 7C. The method of Method Embodiment 7, wherein operating (1722) the SMF (152) to take an action based on the retrieved ECN marking capability information corresponding to the RG (122) includes operating (1724 or 1728) the SMF (152) to send an indication to the RG (122) that the SMF (152) has enabled the RG (122) to perform ECN marking for L4S.

Method Embodiment 8. The method of Method Embodiment 1, further comprising: operating (1716) the SMF (152) to decide whether or not to enable the RG (122) to provide congestion information (e.g., RG (122) measured congestion information based on the status of UL and/or DL data buffers/queues in the RG) (e.g. to a PSA UPF).

Method Embodiment 8A. The method of Method Embodiment 8, wherein operating (1716) the SMF (152) to decide whether or not to enable the RG (122) to provide congestion information includes operating the SMF (152) to decide (1718) to enable the RG (122) to provide congestion information (e.g., to a PSA UPF) in response to retrieved subscription information corresponding to the RG (122) indicating that the RG (122) is allowed to provide congestion information.

Method Embodiment 8B. The method of Method Embodiment 8, wherein operating (1716) the SMF (152) to decide whether or not to enable the RG (122) to provide congestion information includes operating the SMF (152) to decide (1719) not to enable the RG (122) to provide congestion information (e.g., to a PSA UPF) in response to retrieved subscription information corresponding to the RG (122) indicating that the RG (122) is not allowed to provide congestion information.

Method Embodiment 8C. The method of Method Embodiment 7, wherein operating (1722) the SMF (152) to take an action based on the retrieved ECN marking capability information corresponding to the RG (122) includes operating (1726 or 1728) the SMF (152) to send an indication to the RG (122) that the SMF (152) has enabled the RG (122) to provide congestion information (e.g., to a PSA UPF).

3rd Numbered List of Exemplary System Embodiments

System Embodiment 1. A communications system (100 or 1800), the system comprising: a storage device (e.g., a UDR (unified data repository) (159) or database device 1300) storing (322 or 538 or 1706) first subscription data (e.g., in the UDR (unified data repository 159)) including ECN marking capability information indicating whether or not a residential gateway (RG) (e.g., 5G-RG 122) to which the first subscription data corresponds is allowed to perform ECN (explicit congestion notification) marking (e.g., when ECN marking is enabled by a SMF (152) for a PDU session corresponding to the RG to which a PDU session request message sent by the RG relates); a session management function (SMF) (152) including a first processor (1202) configured to: operate the SMF (152), assigned to provide session management services for a PDU session corresponding to a first protocol data unit (PDU) session request message sent by the RG, to retrieve (328 or 544 or 1710) stored subscription information corresponding to the RG, said retrieved information including the ECN marking capability information corresponding to the RG; and operate the SMF (152) to take an action (e.g., PCF selection 350 or 568, or 1722) based on the retrieved ECN marking capability information corresponding to the RG (122).

System Embodiment 1A. The communications system of System Embodiment 1, wherein the ECN marking capability information stored as part of the first subscription data is 5G-RG LAS information which indicates whether the RG (e.g., 5G-RG 122) is allowed to perform ECN marking when such marking is enabled by the SMF (152) with respect to the RG.

System Embodiment 1B. The communications system of System Embodiment 1A, wherein the RG (122) is coupled to a network core (148) including said SMF (152) by a 3GPP access network (e.g., (R)AN 138).

System Embodiment 1B1. The communications system of System Embodiment 1A, wherein the RG (e.g., 5G-RG 122) is coupled to a network core (148) including said SMF (152) by a wireline-access gateway function (W-AGF) (140) (which is part of a non-3GPP W-5GAN (wireline-5G access network 14)).

System Embodiment 2. The communications system of System Embodiment 1A, wherein said first processor (1202) is configured to: operate the SMF (152) to select (350 or 568 or 1730), based on 5G-RG LAS information, a policy control function (PCF) (154 or 155) to be used to support the PDU session to which the first PDU session request message relates, as part of being configured to operate the SMF (152) to take an action (1722) based on the retrieved ECN marking capability information corresponding to the RG.

System Embodiment 3. The communication system of System Embodiment 2, wherein said first processor (1202) is configured to operate the SMF (152) to select (350 or 568 or 1730) a PCF (154) which supports L4S when the retrieved 5G-RG LAS information indicates the RG supports ECN marking and to select a PCF (155) which does not support LAS when the retrieved 5G-RG LAS information indicates the RG does not support ECN marking, as part of being configured to operate the SMF (152) to select a PCF.

System Embodiment 4. The communications system of System Embodiment 2, wherein said first subscription data stored in the storage device is stored in a database (e.g., in a unified data repository (UDR) 159) accessible to the SMF (152) via a unified data management (UDM) (158).

System Embodiment 5. The communications system of System Embodiment 1, wherein the RG is a 5G-RG (5G Residential Gateway 122) that appears to a 5G network core (148) including said SMF (152) as a user equipment (UE).

System Embodiment 6. The communications system of System Embodiment 2, wherein said database includes 5G-RG L4S information corresponding to a plurality of 5G-RGs (122, 1822, 1922), said RG (e.g., 5G-RG 122) being one of said plurality of 5G-RGs.

System Embodiment 7. The communications system of System Embodiment 1, wherein said first processor (1202) is further configured to: operate (1712) the SMF to decide whether or not to enable the RG (122) to perform ECN marking for L4S based on the retrieved ECN marking capability information corresponding to the RG (122).

System Embodiment 7A. The communications system of System Embodiment 7, wherein said first processor (1202) is configured to: operate the SMF (152) to decide (1714) to enable the RG (122) to perform ECN marking for L4S in response to the retrieved ECN marking capability information corresponding to the RG (122) indicating that the RG (122) is capable of performing ECN marking, as part of being configured to operate (1712) the SMF (152) to decide whether or not to enable the RG (122) to perform ECN marking for L4S based on the retrieved ECN marking capability information corresponding to the RG (122).

System Embodiment 7B. The communications system of System Embodiment 7, wherein said first processor (1702) is configured to: operate the SMF (152) to decide (1715) not to enable the RG (122) to perform ECN marking for L4S in response to the retrieved ECN marking capability information corresponding to the RG (122) indicating that the RG (122) is not capable of performing ECN marking, as part of being configured to operate (1712) the SMF (152) to decide whether or not to enable the RG (152) to perform ECN marking for L4S based on the retrieved ECN marking capability information corresponding to the RG (122).

System Embodiment 7C. The communications system of System Embodiment 7, wherein said first processor (1702) is configured to: operate (1724 or 1728) the SMF (152) to send an indication to the RG (122) that the SMF (152) has enabled the RG (122) to perform ECN marking for L4S, as part of being configured to operate (1722) the SMF (152) to take an action based on the retrieved ECN marking capability information corresponding to the RG (122).

System Embodiment 8. The communications system of System Embodiment 1, wherein said first processor (1202) is further configured to: operate (1716) the SMF (152) to decide whether or not to enable the RG (122) to provide congestion information (e.g., RG (122) measured congestion information based on the status of UL and/or DL data buffers/queues in the RG) (e.g. to a PSA UPF).

System Embodiment 8A. The communications system of System Embodiment 8, wherein said first processor (1202) is configured to: operate the SMF (152) to decide (1718) to enable the RG (122) to provide congestion information (e.g., to a PSA UPF) in response to retrieved subscription information corresponding to the RG (122) indicating that the RG (122) is allowed to provide congestion information, as part of being configured to operate (1716) the SMF (152) to decide whether or not to enable the RG (122) to provide congestion information.

System Embodiment 8B. The communications system of System Embodiment 8, wherein the first processor (1202) is configured to: operate the SMF (152) to decide (1719) not to enable the RG (122) to provide congestion information (e.g., to a PSA UPF) in response to retrieved subscription information corresponding to the RG (122) indicating that the RG (122) is not allowed to provide congestion information, as part of being configured to operate (1716) the SMF (152) to decide whether or not to enable the RG (122) to provide congestion information.

System Embodiment 8C. The communications system of System Embodiment 8, wherein said first processor (1202) is configured to: operate (1726 or 1728) the SMF (152) to send an indication to the RG (122) that the SMF (152) has enabled the RG (122) to provide congestion information (e.g., to a PSA UPF), as part of being configured to operate (1722) the SMF (152) to take an action based on the retrieved ECN marking capability information corresponding to the RG (122).

4th Numbered List of Exemplary Method Embodiments

Method Embodiment 1. A communications method, the method comprising: operating a residential gateway (e.g., 5G-RG 122) to determine (1406) congestion information at the residential gateway (e.g., based on congestion of data traffic buffers (UL and/or DL traffic data buffers) in the residential gateway); operating a (R)AN (e.g., gNB 138) to determine (1408) congestion information at the (R)AN (138); operating the (R)AN to communicate (1460) congestion information (1462) to a PSA UPF (156); and operating the PSA UPF (156) to perform (1468) ECN data packet marking based on the congestion information (1462) received from the (R)AN (138).

Method Embodiment 2. The method of Method Embodiment 1, further comprising: operating the (R)AN to receive (1456) congestion information (1454) from the residential gateway (122).

Method Embodiment 3. The method of Method Embodiment 2, further comprising: operating the (R)AN 138 to send (1460) congestion information (1462) to the PSA UPF (156), said congestion information (1462) being based on or including congestion information (1454) received from the residential gateway (122).

Method Embodiment 4. The method of Method Embodiment 3, wherein operating the PSA UPF (156) to perform ECN data packet marking (1468) based on the congestion information (1462) received from the (R)AN (138) includes performing ECN marking on data packets being communicated via the PSA UPF (156) in an uplink direction (1472) and data packets being communicated via the PSA UPF (156) in a downlink direction (1470).

Method Embodiment 5. The method of Method Embodiment 4, wherein performing ECN marking on data packets being communicated via the PSA UPF (156) in an uplink direction includes setting a congestion indicator bit in uplink packets whenever one of the residential gateway (122), (R)AN (138) or PSA UPF (156) detected congestion in the uplink direction.

Method Embodiment 6. The method of Method Embodiment 4, wherein performing ECN marking on data packets being communicated via the PSA UPF (156) in a downlink direction includes setting a congestion indicator bit in uplink packets whenever one of the residential gateway (122), (R)AN (138) or PSA UPF (156) detected congestion in the downlink direction.

4th Numbered List of Exemplary System Embodiments

System Embodiment 1. A communications system, the system comprising: a residential gateway (e.g., 5G-RG 122 or RG 900) including a first processor (902); a (R)AN (e.g., gNB 138 or (R)AN 1000) including a second processor (1002); and PDU session anchor (PSA) user plane function (UPF) (156) including a third processor; and wherein said first processor is configured to operate the residential gateway (e.g., 5G-RG 122) to determine (1406) congestion information at the residential gateway (e.g., based on congestion of data traffic buffers (UL and/or DL traffic data buffers) in the residential gateway); wherein said second processor is configured to: operate the (R)AN (e.g., gNB 138) to determine (1408) congestion information at the (R)AN (138); and operate the (R)AN to communicate (1460) congestion information (1462) to a PSA UPF (156); and wherein said third processor is configured to: operate the PSA UPF (156) to perform (1468) ECN data packet marking based on the congestion information (1462) received from the (R)AN (138).

System Embodiment 2. The communications system of System Embodiment 1, wherein said second processor is further configured to: operate the (R)AN to receive (1456) congestion information (1454) from the residential gateway (122).

System Embodiment 3. The communications system of System Embodiment 2, wherein said second processor is further configured to: operate the (R)AN 138 to send (1460) congestion information (1462) to the PSA UPF (156), said congestion information (1462) being based on or including congestion information (1454) received from the residential gateway (122).

System Embodiment 4. The communications system of System Embodiment 3, wherein said third processor is configured to: operate the PSA UPF (156) to perform ECN marking on data packets being communicated via the PSA UPF (156) in an uplink direction (1472) and data packets being communicated via the PSA UPF (156) in a downlink direction (1470), as part of being configured to operate the PSA UPF (156) to perform ECN data packet marking (1468) based on the congestion information (1462) received from the (R)AN (138).

System Embodiment 5. The communications system of System Embodiment 4, wherein said third processor is configured to: set a congestion indicator bit in uplink packets whenever one of the residential gateway (122), (R)AN (138) or PSA UPF (156) detected congestion in the uplink direction, as part of being configured to perform ECN marking on data packets being communicated via the PSA UPF (156) in an uplink direction.

System Embodiment 6. The communications system of System Embodiment 4, wherein said third processor is configured to: set a congestion indicator bit in uplink packets whenever one of the residential gateway (122), (R)AN (138) or PSA UPF (156) detected congestion in the downlink direction, as part of being configured to perform ECN marking on data packets being communicated via the PSA UPF (156) in a downlink direction.

The techniques of various embodiments may be implemented using software, hardware and/or a combination of software and hardware. Various embodiments are directed to apparatus, e.g., end user devices, user equipment (UE) devices, 5G-RGs, W-AGFs, core network devices (e.g., AMF devices, PCF devices, SMF devices, UPF devices, UDM devices, UDR devices etc.), access network devices (e.g., base stations, e.g., gNBs, WiFi access nodes, cable network access devices), wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. Various embodiments are also directed to methods, e.g., method of controlling and/or operating 5G-RG devices, W-AGF devices, end user devices, user equipment (UE) devices, core network devices (e.g., AMF devices, PCF devices, SMF devices, UPF devices, UDM devices, UDR devices, etc.), wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. Various embodiments are also directed to a machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of each of the described methods.

In various embodiments each of the steps or elements of a method are implemented using one or more processors. In some embodiments, each of elements or steps are implemented using hardware circuitry.

In various embodiments devices, e.g., 5G-RG devices, W-AGF devices, end user devices, user equipment (UE) devices, core network devices (e.g., PCF devices, AMF devices, SMF devices, UPF devices, UDM devices, UDR devices, etc.), wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements described herein are implemented using one or more components to perform the steps corresponding to one or more methods, for example, provisioning user equipment devices, provisioning AP devices, provisioning AAA servers, provisioning orchestration servers, generating messages, message reception, message transmission, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., 5G-RG devices, W-AGF devices, 3GPP access network devices, end user devices, user (UE) devices, core network devices (e.g., PCF devices, AMF devices, SMF devices, UPF devices, UDM devices, UDR devices, etc.), wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements, are configured to perform the steps of the methods described as being performed by the user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., 5G-RG devices, W-AGF devices, end user devices, a user equipment (UE) devices, core network devices (e.g., PCF devices, AMF devices, SMF devices, UPF devices, UDM devices, UDR devices, etc.), wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements, with a processor which includes a component corresponding to each of the steps of the various described methods performed by the device in which the processor is included. In some but not all embodiments a device, e.g., 5G-RG devices, w-AGF devices, end user devices, 3GPP access network devices, user equipment (UE) devices, core network devices (e.g., PCF devices, AMF devices, SMF devices, UPF devices, EDM devices, UDR devices, etc.), wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., 5G-RG devices, W-AGF devices, 3GPP access network devices, end user devices, user (UE) devices, core network devices (e.g., PCF devices, AMF devices, SMF devices, UPF devices, UDM devices, UDR devices, etc.), wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a 5G-RG device, a W-AGF device, a 3GPP access network device, e.g., a gNB, an end user device, a user equipment (UE) device, core network device (e.g., PCF device, AMF device, SMF device, UPF device, UDM device, UDR device, etc.), wireless device, mobile device, smartphone, subscriber device, desktop computer, printer, IPTV, laptop, tablets, network edge device, Access Point, wireless router, switch, WLAN controller, orchestration server, orchestrator, Gateway, AAA server, server, node and/or element or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
operating a residential gateway (RG), to communicate to a wireline access gateway function (W-AGF) a first PDU session request message, said first PDU session request message including RG L4S (Low Latency Low Loss and Scalable Throughput) capability information in at least one of: i) a capability field including an indication of support by the RG for L4S or ii) a N1 SM (session management) container including an indication of support by the RG for L4S; and
operating the RG to receive a response message in response to the first PDU session request message.

2. The communications method of claim 1, wherein the first PDU session request message includes a capability field including an indication of support by the RG for L4S.

3. The communications method of claim 1, wherein said response message includes an indicator indicating support for L4S.

4. The communications method of claim 1, wherein said first PDU session request message is one of a PDU session establishment request message or a PDU session modification request message.

5. The communications method of claim 3, further comprising:
storing RG subscription data indicating whether or not the RG is allowed to perform ECN (explicit congestion notification) marking.

6. The communications method of claim 5, further comprising:

operating a session management function (SMF), assigned to provide session management services for the PDU session corresponding to the first protocol data unit (PDU) session request message, to retrieve stored subscription information corresponding to the RG including L4S information corresponding to the RG.

7. The communications method of claim 6, further comprising:

operating said SMF to select, based on L4S information included in the retrieved subscription information, a policy control function (PCF) to be used to support the PDU session to which the first PDU session request message relates.

8. The communications method of claim 7, wherein said SMF selects a PCF which supports L4S when the retrieved LAS information indicates the RG supports ECN marking and selects a PCF which does not support L4S when the retrieved L4S information indicates the RG does not support ECN marking.

9. The communications method of claim 8, further comprising:

operating the RG to send a data packet including ECN marking in a header of said data packet as part of said PDU communications session to which the first PDU session request message relates.

10. The communications method of claim 1, wherein the RG is a 5G-RG (5G Residential Gateway) that appears to a 5G network core including a SMF as a user equipment (UE).

11. A non-transitory computer readable medium including machine executable instruction which when implemented by a processor of a residential gateway (RG) cause the RG to perform the steps of:

operating the residential gateway (RG), to communicate to a wireline access gateway function (W-AGF) a first PDU session request message, said first PDU session request message including RG LAS (Low Latency Low Loss and Scalable Throughput) capability information in at least one of: i) a capability field including an indication of support by the RG for L4S or ii) a N1 SM (session management) container including an indication of support by the RG for L4S; and operating the RG to receive a response message in response to the first PDU session request message.

\* \* \* \* \*